US010829931B2

(12) United States Patent
Ndobo-Epoy et al.

(10) Patent No.: US 10,829,931 B2
(45) Date of Patent: Nov. 10, 2020

(54) SYSTEMS, METHODS, AND APPRATUSES FOR INSULATING ADJACENT TO A TOP OF AN ATTIC

(71) Applicant: CERTAINTEED CORPORATION, Malvern, PA (US)

(72) Inventors: Jean-Philippe Ndobo-Epoy, Westboro, MA (US); Michael J. Lembo, Souderton, PA (US); Todd P. Dinoia, Littleton, MA (US); Luc Pierre Vitry, Philadelphia, PA (US); Gregory F. Jacobs, Oreland, PA (US); Valerio Massara, Redavalle (IT); Andrew Clyde Brandt, Pottstown, PA (US)

(73) Assignee: CERTAINTEED CORPORATION, Malvern, PA (US)

( * ) Notice: Subject to any disclaimer, the term of this patent is extended or adjusted under 35 U.S.C. 154(b) by 0 days.

(21) Appl. No.: 16/411,707

(22) Filed: May 14, 2019

(65) Prior Publication Data
US 2019/0264441 A1    Aug. 29, 2019

Related U.S. Application Data

(63) Continuation of application No. 15/718,246, filed on Sep. 28, 2017, now Pat. No. 10,323,410.
(Continued)

(51) Int. Cl.
*E04B 1/76* (2006.01)
*E04B 5/02* (2006.01)
(Continued)

(52) U.S. Cl.
CPC .......... *E04B 1/7675* (2013.01); *E04B 1/7666* (2013.01); *E04B 5/026* (2013.01);
(Continued)

(58) Field of Classification Search
CPC ...... E04B 1/7675; E04B 1/7666; E04B 5/026; E04B 3/291; E04B 13/16
(Continued)

(56) References Cited

U.S. PATENT DOCUMENTS 1,870,838 A   8/1932   Davis
2,172,270 A   9/1939   Ansel
(Continued)

FOREIGN PATENT DOCUMENTS

AU    2010202733 A1    1/2011
CN    204645501 U      9/2015
(Continued)

OTHER PUBLICATIONS

Babineau, Jr., Francis, "Cost-Effective High-Performance Unvented Attics," Thermal Performance of the Exterior Envelopes of Whole Buildings XIII International Conference, 2016, pp. 34-45, ASHRAE.
(Continued)

*Primary Examiner* — Paola Agudelo
(74) *Attorney, Agent, or Firm* — Abel Schillinger, LLP; Thomas H. Osborn

(57) ABSTRACT

An insulation system and method comprising an insulation layer, an atmospheric regulation layer, a structural support, and an external surface; wherein the atmospheric regulation layer is supported by the structural support, wherein the insulation layer is located between the atmospheric regulation layer and the external surface, wherein the atmospheric regulation layer has a water vapor permeability of not greater than 3 perms at a relative humidity of 25% as measured by ASTM E96 Procedure A Dry Cup, and a water vapor permeability of at least 6 perms at a relative humidity of 75% as measured by ASTM E96 Procedure B Wet Cup, wherein the atmospheric regulation layer has a fire class A rating as measured by ASTM E84, and wherein the con-
(Continued)

tinuous atmospheric regulation layer has a ACH50 value of not greater than 10, wherein ACH50 represents an air exchange at 50 Pascals.

15 Claims, 32 Drawing Sheets

Related U.S. Application Data

(60) Provisional application No. 62/466,680, filed on Mar. 3, 2017, provisional application No. 62/446,160, filed on Jan. 13, 2017, provisional application No. 62/402,219, filed on Sep. 30, 2016, provisional application No. 62/402,465, filed on Sep. 30, 2016.

(51) Int. Cl.
*E04D 13/16* (2006.01)
*E04C 3/29* (2006.01)
*E04B 1/80* (2006.01)

(52) U.S. Cl.
CPC .......... *E04C 3/291* (2013.01); *E04D 13/1606* (2013.01); *E04D 13/1637* (2013.01); *E04B 1/80* (2013.01); *E04D 13/1625* (2013.01); *Y02A 30/244* (2018.01)

(58) Field of Classification Search
USPC ........................................................ 52/404.1
See application file for complete search history.

(56) References Cited

U.S. PATENT DOCUMENTS

| | | | |
|---|---|---|---|
| 2,793,887 A | 5/1957 | Moore | |
| 2,998,337 A * | 8/1961 | Tillotson | E04B 1/80 52/406.1 |
| 3,321,878 A | 5/1967 | Brown et al. | |
| D210,872 S | 4/1968 | Marsh | |
| 3,732,659 A | 5/1973 | LaBarge | |
| 3,738,217 A | 6/1973 | Walker | |
| 3,999,343 A * | 12/1976 | Roberts | E04B 2/7412 52/241 |
| 4,047,346 A | 9/1977 | Alderman | |
| 4,155,206 A | 5/1979 | Player | |
| 4,231,280 A | 11/1980 | Gross | |
| 4,233,791 A * | 11/1980 | Kuhl | E04B 1/66 156/71 |
| 4,251,972 A * | 2/1981 | Interlante | E04D 13/1625 52/404.3 |
| 4,292,777 A | 10/1981 | Story | |
| 4,320,605 A | 3/1982 | Carlson et al. | |
| D267,776 S | 2/1983 | Holgersson et al. | |
| 4,384,437 A * | 5/1983 | Coles | E04D 13/1637 52/404.3 |
| 4,425,747 A | 1/1984 | Player | |
| 4,437,282 A | 3/1984 | O'Brien | |
| 4,476,659 A | 10/1984 | Player | |
| 4,545,166 A * | 10/1985 | Kielmeyer | E04B 9/064 52/506.06 |
| 4,573,298 A | 3/1986 | Harkins | |
| 4,592,688 A | 6/1986 | Kramer | |
| 4,597,702 A | 7/1986 | Brown | |
| 4,635,423 A * | 1/1987 | Ward | E04B 1/642 156/71 |
| 4,724,651 A | 2/1988 | Fligg | |
| 4,856,247 A | 8/1989 | Georgino | |
| 4,866,905 A * | 9/1989 | Bihy | B44B 5/028 52/742.12 |
| 4,875,320 A | 10/1989 | Sparkes | |
| 4,930,285 A | 6/1990 | Ward | |
| 5,085,023 A | 2/1992 | Duffy | |
| 5,442,890 A | 8/1995 | Fligg | |
| 5,581,966 A | 12/1996 | Fligg | |
| 5,636,487 A | 6/1997 | Fligg | |
| 5,704,170 A * | 1/1998 | Simpson | E04B 7/024 52/22 |
| 6,006,481 A * | 12/1999 | Jacobs | B32B 5/18 52/309.9 |
| D419,693 S | 1/2000 | Hersh et al. | |
| D420,149 S | 2/2000 | Hersh et al. | |
| D443,198 S | 6/2001 | Snyder | |
| D446,442 S | 8/2001 | Simpson | |
| D452,424 S | 12/2001 | Simpson, Sr. | |
| 6,324,808 B1 | 12/2001 | Lippy et al. | |
| D462,601 S | 9/2002 | Chaney | |
| 6,487,825 B1 | 12/2002 | Sillik | |
| 6,808,772 B2 | 10/2004 | Kunzel et al. | |
| 6,890,666 B2 | 5/2005 | Kunzel et al. | |
| 7,008,890 B1 | 3/2006 | Kunzel et al. | |
| 7,017,315 B2 | 3/2006 | Corwin | |
| 7,021,016 B2 | 4/2006 | Steffes et al. | |
| D523,968 S | 6/2006 | Gilbert | |
| 7,090,174 B2 | 8/2006 | Korczak et al. | |
| D599,193 S | 9/2009 | Meyer et al. | |
| D607,711 S | 1/2010 | Adams et al. | |
| D616,035 S | 5/2010 | Kosir et al. | |
| 7,908,813 B2 | 3/2011 | Gulbrandsen et al. | |
| 7,921,619 B2 | 4/2011 | Snyder et al. | |
| 7,997,180 B2 | 8/2011 | Soderberg | |
| 8,132,379 B2 | 3/2012 | Zaveri et al. | |
| 8,281,548 B1 | 10/2012 | Garcia | |
| D684,844 S | 6/2013 | Ferreira | |
| 8,613,180 B2 | 12/2013 | Strickland et al. | |
| 8,635,824 B2 | 1/2014 | Scherrer | |
| 8,640,429 B1 | 2/2014 | Watts et al. | |
| 8,657,244 B2 | 2/2014 | Sillik | |
| D701,329 S | 3/2014 | Tiner et al. | |
| 8,739,486 B2 | 6/2014 | Bodsford et al. | |
| D724,259 S | 3/2015 | Klus | |
| 8,985,927 B2 | 3/2015 | Ashton et al. | |
| 9,032,678 B2 | 5/2015 | Shaw et al. | |
| D732,912 S | 6/2015 | Cavaliere et al. | |
| D737,120 S | 8/2015 | Recker et al. | |
| D739,709 S | 9/2015 | Wright | |
| 9,255,406 B1 | 2/2016 | McCary, Sr. | |
| D754,405 S | 4/2016 | Herde | |
| 9,322,179 B2 | 4/2016 | Oberg | |
| 9,359,471 B2 | 6/2016 | Trumbo et al. | |
| 9,366,052 B1 | 6/2016 | Warner et al. | |
| 9,476,204 B2 | 10/2016 | Wolf | |
| 9,546,480 B2 | 1/2017 | Jakobsen et al. | |
| D787,092 S | 5/2017 | Singh | |
| D789,559 S | 6/2017 | Singh | |
| D790,078 S | 6/2017 | Singh | |
| D790,732 S | 6/2017 | Singh | |
| D790,734 S | 6/2017 | Singh | |
| D790,735 S | 6/2017 | Singh | |
| 9,671,046 B2 | 6/2017 | Whipple et al. | |
| D791,350 S | 7/2017 | Singh | |
| D791,351 S | 7/2017 | Singh | |
| D791,355 S | 7/2017 | Singh | |
| D791,359 S | 7/2017 | Singh | |
| D791,360 S | 7/2017 | Singh | |
| D791,361 S | 7/2017 | Singh | |
| D793,848 S | 8/2017 | Charette | |
| D811,853 S | 3/2018 | Foley et al. | |
| 9,920,516 B2 | 3/2018 | Alter et al. | |
| D837,038 S | 1/2019 | Ndobo-Epoy et al. | |
| 2004/0216408 A1 | 11/2004 | Hohmann, Jr. | |
| 2005/0017142 A1 | 1/2005 | Ogden | |
| 2006/0078753 A1 | 4/2006 | Bomberg et al. | |
| 2007/0015424 A1 | 1/2007 | Toas et al. | |
| 2008/0115460 A1 | 5/2008 | Ruid et al. | |
| 2008/0237433 A1 | 10/2008 | Hardin | |
| 2010/0043328 A1 | 2/2010 | Kallweit | |
| 2011/0016816 A1 | 1/2011 | Lizarazu | |
| 2011/0256786 A1 | 10/2011 | Bomberg | |
| 2011/0271626 A1 | 11/2011 | Lewis | |
| 2013/0280467 A1 | 10/2013 | Fay | |
| 2015/0176211 A1 | 6/2015 | Knapp et al. | |
| 2015/0218802 A1 | 8/2015 | Wolf | |
| 2015/0218803 A1 | 8/2015 | Rockwell et al. | |

(56) References Cited

U.S. PATENT DOCUMENTS

| | | | |
|---|---|---|---|
| 2015/0233110 A1 | 8/2015 | Alter et al. |
| 2015/0240477 A1 | 8/2015 | Weeks et al. |
| 2015/0300003 A1 | 10/2015 | Jakobsen et al. |
| 2016/0319537 A1 | 11/2016 | Rinne et al. |
| 2017/0101776 A1 | 4/2017 | White |
| 2017/0183875 A1 | 6/2017 | Ndobo-Epoy et al. |
| 2017/0282510 A1 | 10/2017 | Peet et al. |
| 2017/0313630 A1 | 11/2017 | Peet et al. |

FOREIGN PATENT DOCUMENTS

| | | |
|---|---|---|
| EP | 0319390 B1 | 4/1991 |
| FR | 2636657 A1 | 3/1990 |
| FR | 3026762 A1 | 4/2016 |
| GB | 1590450 A | 6/1981 |
| GB | 2491933 A | 12/2012 |
| KR | 101523898 B1 | 6/2015 |
| WO | 2007031290 A1 | 3/2007 |
| WO | 2013079076 A1 | 6/2013 |
| WO | 2015095786 A1 | 6/2015 |
| WO | 2015117154 A1 | 8/2015 |
| WO | 2018064305 A1 | 4/2018 |

OTHER PUBLICATIONS

Carpino, Elaina et al., "Delivering Energy Efficiency to the Top of the House," High Performance Conditioned Attic System, Owens Corning, dated Mar. 10, 2015, pp. 1-26.

"L'étanchéitéà l'air Autrement—Présentation et mise en œuvre," Système RT Plus, Jan. 2016, 9 pages, Knauf Insulation.

"SOFTR® Duct Wrap FRK Product Data Sheet," Sep. 2010, 4 pages, Owens Corning, US.

International Search Report & Written Opinion for PCT/US2017/053963, dated Jan. 9, 2018, 15 pages.

2.000 IN Barbed U-Channel, posted at web.archive.org, posting date Sep. 22, 2013, accessed Jun. 28, 2018. url: https://web.archive.org/web/20130922053547/http://seagateplastics.com:80/Stock_Plastics_Catalog/catalog/plastic_c_channels.html, 2013.

Aluminum Recessed U-Channel for 10mm Glass Shower Screens, posted at wholesaleglasscompany.co.uk, accessed Jun. 27, 2018. url: https://www.wholesaleglasscompany.co.uk/acatalog/Aluminum-Recessed-U-Channel-for-10mm-Glass-Shower-Screens.html, 2018.

Aluminum U channel profile, posted at alcaglas.com, accessed Jun. 27, 2018, url: http://www.alcaglas.com/gb/producto.php?codigo=perfil-u-aluminiov02820, 2018.

Insert Channel, posted at schematech.co.za, accessed Jun. 27, 2018, url: http://www.schematech.co.za/showers/metal-profiles/u-channel/insert-channel-8mm-1000mm.html, 2018.

Plastic Upholstery J-Clips, posted at trimlok.com, accessed Jun. 27, 2018, url: https://www.trimlok.com/plastic-extrusion/upholstery-clips, 2018.

12 Gauge Self Adhesive Stick Insulation Pin/insulaton Hanger, posted at alibaba.com, accessed Jul. 18, 2018, url: https://www.alibaba.com/product-detail/12-gauge-self-adhesive-stick-insulation_60573332407.html, 2018.

62mm Self Adhesive Insulation Hanger, posted at tdsupplies.co.uk, accessed Jul. 18, 2018, url: http://www.tdsupplies.co.uk/stick-pins, 2018.

Cup Head Pin and Paper Washer, posted at soundacousticsolutions.com, accessed Jul. 18, 2018, url: https://www.soundacousticsolutions.com/products/cup-head-pins-paper-washer-6855, 2018.

Duro Dyne Dynastick Self Adhesive Insulation Hangers, posted at amazon.com, accessed Jul. 18, 2018, url: https://www.amazon.com/Duro-Dyne-Dynastick-Insulation-SAH114/dp/B00DODP122, published Jun. 27, 2018.

Perforated Base Insulation Hanger, posted at techlite.com, accessed Jul. 18, 2018, url: https://www.techlite.com/techlite-acoustics/perforated-base-insulation-hanger, 2018.

* cited by examiner

SYSTEMS, METHODS, AND APPRATUSES FOR INSULATING ADJACENT TO A TOP OF AN ATTIC

CROSS-REFERENCE TO RELATED APPLICATIONS

This application is a continuation application of U.S. patent application Ser. No. 15/718,246 filed Sep. 28, 2017 entitled "SYSTEM, METHODS AND APPARATUSES FOR INSULATING ADJACENT TO A TOP OF AN ATTIC" and naming as inventors Jean-Philippe NDOBO-EPOY et al., which application claims priority under 35 U.S.C. § 119 to U.S. Provisional Patent Application No. 62/402,219, entitled "SYSTEM, METHOD AND APPARATUS FOR INSULATING ADJACENT A TOP OF AN ATTIC," filed on Sep. 30, 2016, and naming as inventors Conor Patrick MCDONALD et al., and claims priority to U.S. Provisional Patent Application No. 62/402,465, entitled "ALTERNATIVE SYSTEM, METHOD AND APPARATUS FOR INSULATING ADJACENT A TOP OF AN ATTIC," filed on Sep. 30, 2016, and naming as inventors Conor Patrick MCDONALD et al., and claims priority to U.S. Provisional Patent Application No. 62/446,160, entitled "SYSTEM, METHOD AND APPARATUS FOR INSULATION SUPPORTING SYSTEM," filed on Jan. 13, 2017 and naming as inventors Jean-Philippe NDOBO-EPOY et al., and claims priority to U.S. Provisional Patent Application No. 62/466,680, entitled "SYSTEM AND METHOD FOR STRUCTURAL INSULATION," filed on Mar. 3, 2017, naming as inventors Jean-Philippe NDOBO-EPOY et al., which applications are assigned to the current assignee hereof and are incorporated by reference herein in their entireties.

BACKGROUND OF THE INVENTION

Field of the Disclosure

The present invention relates in general to insulation and, in particular, to a system, method and apparatus for insulating a building adjacent a top of an attic of the building.

Description of the Related Art

In the southern U.S., the heating, ventilating and air conditioning (HVAC) ducts are traditionally installed in the attics of homes because of the lack of space in the house. These homes rarely have basements due to flooding threats (southeast) or earthquake threats (southwest). Most HVAC ducts have partial leaks, and significant energy is lost if they are placed above the insulation in the attics. It is common practice to locate HVAC ducts in the conditioned space.

In January 2017, the state of California introduced new options to either add more insulation under or above the roof deck in addition to the existing insulation on the attic floor. Alternately, the same level of insulation (R30 to R38, depending on the climate zone) may be placed under the roof deck to ensure that all HVAC ducts are located in the insulated space.

Homes with insulation between attic roof rafters provide the best configuration for the HVAC in the attics. However, most roof rafters are 2×4 inches or 2×6 inches, which are far too small to reach the R-values (e.g., R30 to R49) required by building codes with traditional insulation, such as fiberglass or cellulose. A solution is required to insulate both between and below the rafters. If the attic is not ventilated, such designs also have a higher risk regarding moisture management.

Some basic solutions have been used by insulation contractors for decades, such as adding wood lumber (e.g., 2×6 inch or 2×8 inch beams) to roof rafters, or attaching wood I-joists of the desired height. However, these solutions increase the weight of the roof, which requires alteration of the truss structural design. Moreover, these solutions are time consuming to install, introduce residual thermal bridges (wood) and provide no continuous layer of insulation.

Another solution is disclosed in WO 2015/117154, which uses a fabric for a blown-in blanket system (BIBS). However, this system is quite time consuming to install since it requires the entire roof to be airtight with caulking at each junction between the rafters and the external sheathing of the roof deck. This can be difficult to achieve with complex truss designs, roof hips, valleys, crossed trusses, etc. It also requires the addition of a "diffusion port" (e.g., an airtight opening with a vapor open roof membrane) at the ridge vent and at the top of the hips to avoid moisture issues, in addition to requiring the ridge vent to be made airtight with house wrap.

Moreover, the BIBS membrane must be correctly folded and stapled before blowing the insulation, which produces sagging due to the weight of the insulation since the folds are not attached to anything Such a configuration makes it almost impossible to have a well defined and consistent thickness and R-value. This is due to membrane sag from the weight of the blown insulation, which leaves gaps between the membrane and the insulation. This issue may be addressed by increasing the density of the insulation to ensure that the cavity is correctly filled.

In addition, if the rafters are not perfectly aligned there must be a manual adjustment of the folding of the fabric with a ruler, which is even more time consuming. This system also is limited since a load cannot be attached to it, such as gypsum boards to form a finished ceiling for a room in the attic. Furthermore, this solution is limited to U.S. climate zones 1 to 3, with residual questions regarding the long-term durability without an internal vapor retarder during cold winters in climate zone 3.

Solutions exist to address some of these issues, such as the Suspente Integra2 system from Saint-Gobain Isover France. See U.S. Pub. No. 2011/0016816, which is incorporated herein by reference in its entirety. That solution attaches a second layer of insulation below the rafters to enhance airtightness and moisture management. This is achieved by clipping a smart vapor retarder membrane behind gypsum boards, while maintaining a space for cables and the like, with metallic rails that retain the gypsum boards. Nevertheless, this metallic solution is not adapted to the U.S. residential market, which uses only wooden studs and rafters, not metal rails like commercial buildings.

In addition, recent building code and program requirements are driving the need for easier and more effective methods of compartmentalization that also meet code fire safety requirements. For example, the 2012 International Energy Conservation Code (IECC) requires airtightness of 3 ACH50 test pressure for single-family and multifamily construction in climate zones 3-8 and is being adopted more throughout the United States. For commercial buildings, Leadership in Energy & Environmental Design (LEED) has a similar compartmentalization requirement, as does the American Society of Heating and Air-Conditioning Engineers (ASHRAE) Standard 189. Since conventional solutions make achieving the new whole-building air tightness requirement very difficult, improvements in insulation systems continue to be of interest.

SUMMARY

Embodiments of a system, method and apparatus for insulating near the top of an attic are disclosed. The attic may include rafters that support a roof deck. In an example, a hanger for supporting insulation in the attic may include a beam having an axis and an elongated profile in an axial direction. The elongated profile may have a proximal end configured to be coupled only to the rafters but not to the roof deck. The proximal end may be planar and configured to be substantially parallel to the roof deck when installed. A distal end of the beam may be substantially planar and parallel to the proximal end. A web that is substantially planar may extend substantially perpendicular to and between the proximal end and the distal end. An insulation space is defined along the web between the proximal and distal ends. In addition, the distal end may be configured to be coupled to an insulation batt located in the insulation space.

In another embodiment, a system for insulating an attic of a building is disclosed. The building may include a roof with a roof deck, and rafters supporting the roof deck inside the attic. The system may include beams for supporting insulation in the attic. Each of the beams may include an axis and an elongated profile in an axial direction. The elongated profile may include a proximal end mounted only to the rafters but not to the roof deck. The proximal end can be planar and substantially parallel to the roof deck. The beam may include a distal end that is substantially planar and parallel to the proximal end. A web that is substantially planar may extend substantially perpendicular to and between the proximal end and the distal end. An insulation space is defined along the web between the proximal and distal ends. The system may further include insulation batts mounted to and between adjacent ones of the beams in the insulation spaces. Each of the insulation batts may include an insulation material and an outer layer that faces the distal ends of the beams. The outer layer may make it possible to achieve an airtightness of ACH50<3. A first tape may be applied to the distal ends of the beams and to the outer layers of the insulation batts to form airtight barriers therebetween. The airtight barriers also may make it possible to achieve ACH50<3.

An embodiment of a method of insulating an attic of a building having a roof with a roof deck, and rafters supporting the roof deck inside the attic, also is disclosed. The method may include providing beams comprising an elongated profile in an axial direction; fastening only proximal ends of the beams to the rafters; positioning insulation batts on distal ends of adjacent ones of the beams, each of the insulation batts comprising an insulation material and an outer layer facing the distal ends of the beams. The outer layer may include an airtightness of ACH50<3. In addition, the method may include applying a tape to the distal ends of the beams and to the outer layers of the insulation batts to form airtight barriers therebetween. The airtight barriers may include the airtightness of ACH50<3.

In still another embodiment, a hanger may include a beam having an axis and a profile in an axial direction. The profile may include a distal end that is elongated in the axial direction and substantially planar. Straps may extend from the distal end. The straps can be substantially planar and perpendicular to the distal end. Each strap may include a proximal end that is planar and configured to be coupled to a respective rafter. An insulation space is defined along the straps between the proximal ends and distal end. The distal end may be configured to be coupled to an insulation batt located in the insulation space.

Embodiments of an alternative system, method and apparatus for insulating adjacent a top of an attic are also disclosed. For example, a system insulates an attic of a building having a roof with a roof deck, and rafters supporting the roof deck inside the attic. The system may include brackets aligned and mounted to the rafters, and beams attached to the brackets such that the beams are suspended from the rafters via the brackets. In addition, insulation batts may extend between the beams, and tape may be used to secure the insulation batts to the beams.

In another embodiment, a hanger for supporting insulation in an attic is disclosed. The hanger may include a beam having an axis and an elongated profile in an axial direction. The elongated profile may include a proximal end configured to be coupled to the rafters, a distal end spaced apart from the proximal end, and a web extending between the proximal end and the distal end. An insulation space may be defined along the web between the proximal and distal ends. The distal end may be configured to be coupled to an insulation batt located in the insulation space. In addition, the beam may include a folded position wherein the beam is folded such that the web is not perpendicular to the proximal and distal ends. The beam also may have an installation position wherein the web is substantially perpendicular to the proximal and distal ends.

An alternative embodiment of a hanger for supporting insulation in an attic may include a beam having an axis and an elongated profile in an axial direction. The elongated profile may include proximal ends configured to be coupled to the rafters, a distal end spaced apart from the proximal ends, and a web extending between the proximal ends and the distal end. An insulation space may be defined along the web between the proximal and distal ends. The distal end may be configured to be coupled to an insulation batt located in the insulation space. In addition, the web may include a solid section that spans an entirety of the elongated profile, and a segmented section that engages respective ones of the proximal ends, with voids in the segmented section that extend from the proximal ends to the solid section.

According to another aspect, an insulation system may include an insulation layer, an atmospheric regulation layer, a structural support, and an external surface. The atmospheric regulation layer may be supported by the structural support. The insulation layer may be located between the atmospheric regulation layer and the external surface. The insulation layer can have a thickness that extends from the atmospheric regulation layer to an external surface. The thickness of the insulation layer may have a unitary construction. The atmospheric regulation layer may have a water vapor permeability of not greater than 3 perms at a relative humidity of 25% as measured by ASTM E96 Procedure A Dry Cup, and a water vapor permeability of at least 6 perms at a relative humidity of 75% as measured by ASTM E96 Procedure B Wet Cup. The atmospheric regulation layer may have a fire class A rating as measured by ASTM E84. The atmospheric regulation layer may have an ACH50 value of not greater than 10, or not greater than 5, or not greater than 3, or not greater than 1.5, or not greater than 0.6, where ACH50 represents an air exchange at 50. Pascals.

According to yet another aspect, an insulation system may include an insulation layer, an atmospheric regulation layer, a structural support, and an external surface. The atmospheric regulation layer may be supported by the structural support. The insulation layer may be located between the atmospheric regulation layer and the external surface. The insulation layer may be substantially uniform. The atmospheric regulation layer may have a water vapor permeability of not greater than 3 perms at a relative humidity of 25% as measured by ASTM E96 Procedure A Dry Cup, and a water vapor permeability of at least 6 perms at a relative humidity of 75% as measured by ASTM E96 Procedure B Wet Cup. The atmospheric regulation layer may have a fire class A rating as measured by ASTM E84. The atmospheric regulation layer may have an ACH50 value of not greater than 10, or not greater than 5, or not greater than 3, or not greater than 1.5, or not greater than 0.6, where ACH50 represents an air exchange at 50 Pascals.

According to still another aspect, an insulation system may include an insulation layer, an atmospheric regulation layer, a structural support, and an external surface. The atmospheric regulation layer may be supported by the structural support. The insulation layer may be located between the atmospheric regulation layer and the external surface. The atmospheric regulation layer may be bonded to the insulation layer. The atmospheric regulation layer may have a water vapor permeability of not greater than 3 perms at a relative humidity of 25% as measured by ASTM E96 Procedure A Dry Cup, and a water vapor permeability of at least 6 perms at a relative humidity of 75% as measured by ASTM E96 Procedure B Wet Cup. The atmospheric regulation layer may have a fire class A rating as measured by ASTM E84. The atmospheric regulation layer may have an ACH50 value of not greater than 10, or not greater than 5, or not greater than 3, or not greater than 1.5, or not greater than 0.6, where ACH50 represents an air exchange at 50. Pascals.

According to yet another aspect, a method of insulating a surface can include mounting a structural support parallel to an external surface, providing an atmospheric regulation layer and an insulation layer, placing the atmospheric regulation layer and the insulation layer such that the insulation layer is located between the atmospheric regulation layer and the external surface, and the atmospheric regulation layer is supported by the structural support. The insulation layer can have a thickness that extends from the atmospheric regulation layer to an external surface. The thickness of the insulation layer may have a unitary construction. The atmospheric regulation layer may have a water vapor permeability of not greater than 3 perms at a relative humidity of 25% as measured by ASTM E96 Procedure A Dry Cup, and a water vapor permeability of at least 6 perms at a relative humidity of 75% as measured by ASTM E96 Procedure B Wet Cup. The atmospheric regulation layer may have a fire class A rating as measured by ASTM E84. The atmospheric regulation layer may have an ACH50 value of not greater than 10, or not greater than 5, or not greater than 3, or not greater than 1.5, or not greater than 0.6, where ACH50 represents an air exchange at 50 Pascals.

According to another aspect, a method of insulating a surface can include mounting a structural support parallel to an external surface, providing an atmospheric regulation layer and an insulation layer, placing the atmospheric regulation layer and the insulation layer such that the insulation layer is located between the atmospheric regulation layer and the external surface, and the atmospheric regulation layer is supported by the structural support. The insulation layer may be substantially uniform. The atmospheric regulation layer may have a water vapor permeability of not greater than 3 perms at a relative humidity of 25% as measured by ASTM E96 Procedure A Dry Cup, and a water vapor permeability of at least 6 perms at a relative humidity of 75% as measured by ASTM E96 Procedure B Wet Cup. The atmospheric regulation layer may have a fire class A rating as measured by ASTM E84. The atmospheric regulation layer may have an ACH50 value of not greater than 10, or not greater than 5, or not greater than 3, or not greater than 1.5, or not greater than 0.6, where ACH50 represents an air exchange at 50 Pascals.

According to another aspect, a method of insulating a surface can include mounting a structural support parallel to an external surface, providing an atmospheric regulation layer and an insulation layer, placing the atmospheric regulation layer and the insulation layer such that the insulation layer is located between the atmospheric regulation layer and the external surface, and the atmospheric regulation layer is supported by the structural support. The atmospheric regulation layer may be bonded to the insulation layer. The atmospheric regulation layer may have a water vapor permeability of not greater than 3 perms at a relative humidity of 25% as measured by ASTM E96 Procedure A Dry Cup, and a water vapor permeability of at least 6 perms at a relative humidity of 75% as measured by ASTM E96 Procedure B Wet Cup. The atmospheric regulation layer may have a fire class A rating as measured by ASTM E84. The atmospheric regulation layer may have an ACH50 value of not greater than 10, or not greater than 5, or not greater than 3, or not greater than 1.5, or not greater than 0.6, where ACH50 represents an air exchange at 50. Pascals.

The foregoing and other objects and advantages of these embodiments will be apparent to those of ordinary skill in the art in view of the following detailed description, taken in conjunction with the appended claims and the accompanying drawings.

BRIEF DESCRIPTION OF THE DRAWINGS

So that the manner in which the features and advantages of the embodiments are attained and can be understood in more detail, a more particular description may be had by reference to the embodiments thereof that are illustrated in the appended drawings. However, the drawings illustrate only some embodiments and therefore are not to be considered limiting in scope as there may be other equally effective embodiments.

The use of the same reference symbols in different drawings indicates similar or identical items.

DETAILED DESCRIPTION

Figure 1:
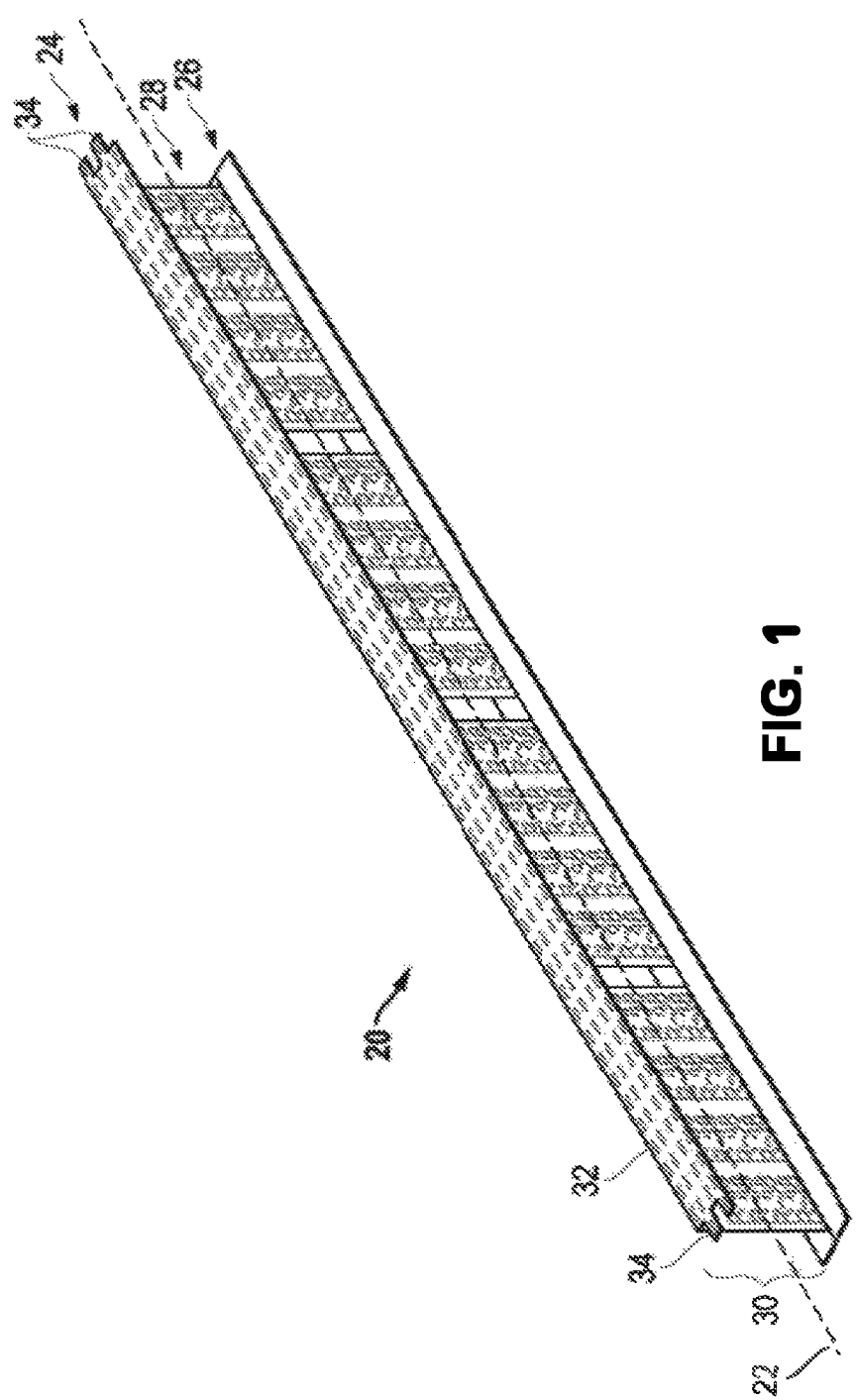
FIG. 1 is a top, front isometric view of an embodiment of a beam for supporting insulation.
Figure 2:
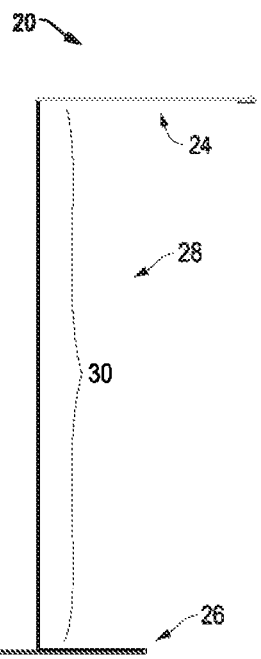
FIGS. 2-4 are end, front and top views, respectively, of the beam of FIG. 1.
Figure 3:
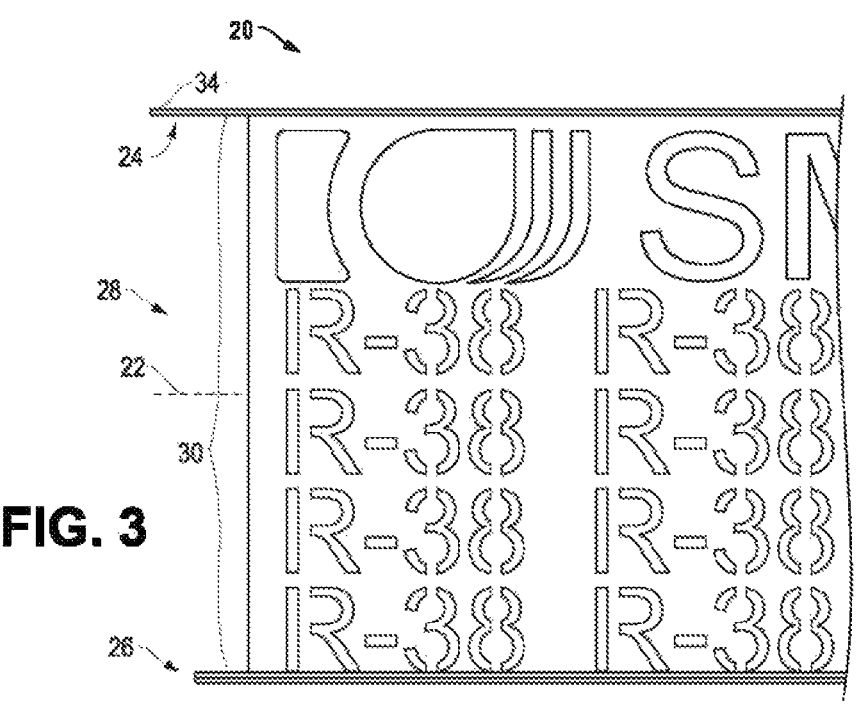
Figure 4:
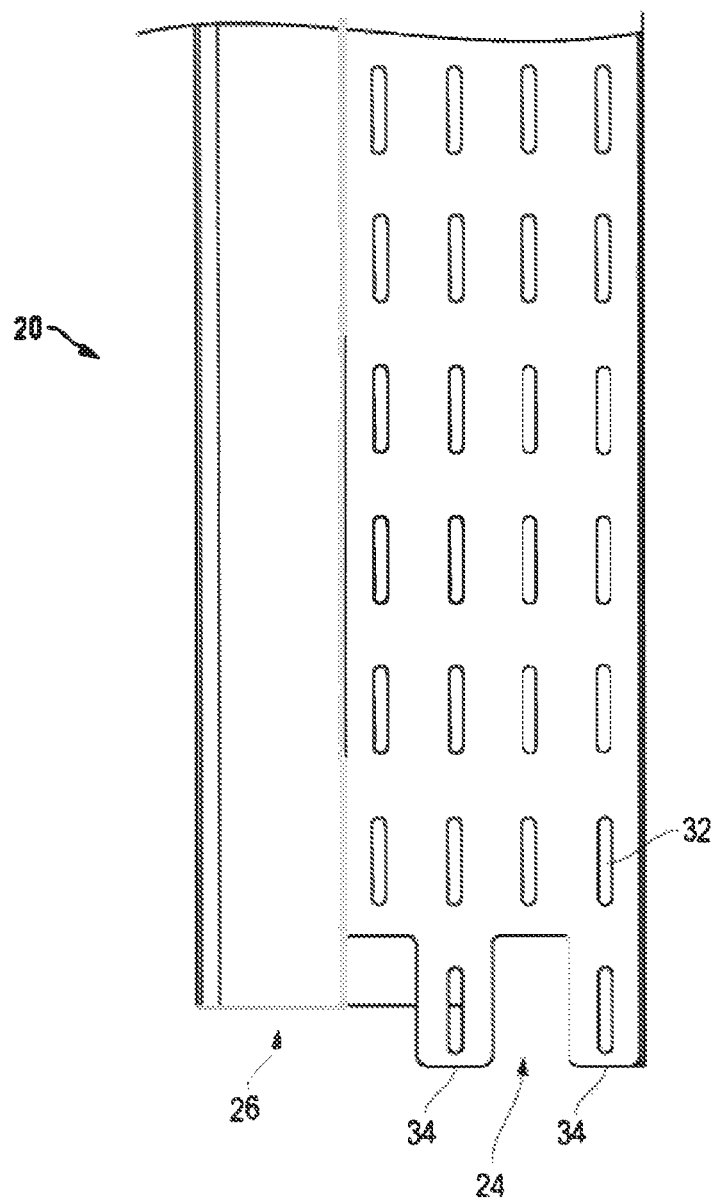
Figure 5:
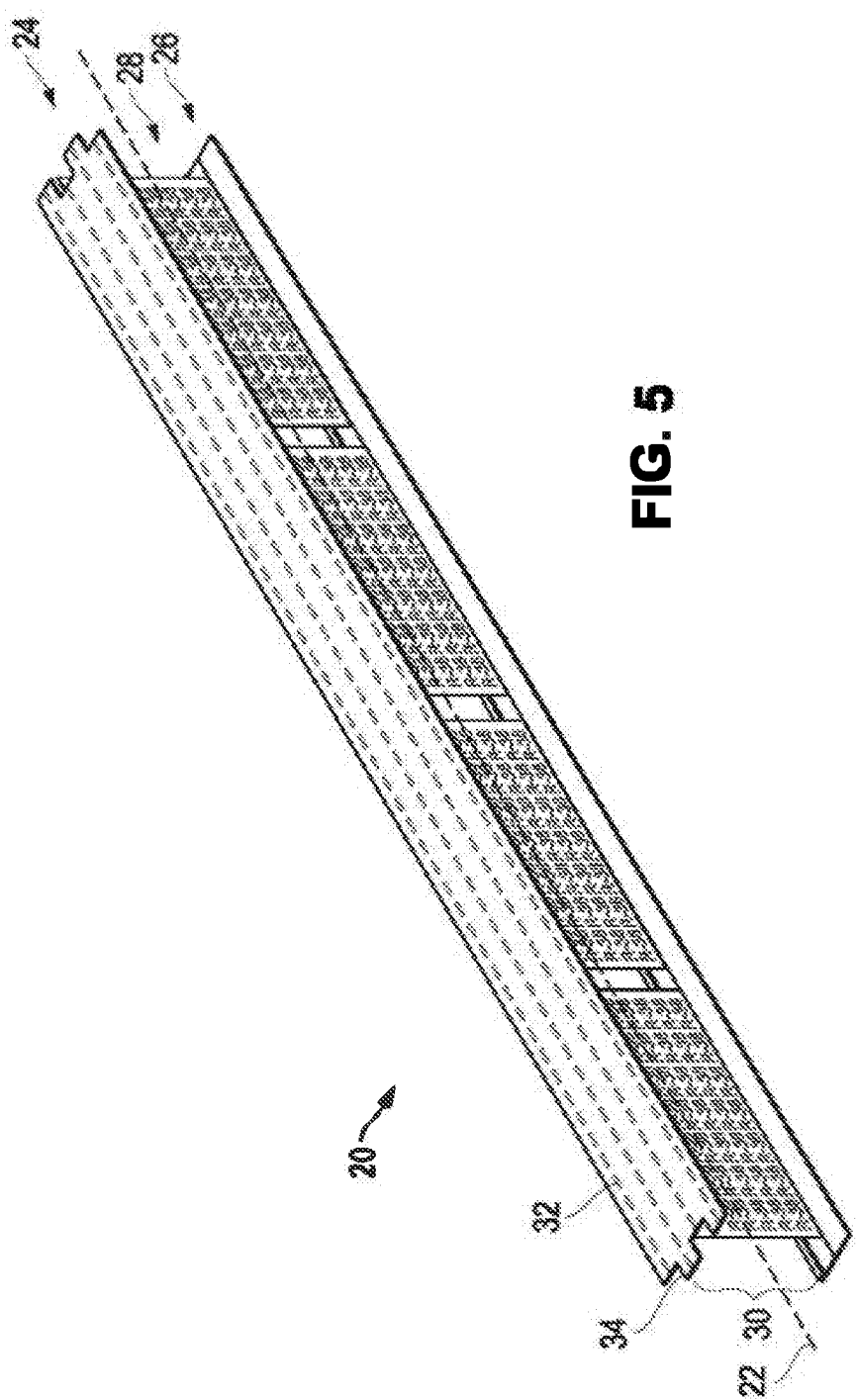
FIG. 5 is a top, front isometric view of another embodiment of a beam for supporting insulation.
Figure 6:
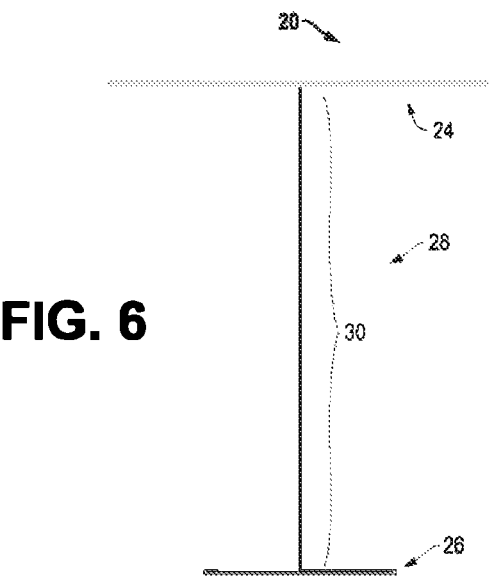
FIGS. 6-8 are end, front and top views, respectively, of the beam of FIG. 5.
Figure 7:
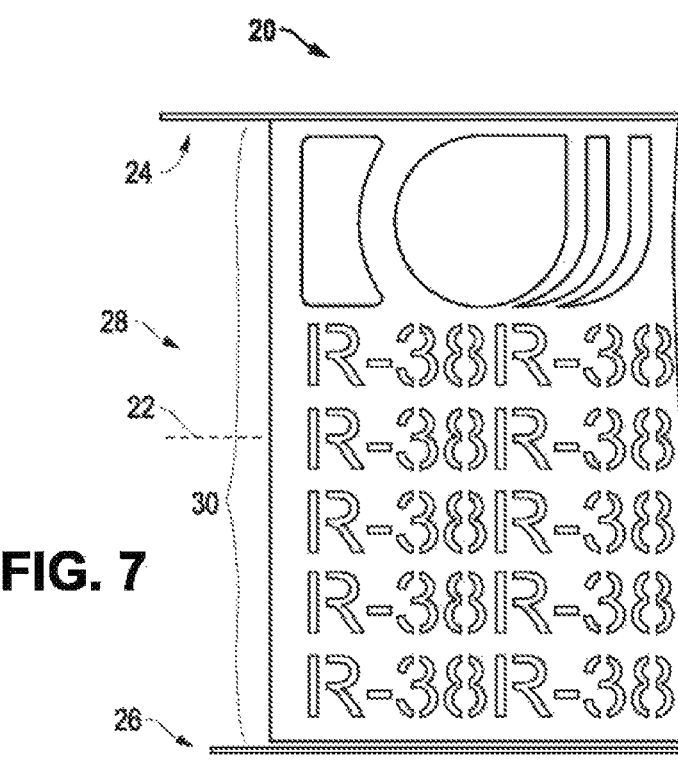
Figure 8:
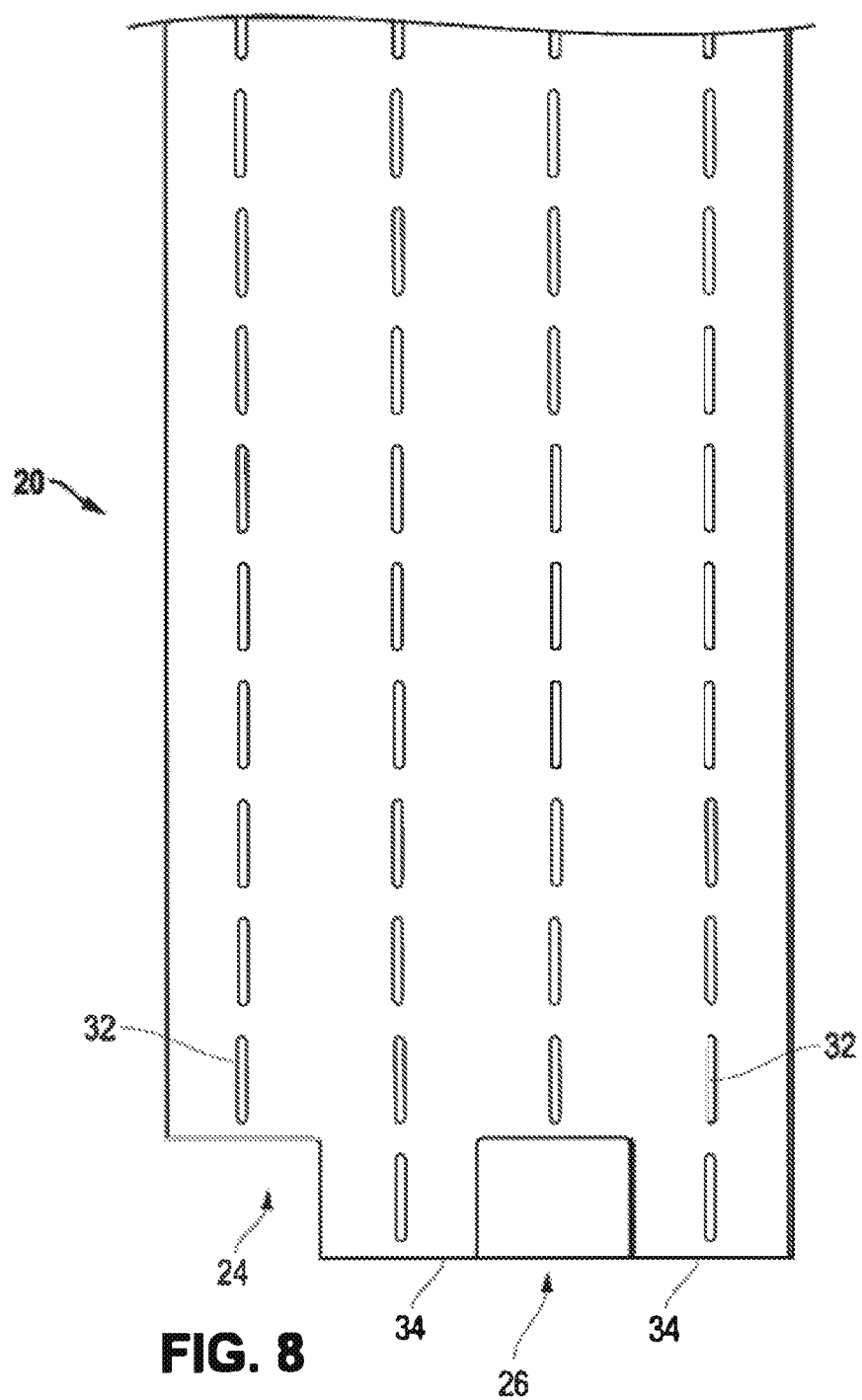

Embodiments of a system, method and apparatus for insulating adjacent a top of an attic are disclosed. For example, FIGS. 1-4 depict a hanger for supporting insulation in an attic having rafters that support a roof deck. The hanger may include a beam 20 having an axis 22 and an elongated profile in an axial direction. FIGS. 1-4 depict a J-beam version of the beam. FIGS. 5-9 depict an I-beam version of the beam 20. In addition, the beam may be a C-beam or an S-beam. For some applications, the I-beam or J-beam designs may be preferable since the flanges can support insulation on both sides of the beam. For other applications, one side of the C-beam or S-beam can secure the insulation between beams only by friction before stapling and taping the facing.

Versions of the elongated profile may include a proximal end 24. The proximal end 24 may be configured to be coupled only to the rafters but not to the roof deck. In one example, the proximal end 24 of the beam 20 may be attached only to bottom surfaces of the rafters.

The proximal end 24 can be planar and may be configured to be substantially parallel to the roof deck when installed. The elongated profile may further include a distal end 26. The distal end 26 can be substantially planar and parallel to the proximal end 24. In addition, the elongated profile may include a web 28. The web 28 can be substantially planar. The web 28 may extend substantially perpendicular to and between the proximal end 24 and the distal end 26.

An insulation space 30 may be defined along the web 28 between the proximal and distal ends 24, 26. As will be discussed in further detail, the distal end 26 may be configured to be coupled to an insulation batt located in the insulation space 30. The beam 20 may be configured to support fiberglass batts without any additional support members, such as strapping or support membranes.

Embodiments of the beam 20 may comprise a polymer. For example, the beam 20 may comprise one or more of the following materials: thermoplastics, injection molding plastics, virgin polyvinylchloride (PVC), recycled PVC, foamed PVC, CPVC, acrylonitrile butadiene styrene (ABS), polyether ether ketone (PEEK), polymethyl methacrylate (PMMA), polyimide, thermoplastic olefin (TPO), nylon, etc., and glass-reinforced versions of the aforementioned materials. Versions of the beam 20 may consist only of a polymer. In some embodiments, at least portions of the beam 20 can be at least one of extruded and injection molded. Examples of the beam 20 may be readily cut, such as with a manual tool like snips. In one example, the beams 20 are not metallic. Apertures or holes in the beam 20 may be employed to reduce its weight and reduce thermal bridge issues.

In other embodiments, portions of the beam 20 may be formed from more than one material, such as different materials. For example, a first portion of the beam 20 may include glass-reinforced PVC, and a second portion of the beam may include PVC. Portions of the beam 20 may have different coefficients of thermal expansion.

Versions of the beam 20 may include a specific coefficient of thermal expansion (CTE). For example, the CTE can be not greater than about 100E-06 in/(in·F), such as not greater than about 80E-06 in/(in·F), not greater than about 60E-06 in/(in·F), not greater than about 50E-06 in/(in·F), not greater than about 40E-06 in/(in·F), not greater than about 30E-06 in/(in·F), not greater than about 20E-06 in/(in·F), or even not greater than about 10E-06 in/(in·F). In other examples, the CTE can be in a range between any of these values.

In some embodiments, the beam 20 may subjected to a bending moment due to the attic truss design. For example, the maximum acceptable deformation may be expressed by the following description: with the beam positioned horizontally, attached by its proximal end to a rafter, for each linear foot of beam, the application of a load of 0.5 lb at the distal end, 10 inches from the proximal end of the beam, will impart a maximum vertical deflection of not greater than about 2 inches. This corresponds to an angle or deflection of about 5 degrees. In other embodiments, the maximum vertical deflection can be not greater than about 1 inch, or even not greater than about 0.1 inches (i.e., no perceived deformation).

The beam 20 can have any length between about 1 foot and about 20 feet. In some versions, the length of beam 20 can be about 6 feet to about 8 feet to better enable handling by only one person. The beams can be installed by the framers installing the attic trusses and the external roof sheathing. Insulation contractors can install the insulation and the tape. Such installation may be preferable for longer versions of the beams 20 (e.g., 8 feet and longer). For shorter versions of the beams (e.g., under 8 feet), it may be preferable for the insulation contractors to install both the beams 20 and the insulation.

Examples of the web 28 may, under its own weight, have a maximum deflection. In some versions, the maximum deflection of the web 28 can be about 10 degrees relative to normal with respect to the proximal end 24 and the distal end 26. In other examples, the maximum deflection can be about 8 degrees, such as about 6 degrees, about 5 degrees, about 4 degrees, about 3 degrees, about 2 degrees, or even about 1 degree. In other examples, the maximum deflection can be in a range between any of these values.

As noted above, examples of the beam 20 may be perforated to reduce weight, thermal expansion, shrinkage and thermal bridge issues. In some versions, the proximal end 24 may include perforations 32. Embodiments of the perforations 32 may include parallel rows of slits. The slits may be at least one of rounded, oblong and rectangular. In one example, the web 28 may be perforated. In another example, the distal end 26 is not perforated.

In some embodiments of the beam 20, each end of the elongated profile may comprises tabs 34 configured to engage a second beam 20. In one version, the tabs 34 may be located only on the proximal end 24.

Figure 9:
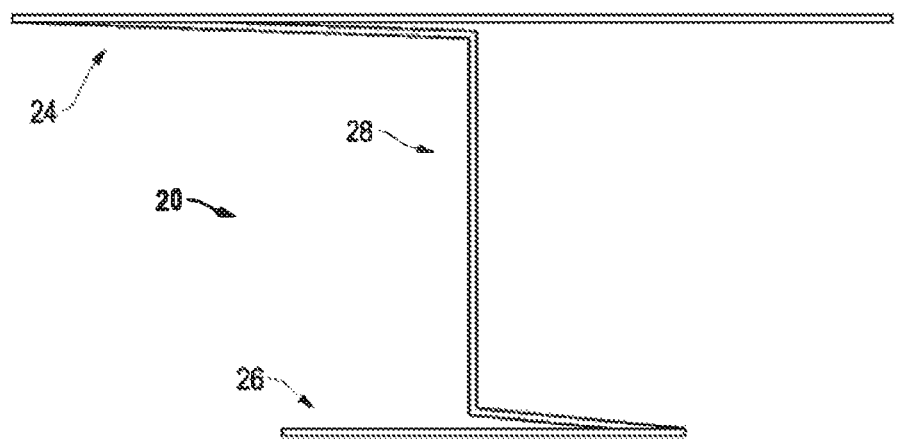
FIG. 9 is a schematic end view of the beam of FIG. 5 shown prior to final assembly.

As shown in FIG. 9, the beam 20 may comprise a single layer of material, such as polymer material. The material may be folded or thermoformed into a final sectional shape in the axial direction. In addition, the final sectional shape may be bonded, sonic welded or heat staked with ribbed edges. Alternatively, the beam 20 may be formed as a profile extrusion.

Figure 10:
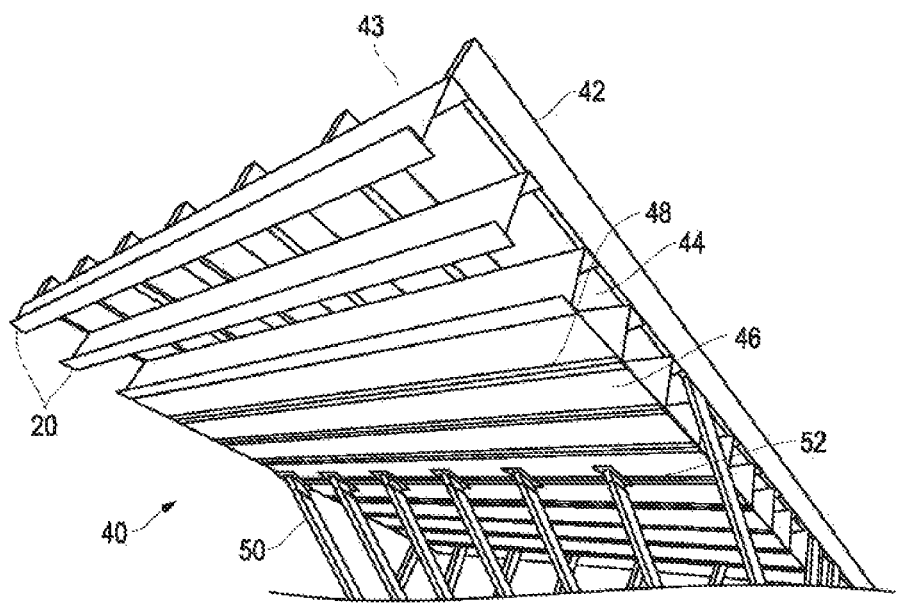
FIG. 10 is a bottom isometric view of an attic with an embodiment of a system for insulating the attic, and the system is shown partially installed.
Figure 11:
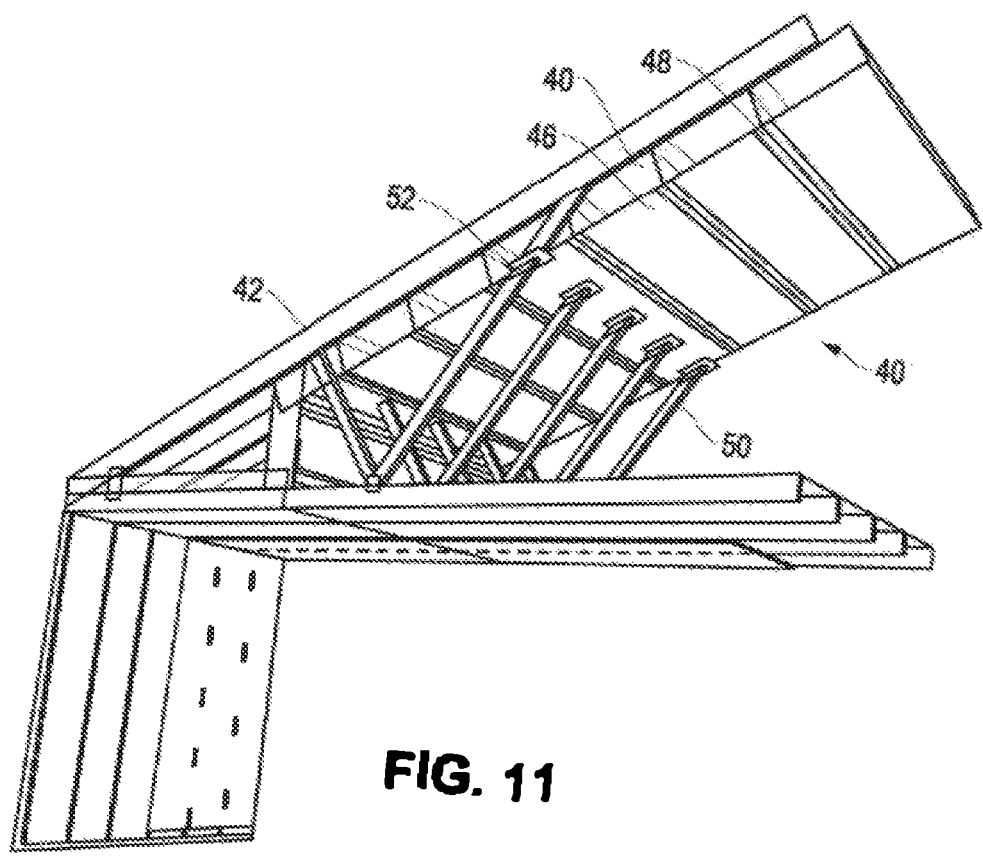
FIG. 11 is a bottom isometric view of an attic with another embodiment of a system for insulating the attic.

FIGS. 10 and 11 depict embodiments of a system for insulating an attic 40 of a building. The building may include a roof with a roof deck, and rafters 42 supporting the roof deck inside the attic 40. The system may include beams 20 for supporting insulation 44 in the attic 40. Each of the beams 20 may include features from any of the embodiments described herein. The beams 20 may be transverse to the rafters 42. The proximal ends 24 of the beams 20 may be mounted to the rafters 42 with fasteners, such as staples, nails or screws. The system may further include a ventilated air gap 43 between the roof deck and an upper portion of the system.

In some embodiments, the insulation may be placed below the rafters 42, and the ventilated air gaps 43 may be located between the soffit and the ridge vent at the top of the roof. Alternatively, ventilation openings (e.g., O'Hagin vents) may be employed directly on the roof sheathing. These solutions can permit the insulation to avoid moisture accumulation (regardless of the climate zone) using natural convection and wind. To limit convection in the insulation, ventilation baffles can be stapled to the roof sheathing to provide a continuous air gap between the soffit and the ridge vent, as is traditionally done with blown insulation. In another embodiment, a facing may be employed on one side of the insulation near the roof deck to limit convection. The other side of the insulation can employ the smart vapor retarder inside the building. The air gap is then ensured by the thickness of the rafters themselves. For example, a typical 2×4 beam would provide a 3.5 inch air gap. In other examples, if the rafters are 2×6 or 2×8 beams, ventilation baffles such as conventional, baffles with a 1.5 inch thickness can be stapled to the roof deck. For some applications, a first layer of insulation may be placed between the rafters, and a second layer of insulation may be placed below the rafters to increase the level of insulation and decrease the thickness of insulation installed below the rafters.

In some versions, the beams 20 may be installed perpendicular to the trusses as shown on FIG. 10, which limits thermal bridging. However, the beams 20 also may be installed parallel to the trusses.

The insulation 44 may comprise insulation batts mounted to and between adjacent ones of the beams 20 in the insulation spaces 30. Each of the insulation batts of insulation 44 may include an insulation material and an outer layer 46 that faces the distal ends 26 of the beams 20. Examples of the outer layer 46 may comprise at least one of a fire class A (required for exposed surfaces in U.S. building codes), a smart vapor retarder (SVR) and kraft paper. Alternatively, the batts of insulation 44 may be unfaced with one or more outer layers.

Embodiments of the system may further include a first tape 48. For example, the first tape 48 may comprise an all weather flashing tape, such as 3M 8067 tape, from 3M Company, St. Paul, Minn., for example, or CertaTape from CertainTeed of Malvern, Pa. Versions of the system may include the first tape 48 being applied to the distal ends 26 of the beams 20, and to the outer layers 46 of the insulation batts.

The first tape 48 may be used to form airtight barriers between the components of the system. Such airtight barriers may include an airtightness of ACH50<3. In other embodiments of the system, the airtightness and the airtight barriers may comprise ACH50<2.5. Other versions may include ACH50<2.5, such as ACH50<2.0, ACH50<1.6, ACH50<1.0, ACH50<0.8, or even ACH50<0.6. In still other example, the airtightness and the airtight barriers can be in a range between any of these values.

Figure 12:
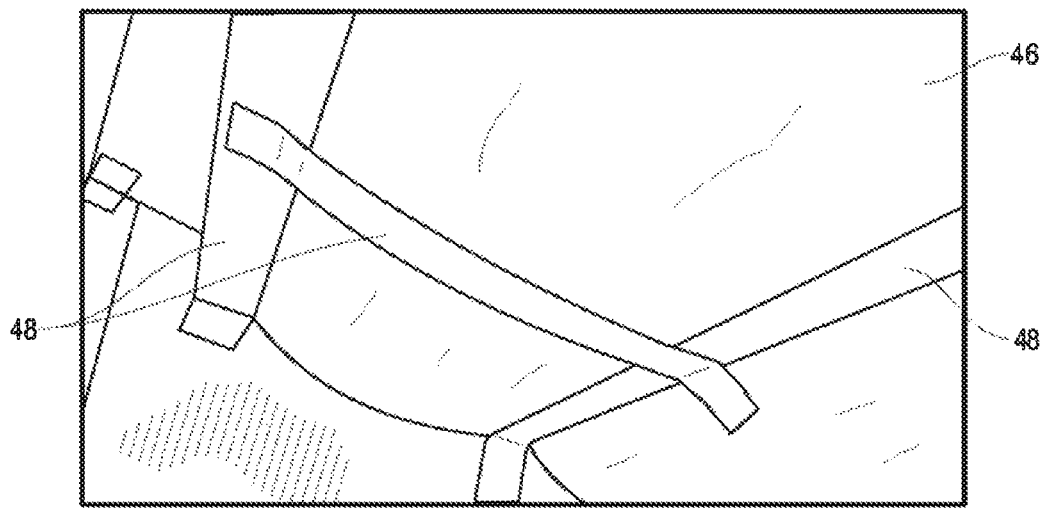
FIG. 12 is an enlarged, bottom isometric view of an attic with still another embodiment of a system for insulating the attic.

In some versions of the system, no material of the system extends between adjacent ones of the beams 20 other than the insulation batts that form insulation 44. For example, the system may include no other support members or support structures beneath the insulation 44, such as strapping, sheet barriers, etc. The facing of the insulation 44 may be stapled to the beams 20. The surface of the facing can be pulled straight in such a way that additional pieces are not required to correctly tape the junction between the batts. However, other versions of the system may include batt-only strips of tape 48 (FIG. 12) between abutting batt joints that are perpendicular to axes of the beams 20. In an example, the batt-only tape strips do extend between adjacent ones of the beams 20. In some versions, the batts of insulation 44 may be initially stapled to the beams 20 before taping.

Figure 13:
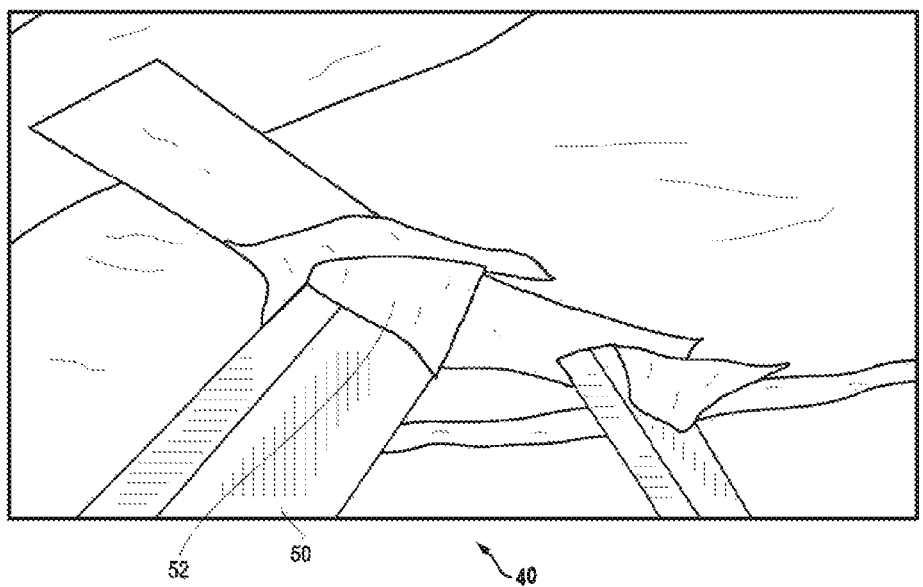
FIG. 13 is an enlarged, bottom isometric view of an attic with yet another embodiment of a system for insulating the attic.

In some applications, protrusions 50 (FIGS. 10, 11 and 13) of the attic 40 may extend through the batts of insulation 44. For example, the protrusions 50 may include other structural members, such as truss members, that further support the roof. Other examples of protrusions 50 may include vent pipes, plumbing components, ducts, conduits or other structures typically found in an attic or near a roof. Tape 48 may be applied between the protrusions 50 and the batts of insulation 44. Tape 48 may form airtight barriers between these components. Versions of the airtight barriers comprise ACH50<3, or less, as described elsewhere herein.

Other embodiments of the system may further include a second tape 52 that differs from the first tape 48. For example, the second tape 52 may comprise a stretch tape. Stretch tape may include an elongation capability of at least about 100%. Examples of stretch tape may include Certa- Flash stretch tape, by CertainTeed of Malvern, Pa., Isostretch tape from DuPont of Wilmington, Del., or ZIP System stretch tape, available from Huber Engineered Woods, Charlotte, N.C. The second tape 52 may be applied between the protrusions 50 and the batts of insulation 44 to form airtight barriers between the components. The airtight barriers comprise ACH50<3, or less, as described elsewhere herein.

Embodiments of a method of insulating the attic 40 of a building also are disclosed. For example, the method may include providing beams 20 comprising an elongated profile in an axial direction. Versions of the method may include fastening only proximal ends 24 of the beams 20 to the rafters 42. In some embodiments, the method includes positioning batts of insulation 44 on distal ends 26 of adjacent ones of the beams 20. Each of the batts of insulation 44 may include an insulation material and an outer layer 46 facing the distal ends 26 of the beams 20. The outer layer 46 may comprise an airtightness of ACH50<3, or better, as described herein.

Examples of the method may further include applying the first tape 48 to the distal ends 26 of the beams 20, and to the outer layers 46 of the batts of insulation 44. Airtight barriers may be formed between these components, as described herein. The airtight barriers comprising the airtightness of ACH50<3, or better, as previously discussed. In one embodiment, the method may further comprise extending no material between adjacent ones of the beams other than the insulation batts.

Figure 17:
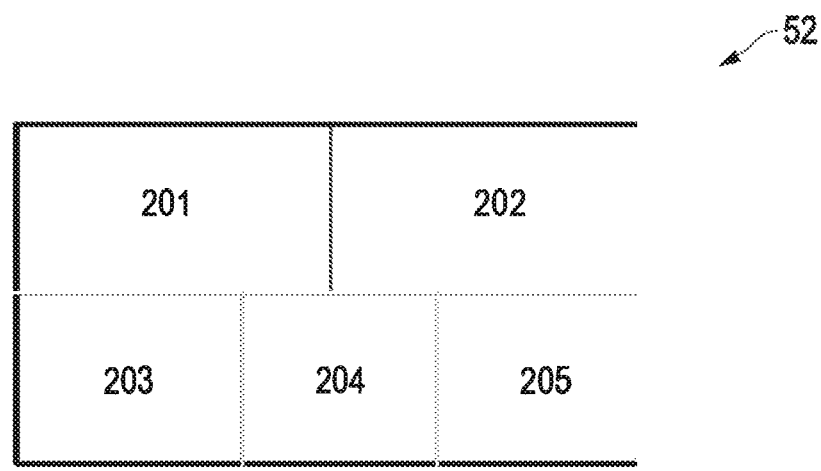
FIG. 17 is schematic view of an embodiment of tape showing release paper segments.

FIG. 17 depicts an embodiment of a back side of the second tape 52, showing its release liner in segments 201-205 that are pre-slit. Methodically removing the segments 201-205 and applying the second tape 52 to a protrusion 50 (FIG. 13) that extends through an insulation batt (as described herein) to form a substantially airtight seal significantly enhances installation speed and efficiency.

For example, the following sequence of steps represents an embodiment of a method of the application of the second tape 52. In one version, segment 204 is removed first. Segment 204 is about 2 inches wide so that it can be applied to and go around protrusions (e.g., rafters, trusses, etc.) having a width of 1.5 inches. With segment 204 removed, the second tape 52 can be applied on the front face of the protrusion. Next, segments 203 and 205 are removed so that second tape 52 can be stretched on the sides of the protrusion. In a final step, segments 201 and 202 are removed and the second tape 52 is stretched on the facing of the insulation batts.

In an alternate embodiment, the release liner on the back of the second tape 52 may include a single bisecting slit in the long direction. In this example, the bottom half of the liner (equivalent to the combination of segments 203-205) may be removed first. The second tape 52 would then be stretched and applied to the protrusion. The top half of the liner is then removed (equivalent to the combination of segments 201 and 202), and the second tape 52 would be stretched and applied to the insulation batt.

Figure 14:
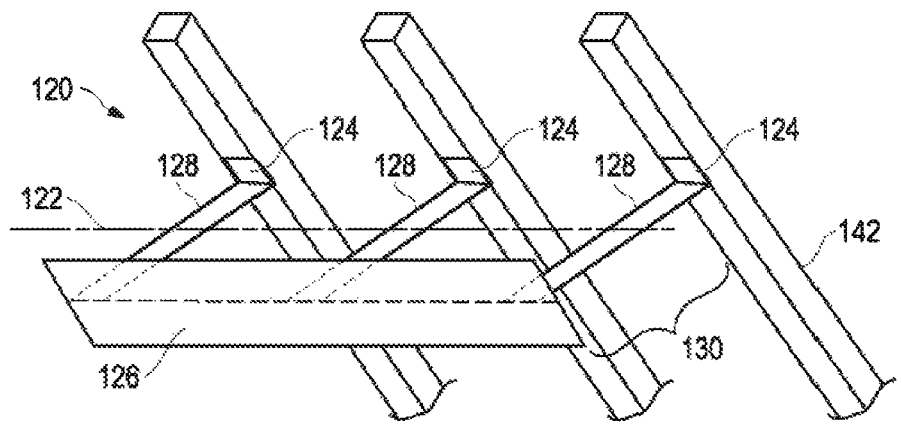
FIG. 14 is a bottom isometric view of an attic with an alternate embodiment of a system for insulating the attic.
Figure 15:
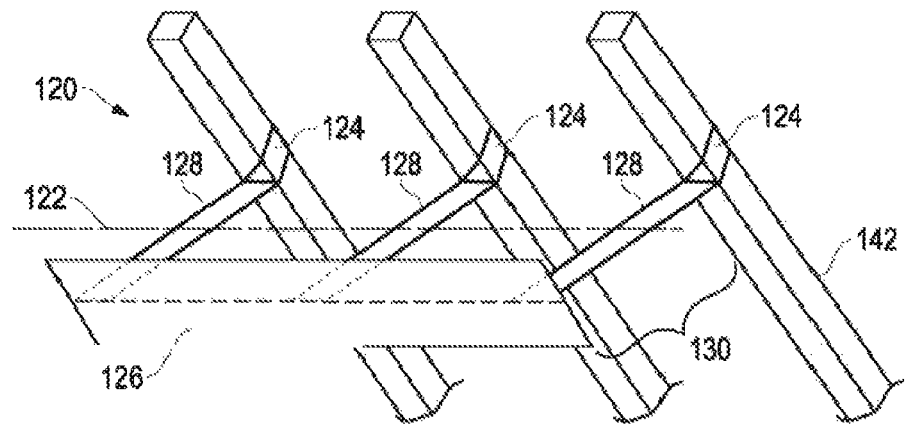
FIG. 15 is a bottom isometric view of an attic with another alternate embodiment of a system for insulating the attic.
Figure 16:
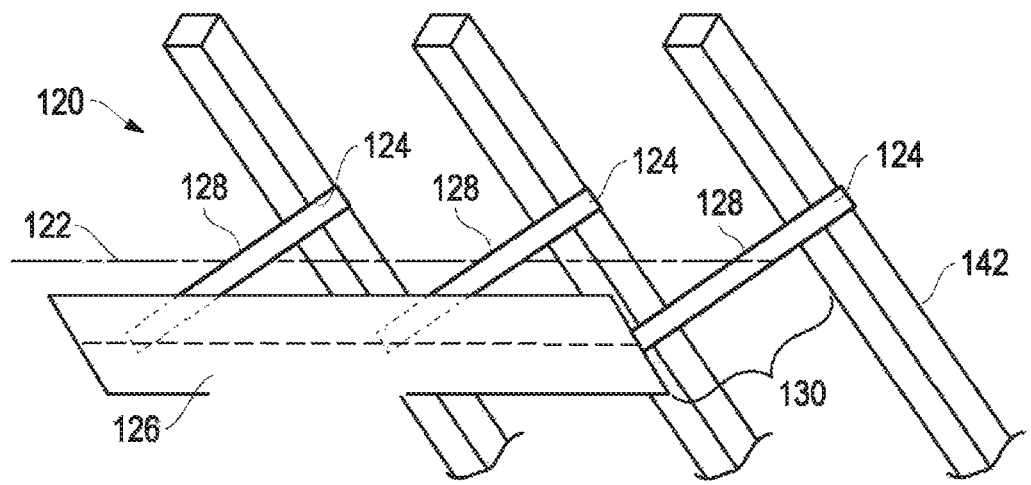
FIG. 16 is a bottom isometric view of an attic with still another alternate embodiment of a system for insulating the attic.

FIGS. 14-16 depict alternate embodiments of hangers. Such hangers may include a beam 120 having an axis 122 and a profile in the axial direction. The profile may include a distal end 126 that is elongated in the axial direction and substantially planar. The profile may further include straps 128 that extend from the distal end 126. The straps 128 can be substantially planar and perpendicular to the distal end 126. However, the straps 128 may be oriented to any angle about their respective axes while still remaining planar and perpendicular to the distal end 126. In other embodiments, the straps 128 can be non-planar, such that they include a twist about their respective axes. For example, the twist may be in a range of about 1 degree to about 90 degrees.

Each strap 128 also may include a proximal end 124 that is planar and configured to be coupled to a respective attic rafter 142. An insulation space 130 may be defined along the straps 128 between the proximal ends 124 and the distal end 126. The distal end 126 may be configured to be coupled to one or more batts of insulation located in the insulation space 130.

As shown in FIG. 14, the proximal ends 124 may be substantially parallel to the distal end 126. The proximal ends 124 may be configured to be substantially parallel to the roof deck when installed. In FIG. 14, the proximal ends 124 may be configured to attach to only bottom surfaces of the rafters 142.

In FIG. 15, portions of the proximal ends 124 and straps 128 are shown to be substantially perpendicular to the distal end 126. Other portions of the proximal ends 124 may be parallel to the distal end 126. Planes defined by the straps 128 may be configured to be perpendicular to vertical planes defined along the axial lengths of the rafters 142. However, as shown in FIG. 16, planes defined by the straps 128 may be configured to be parallel to vertical planes defined along the axial lengths of the rafters 142.

In FIGS. 15 and 16, the proximal ends 124 may be configured to attach to bottom surfaces and side surfaces of the rafters 142, or only to side surfaces of the rafters 142. In other versions, the proximal ends 124 may envelope the exposed surfaces of the rafters 142. Alternate embodiments of the proximal ends 124 may comprise stoppers to make positioning the beams 120 easier. For example, in some versions, the beam 120 may be pushed against the rafter 142 and it stops at the right position because of the stopper, with no need to further measure the position of the beam 120.

Beams with straps also may provide smaller surface contact and have higher bending stress. The beams with straps may comprise an extruded T-shape, or an injection molded shape. However, such designs stiffen the junction between the straps and the rafters, and may provide better mechanics against bending under their own weight. In some versions, the batts of insulation may have to be cut or slit to avoid holes and thermal bridges.

Embodiments of such hanger designs may comprise a selected thickness, such as about 1/32 inch, about 1/16 inch, or about 1/8 inch. Suitable materials may include polyvinylchloride (PVC), foamed PVC, CPVC, PVC reinforced with fillers (e.g., $CaCO_3$, glass fibers, etc.), and glass reinforced Acrylonitrile butadiene styrene (ABS), for example.

Embodiments of an alternative system, method and apparatus for insulating adjacent a top of an attic are disclosed. For example, FIGS. 17 and 27-30 are well suited for geographic regions regulated by earthquake safety requirements. In earthquake regions, insulation hangers cannot be braced such that they have fixed junctions between the hangers and the attic structure. In other words, the hangers and attic structure must move independently. Thus, the present design employs sliding surfaces which not only comply with earthquake regulations but also accommodate for thermal contraction and expansion of the components. These embodiments may be lighter and more flexible for temperature variation of the roof. These designs may lower the risk of nail popping than a continuous beam attached to the rafters, which can move with moisture and heat. They also reduce the bracing between trusses, which is required for earthquake regions, to allow the trusses to move independently and give more elasticity to the roof to absorb vibrations.

Figure 18:
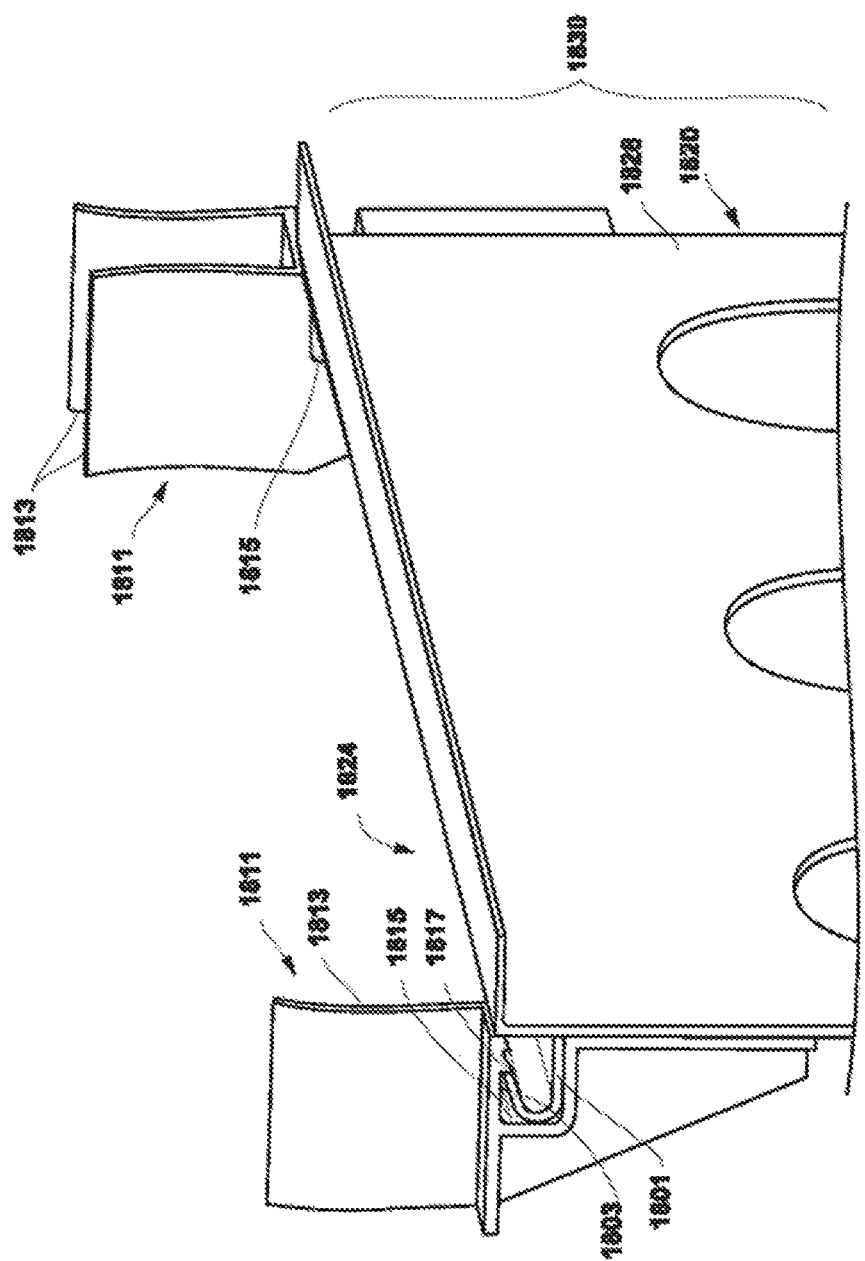
FIG. 18 is a top, front isometric view of another embodiment of a hanger for attic insulation, shown partially sectioned on one end.

FIG. 18 depicts an embodiment of a system and method of attaching beams 1820 to attic rafters. For example, beams 1820 may include a proximal end 1824, a distal end (not shown), a web 1828 and an insulation space 1830. The proximal end 1824 may include a feature, such as a rib 1801. Embodiments of the rib 1801 may extend from one side of the proximal end 1824. The rib 1801 may terminate with a lip 1803 that turns back toward the proximal end 1824.

In addition, embodiments of the system may include brackets 1811. The bracket 1811 on the left of FIG. 18 is shown partially sectioned for ease of understanding. Each bracket 1811 may be provided with features for attachment to the rafters. For example, the features may include rafter clips 1813 for closely receiving (e.g., via interference fit) the rafters. The rafter clips 1813 can be enabled to support the weight of the brackets 1811 prior to permanent attachment. In one version, the rafter clips 1813 may be further secured to the rafters with fasteners, such as staples or screws.

In another example, the clips 1813 may include teeth or the like to hold the weight of the beams and the insulation without the use of additional fasteners. The brackets 1811 may be aligned along a line (e.g., chalk or laser line) on the rafters. In another embodiment, the outermost brackets 1811 at ends of the beam 1820 may be pre-attached to the beam 1820, and the brackets 1811 are then attached to the rafters. Additional brackets 1811 may be added, such as at every second or third truss. The pre-attachment of the brackets 1811 to beam 1820 may provide a similar advantage as the previously described J-beams, which permit quick alignment of all of the elements of the system without having to use a chalk line or laser, with only a small risk of slight misalignment.

Embodiments of the brackets 1811 may receive at least a portion of the proximal ends 1824, such as the rib 1801 of proximal end 1824, so that the beam 1820 is clipped into the brackets 1811. No additional tools or fasteners are needed to secure the beams 1820, in some embodiments. This enables movement for the beam 1820 for thermal expansion or shrinkage, and avoids bracing for earthquakes.

Versions of the brackets 1811 may include rib clips 1815 for receiving the rib 1801. The rib clips 1815 may be provided with an engagement feature, such as a tooth or teeth 1817. Teeth 1817 may be provided to engage and further secure the lip 1803 within the rib clips 1815.

Figure 27:
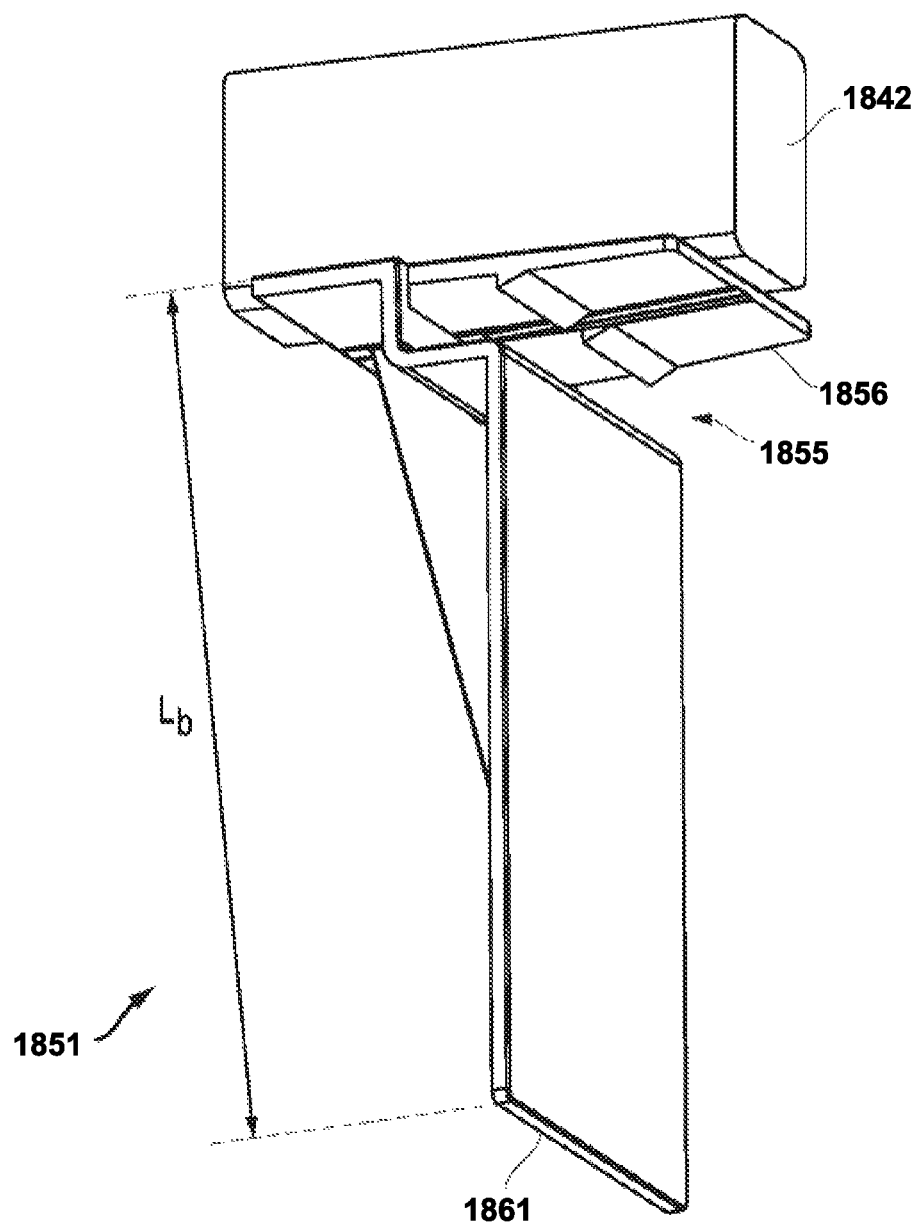
FIG. 27 is a bottom isometric view of an alternate embodiment of a bracket for the hanger of FIG. 18.

FIG. 27 depicts an alternate version of this design as bracket 1851. Bracket 1851 also is configured to be mounted to an attic rafter 1842, as shown. An upper portion 1856 of the rib clip 1855 is extended compared to that of bracket 1811. Like bracket 1811, bracket 1851 engages rib 1801 of beam 1820. However, upper portion 1856 is configured to further engage even more of proximal end 1824 of beam 1820 that bracket 1811. Bracket 1851 may otherwise be configured as described herein for bracket 1811.

Figure 28:
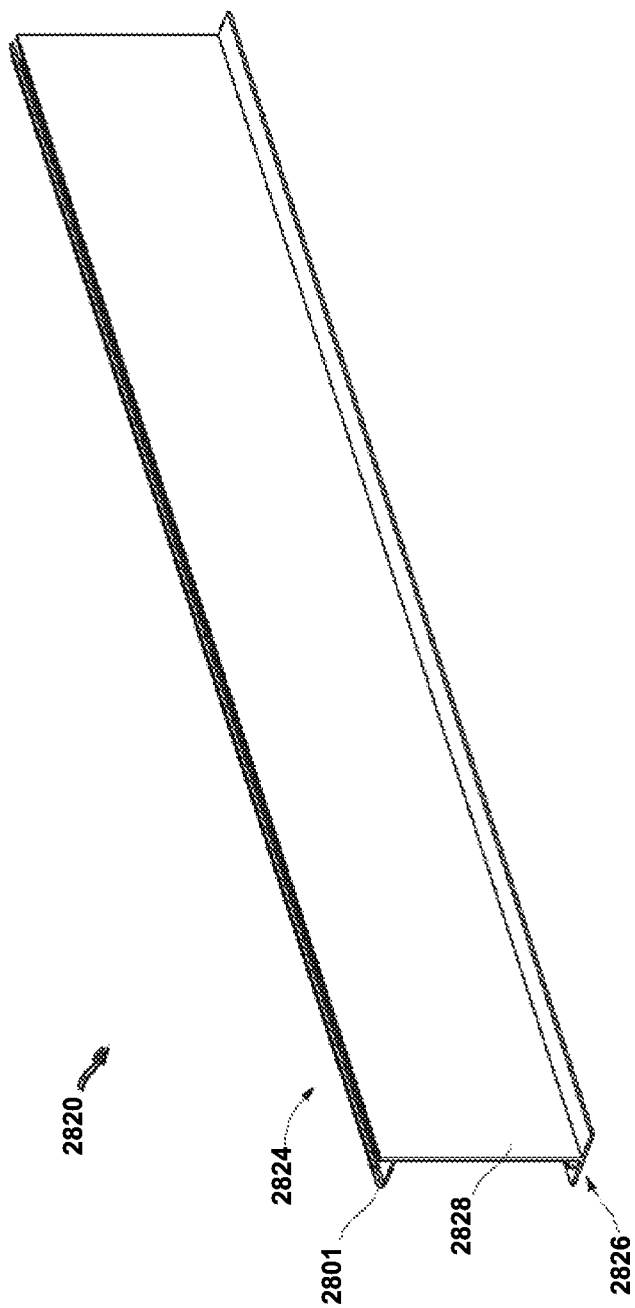
FIGS. 28 and 29 are isometric and end views, respectively, of another embodiment of a hanger.
Figure 29:
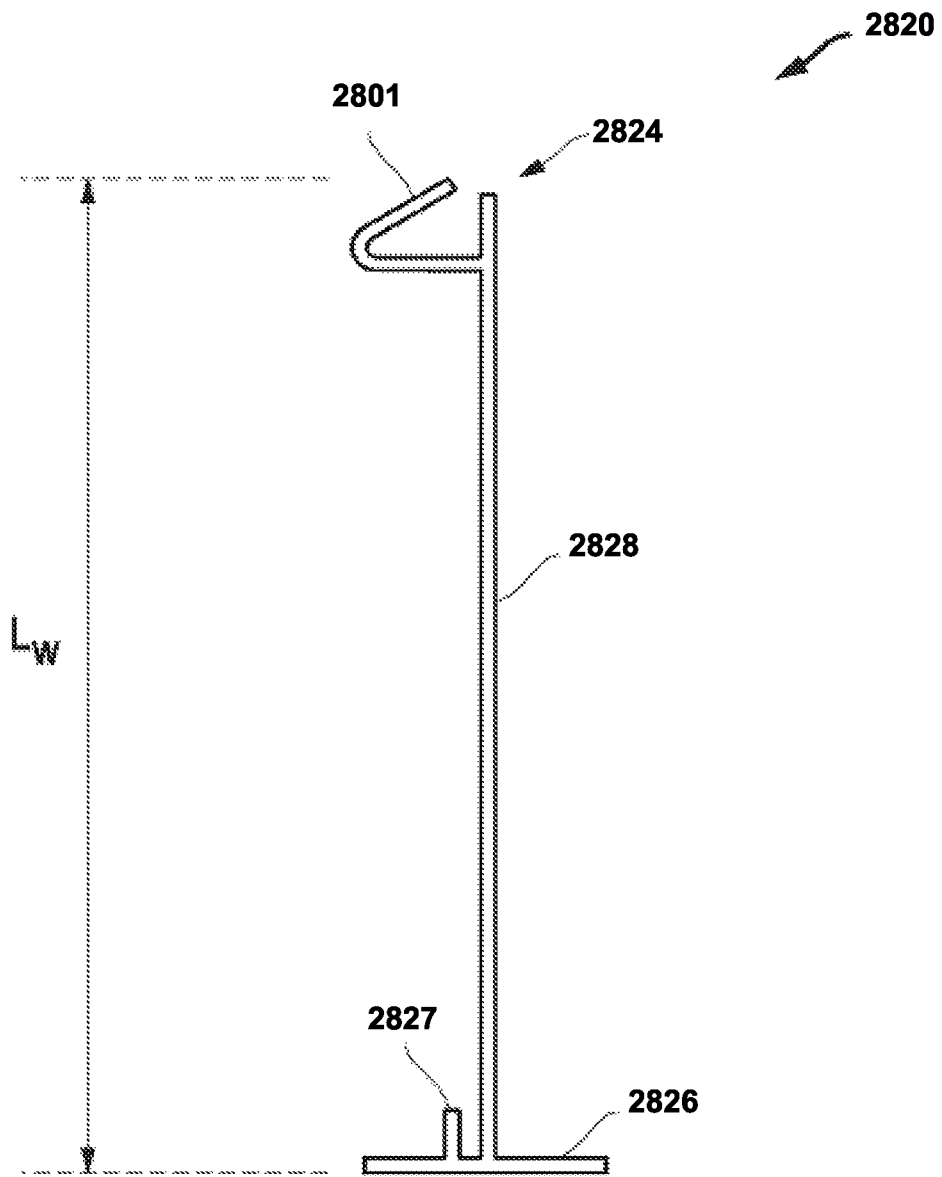
Figure 30:
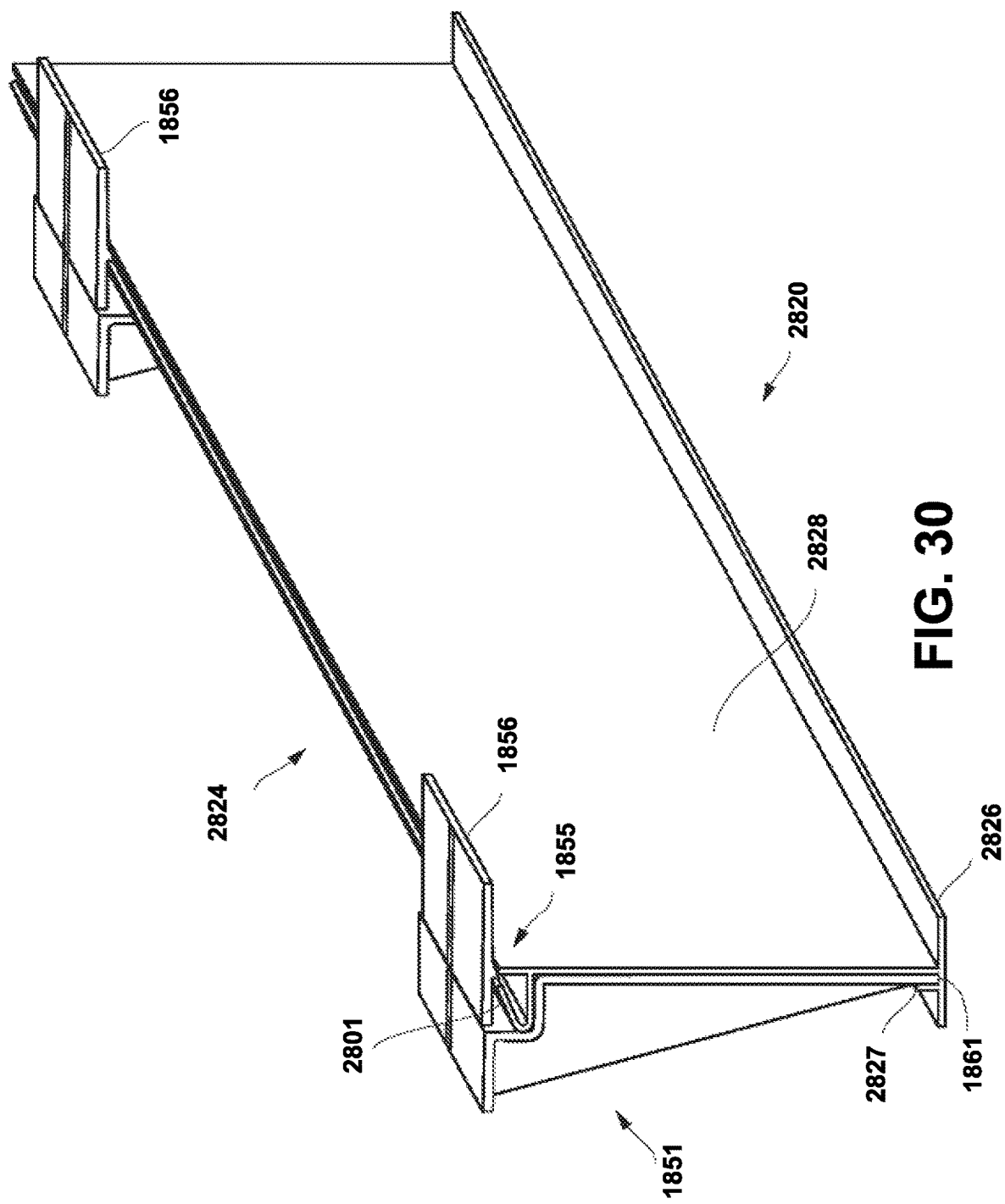
FIG. 30 is an isometric view of an embodiment of an assembly of the brackets and hanger of FIGS. 27-29.

FIGS. 28 and 29 depict another embodiment of a hanger 2820. Hanger 2820 also is a J-beam design having a proximal end 2824 with a rib 2801, a distal end 2826 and a web 2828. A length Lw of web 2828 may be sized to match the length Lb (FIG. 27) of bracket 1851, in some versions. In addition, distal end 2826 may comprise a small vertical flange 2827. As depicted in FIG. 30, flange 2827 may be parallel to web 2828 and configured to capture the lower edges 1861 of bracket 1851. Thus, flange 2827 helps stabilize and restrain hanger 2820 by the brackets 1851, no matter the installation angle.

Embodiments of such hanger designs may comprise a selected thickness, such as about $\frac{1}{32}$ inch, about $\frac{1}{16}$ inch, or about $\frac{1}{8}$ inch. Suitable materials may include polyvinylchloride (PVC), foamed PVC, CPVC, PVC reinforced with fillers (e.g., $CaCO_3$, glass fibers, etc.), and glass reinforced Acrylonitrile butadiene styrene (ABS), for example.

Figure 19:
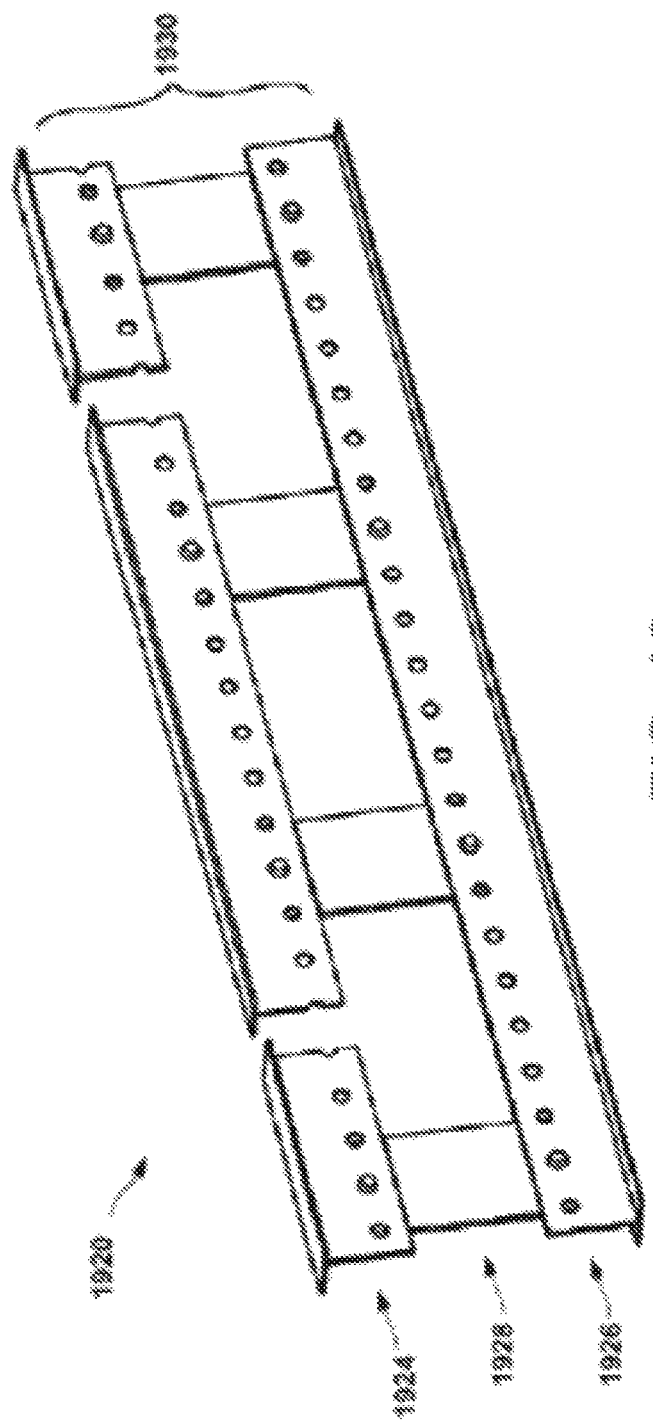
FIGS. 19 and 20 are top, front isometric views of another embodiment of a hanger shown in installation and folded positions, respectfully.
Figure 20:
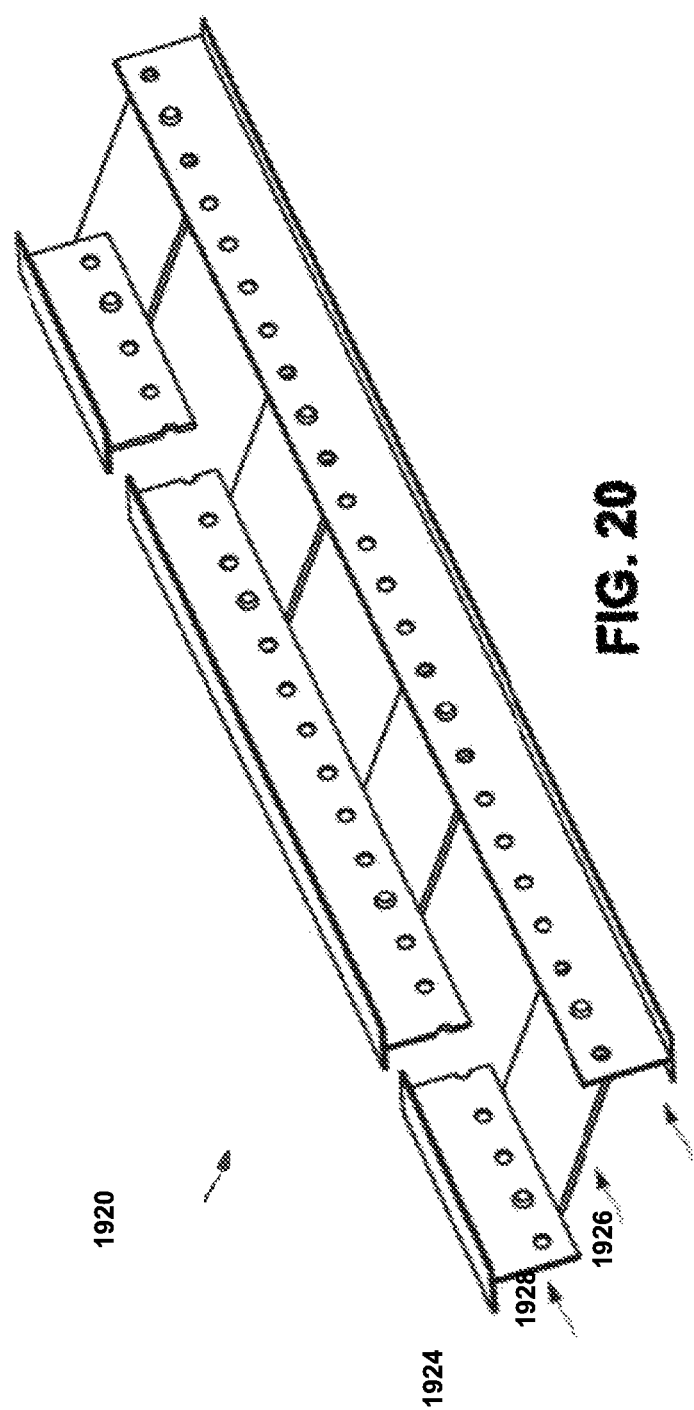
Figure 21:
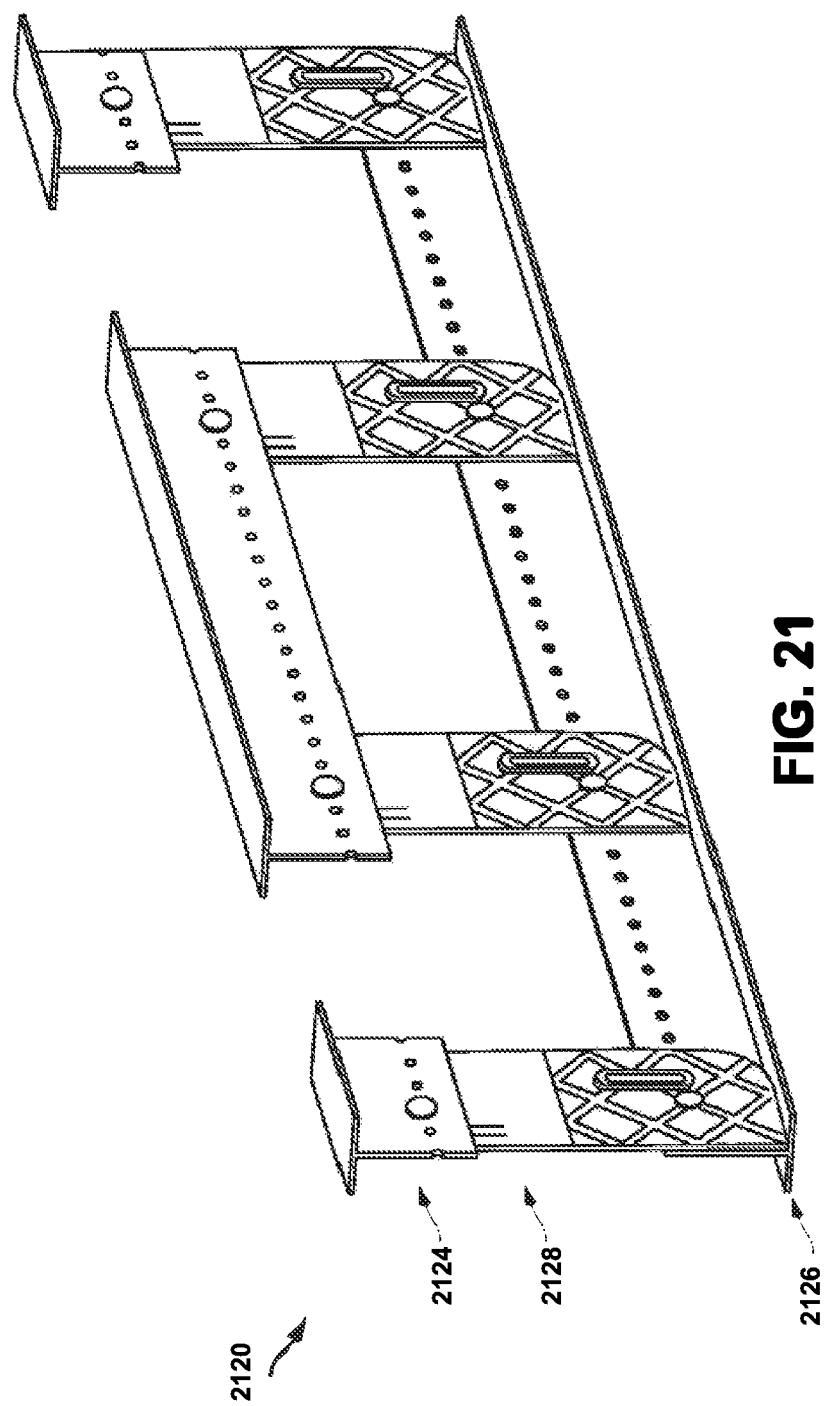
FIGS. 21 and 22 are top, front isometric views of another embodiment of a hanger shown in installation and folded positions, respectfully.
Figure 22:
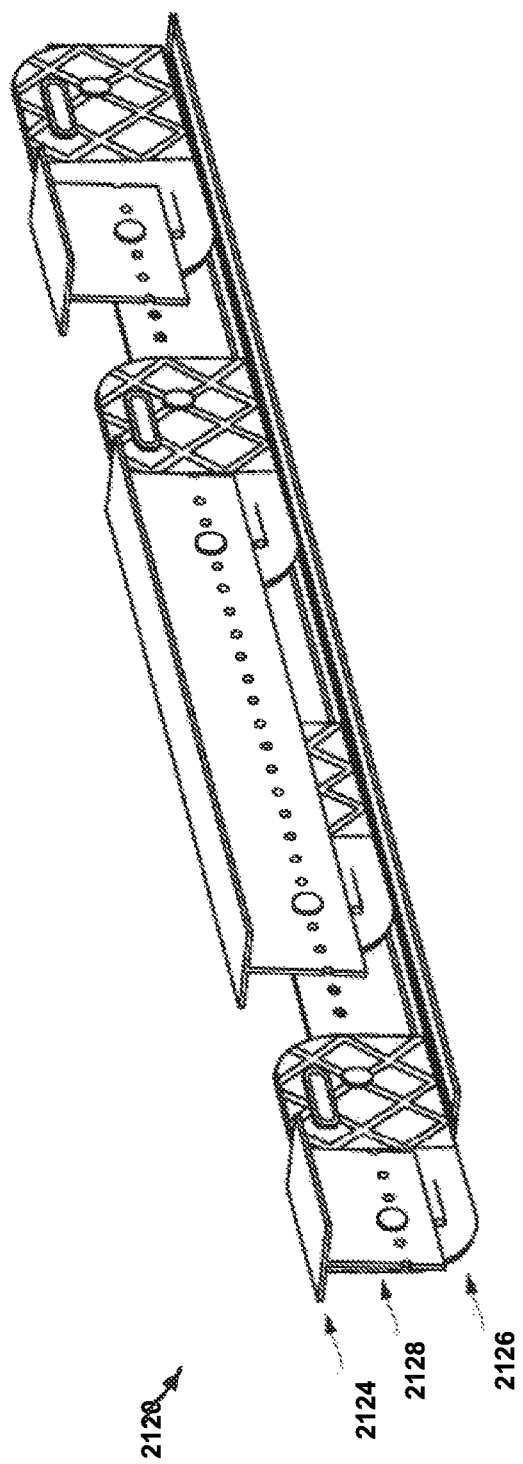

FIGS. 19 and 20 depict another embodiment of a hanger. Beam 1920 may include a proximal end 1924 configured to be coupled to the rafters, a distal end 1926 spaced apart from the proximal end 1924, and a web 1928 (e.g., web segments, as shown) with an insulation space 1930 extending between the proximal end 1924 and the distal end 1926. The proximal end 1924 may be segmented as shown or in other segmented configurations since it will be subjected to thermal cycles, expansion and contraction during use. Alternatively, the proximal end 1924 may comprise a single, continuous structure and formed from a material with a low coefficient of thermal expansion.

Embodiments of the beam 1920 also may include an installation position (FIG. 2) wherein the web 1928 is substantially perpendicular to the proximal and distal ends 1924, 1926. In addition, the beam 1920 may include a folded position (FIG. 20) wherein the beam 1920 is at least partially folded (e.g., about pivots), such that the web 1928 is no longer substantially perpendicular to the proximal and distal ends 1924, 1926.

Optionally, the beam 1920 may be configured to lock in one or more places once it is moved from the folded position toward or to the installation position to prevent it from folding again. The folded position may be used for a number of purposes. For example, when completely folded, the proximal end 1924, distal end 1926 and web 1928 may be almost or substantially parallel to each other. The completely folded position may be suitable for packaging and shipping. Beam 1920 also may comprise various partially folded positions, each of which may be secured from further movement by a locking feature or mechanism. Such partially folded positions may be suitable for accommodating various thicknesses of insulation. For example, in the position of FIG. 20, the beam 1920 may be suitable for supporting about 6 inches of insulation instead of about 10 inches of insulation is the installed position.

FIGS. 21-24 depict an alternate embodiment of FIGS. 19 and 20. Beam 2120 may include a proximal end 2124, a distal end 2126 and a web 2128 (e.g., web segments, as shown). The proximal end 2124 may be segmented as shown or in other segmented configurations. Alternatively, the proximal end 2124 may comprise a single, continuous structure and formed from a material with a low coefficient of thermal expansion.

Embodiments of the beam 2120 also may include an installation position (FIGS. 21 and 24) wherein the web 2128 is substantially perpendicular to the proximal and distal ends 2124, 2126. In addition, the beam 2120 may include a folded position (FIG. 22) wherein the beam 2120 is at least partially folded (e.g., about pivots), such that the web 2128 is no longer substantially perpendicular to the proximal and distal ends 2124, 2126.

Figure 23:
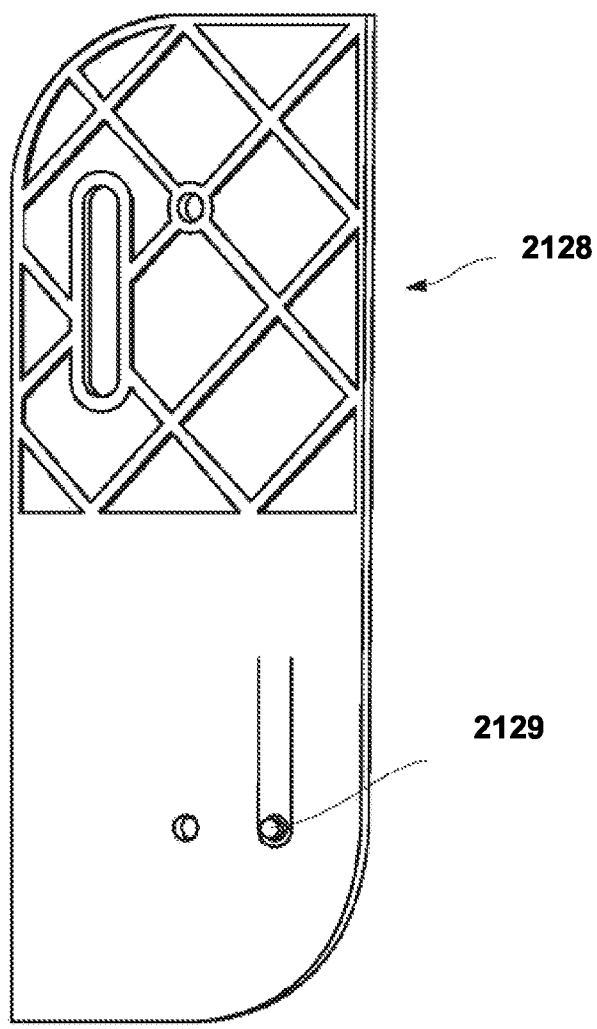
FIG. 23 is a front view of a component of the hanger of FIGS. 21 and 22.
Figure 24:
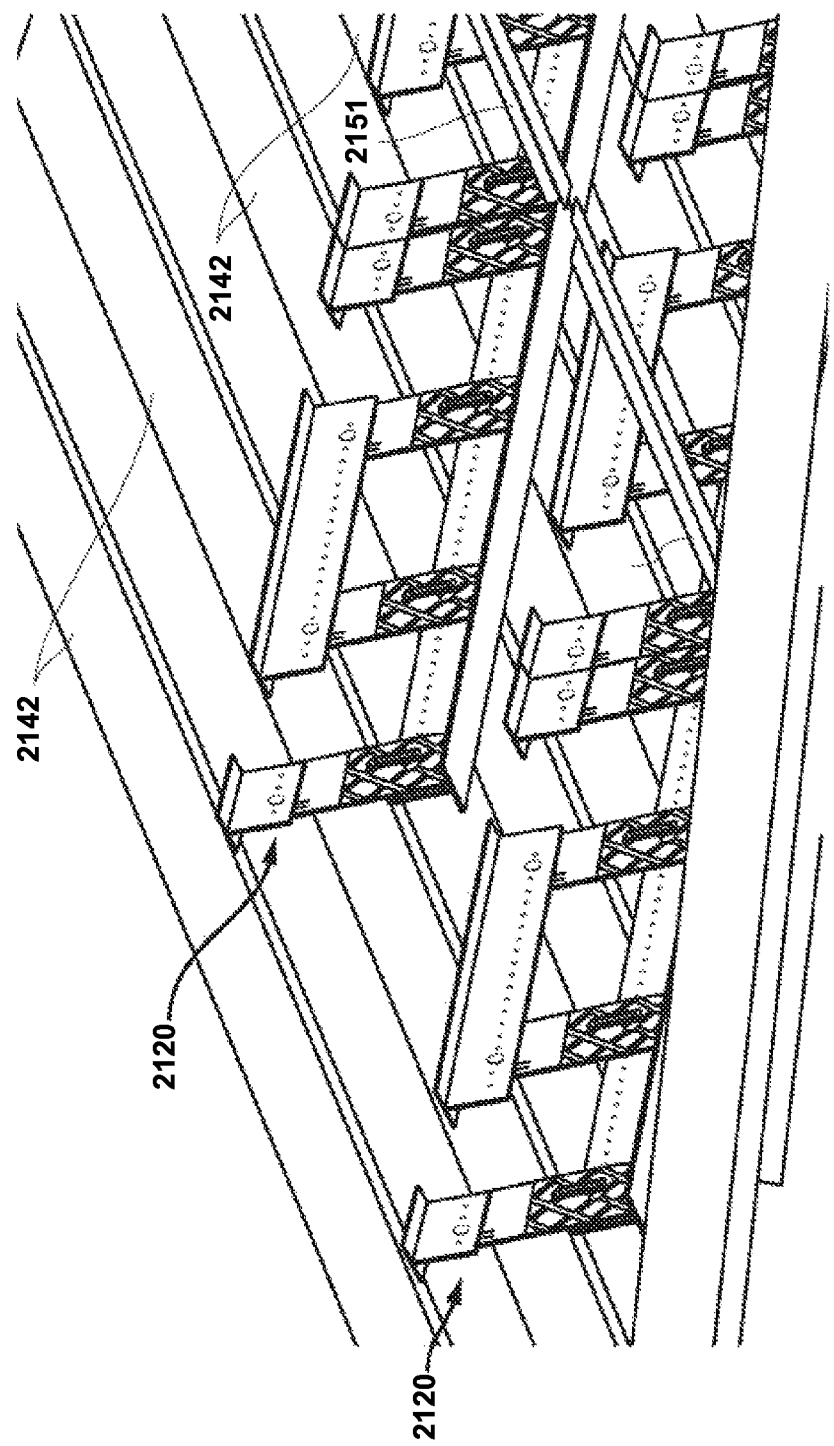
FIG. 24 is a lower isometric view of an installation of the hangers of FIGS. 21 and 22.

Optionally, the beam 2120 may be configured to lock in one or more places once it is moved from the folded position toward or to the installation position to prevent it from folding again. For example, FIG. 23 depicts a web segment of web 2128 having cantilevered detent 2129 that may be configured to snap into a hole in the distal end 2126 at a selected position. When beams 2120 are installed on joists 2142 (FIG. 24) of an attic (as described elsewhere herein), some embodiments of adjacent beams 2120 may be reinforced together by rails 2151, as shown.

Figure 25:
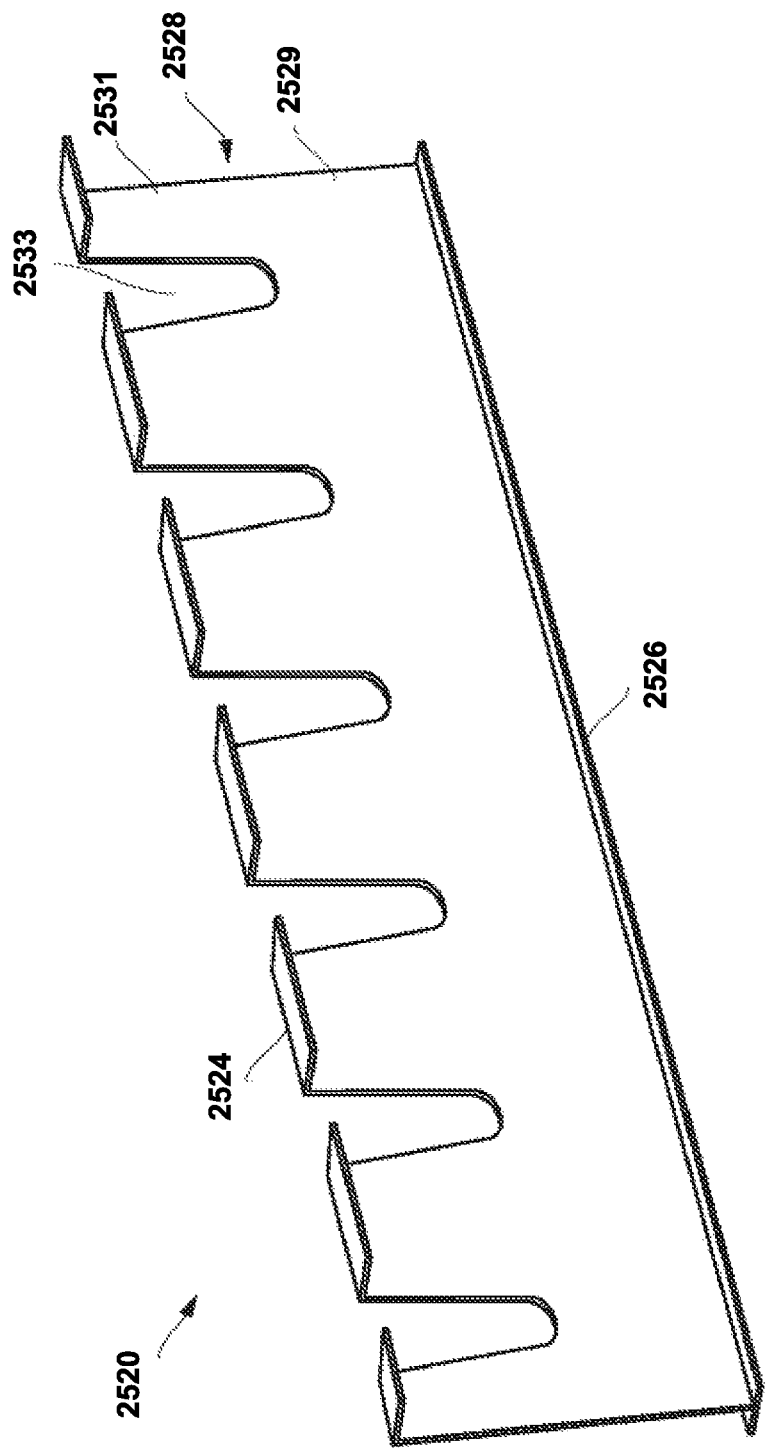
FIGS. 25 and 26 are top, front isometric views of still other alternate embodiments of hangers.
Figure 26:
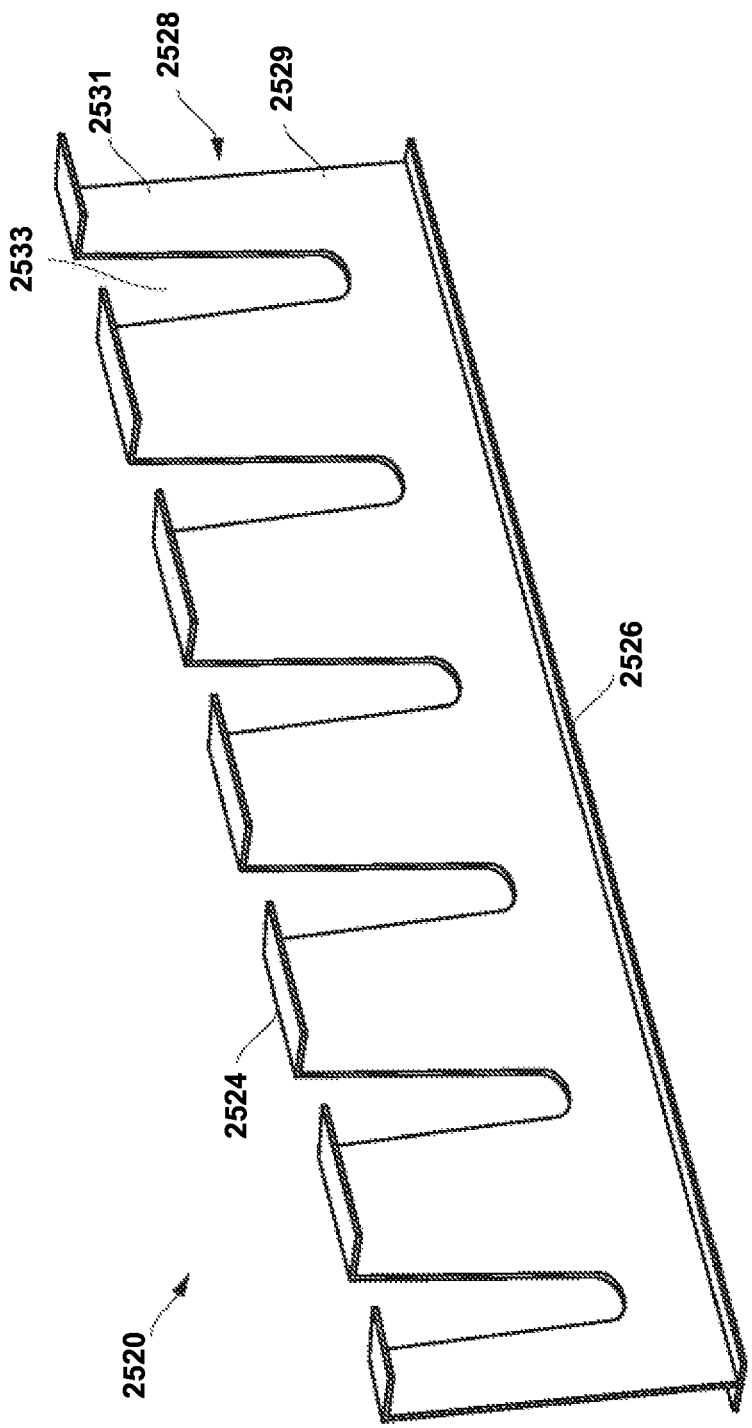

FIGS. 25 and 26 depict still other embodiments of hangers. Each hanger includes a beam 2520 having proximal ends 2524, web 2528 and distal end 2526 as described elsewhere herein for other embodiments. In some examples, the center-to-center, horizontal distance between adjacent ones of the proximal ends 2524 can be about 8 inches. This configuration enables the beam 2520 to be attached to conventional roof designs having center-to-center truss separations of about 16 inches or about 24 inches.

The webs 2528 of beams 2520 may include both a solid section 2529 that spans the entire lengths of distal ends 2526, and a segmented section 2531 that engages respective ones of the proximal ends 2524. Each beam 2520 also includes voids 2533 that extend from the proximal ends 2524 to the solid section 2529. In FIG. 25, the voids 2533 are shallower than the voids of FIG. 26.

Figure 31:
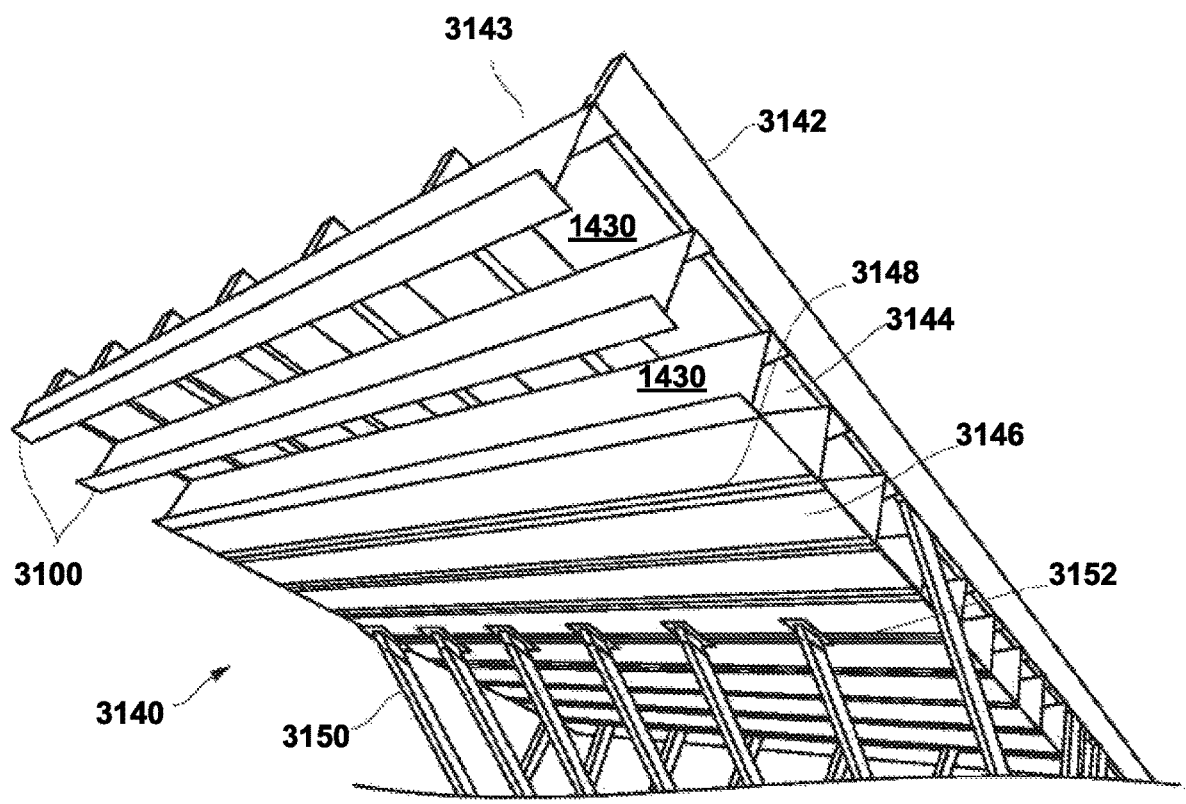
FIG. 31 is a bottom isometric view of an attic with an embodiment of a system for insulating the attic, and the system is shown partially installed.

Embodiments of beams 3100 are shown in operation in FIG. 31. Beams 310 can be any of the beams disclosed herein. Each beam 3100 may comprise a polymer. For example, the beam 3100 may comprise one or more of the following materials: thermoplastics, injection molding plastics, virgin polyvinylchloride (PVC), recycled PVC, foamed PVC, CPVC, acrylonitrile butadiene styrene (ABS), polyether ether ketone (PEEK), polymethyl methacrylate (PMMA), polyimide, thermoplastic olefin (TPO), nylon, etc., and glass-reinforced versions of the aforementioned materials. Versions of the beam 3100 may consist only of a polymer. In some embodiments, at least portions of the beam 3100 can be at least one of extruded and injection molded. Examples of the beam 3100 may be readily cut, such as with a manual tool like snips. In one example, the beams 3100 are not metallic. Apertures or holes in the beam 3100 may be employed to reduce its weight and reduce thermal bridge issues.

In other embodiments, portions of the beam 3100 may be formed from more than one material, such as different materials. For example, a first portion of the beam 3100 may include glass-reinforced PVC, and a second portion of the beam may include PVC. Portions of the beam 3100 may have different coefficients of thermal expansion.

Versions of the beam 3100 may include a specific coefficient of thermal expansion (CTE). For example, the CTE can be not greater than about 100E-06 in/(in·F), such as not greater than about 80E-06 in/(in·F), not greater than about 60E-06 in/(in·F), not greater than about 50E-06 in/(in·F), not greater than about 40E-06 in/(in·F), not greater than about 30E-06 in/(in·F), not greater than about 20E-06 in/(in·F), or even not greater than about 10E-06 in/(in·F). In other examples, the CTE can be in a range between any of these values.

In some embodiments, the beam 3100 may subjected to a bending moment due to the attic truss design. For example, the maximum acceptable deformation may be expressed by the following description: with the beam positioned horizontally, attached by its proximal end to a rafter, for each linear foot of beam, the application of a load of 0.5 lb at the distal end, 10 inches from the proximal end of the beam, will impart a maximum vertical deflection of not greater than about 2 inches. This corresponds to an angle or deflection of about 5 degrees. In other embodiments, the maximum vertical deflection can be not greater than about 1 inch, or even not greater than about 0.1 inches (i.e., no perceived deformation).

The beam 3100 can have any length between about 1 foot and about 20 feet. In some versions, the length of beam 3100 can be about 6 feet to about 8 feet to better enable handling by only one person. The beams can be installed by the framers installing the attic trusses and the external roof sheathing. Insulation contractors can install the insulation and the tape. Such installation may be preferable for longer versions of the beams 20 (e.g., 8 feet and longer). For shorter versions of the beams (e.g., under 8 feet), it may be preferable for the insulation contractors to install both the beams 20 and the insulation.

Examples of the web may, under its own weight, have a maximum deflection. In some versions, the maximum deflection of the web can be about 10 degrees relative to normal with respect to the proximal end and the distal end. In other examples, the maximum deflection can be about 8 degrees, such as about 6 degrees, about 5 degrees, about 4 degrees, about 3 degrees, about 2 degrees, or even about 1 degree. In other examples, the maximum deflection can be in a range between any of these values.

Examples of the beam 3100 may be perforated to reduce weight, thermal expansion, shrinkage and thermal bridge issues. In some versions, the proximal end may include perforations. Embodiments of the perforations may include parallel rows of slits. The slits may be at least one of rounded, oblong and rectangular. In one example, the web may be perforated. In another example, the distal end is not perforated.

Examples of the beam 3100 may comprise a single layer of material, such as polymer material. The material may be folded or thermoformed into a final sectional shape in the axial direction. In addition, the final sectional shape may be bonded, sonic welded or heat staked with ribbed edges. Alternatively, the beam 3100 may be formed as a profile extrusion.

Figure 32:
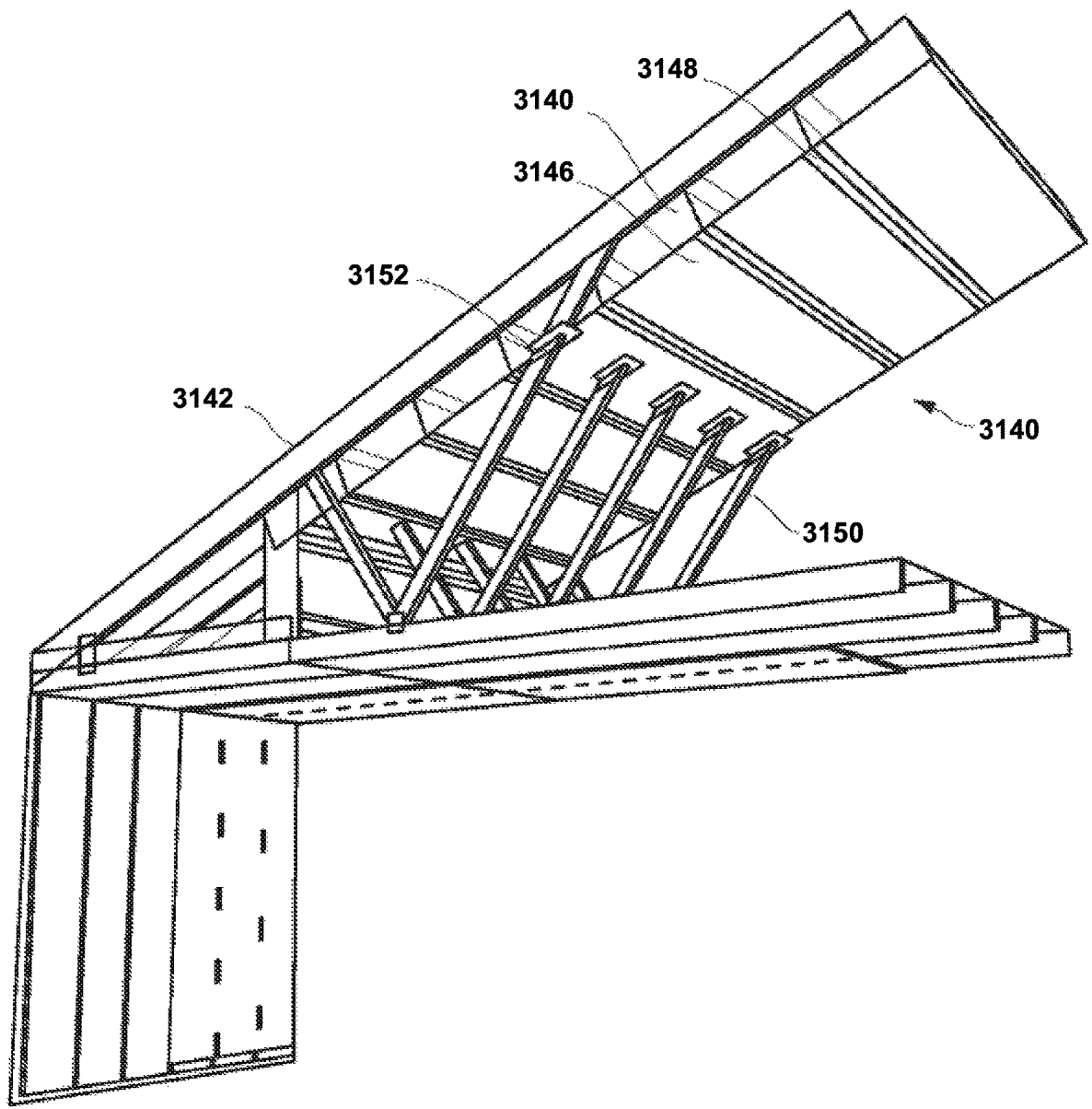
FIG. 32 is a bottom isometric view of an attic with another embodiment of a system for insulating the attic.

FIGS. 31 and 32 depict embodiments of a system for insulating an attic 3140 of a building. The building may include a roof with a roof deck, and rafters 3142 supporting the roof deck inside the attic 3140. The system may include beams 3100 for supporting insulation 3144 in the attic 3140. The beams 3100 may include features from any of the embodiments described herein. The beams 3100 may be transverse to the rafters 3142. The proximal ends of the beams 3100 may be mounted to the rafters 3142 with fasteners, such as staples, nails or screws. The system may further include a ventilated air gap 3143 between the roof deck and an upper portion of the system.

In some embodiments, the insulation may be placed below the rafters 3142, and the ventilated air gaps 3143 may be located between the soffit and the ridge vent at the top of the roof. Alternatively, ventilation openings (e.g., O'Hagin vents) may be employed directly on the roof sheathing. These solutions can permit the insulation to avoid moisture accumulation (regardless of the climate zone) using natural convection and wind. To limit convection in the insulation, ventilation baffles can be stapled to the roof sheathing to provide a continuous air gap between the soffit and the ridge vent, as is traditionally done with blown insulation. In another embodiment, a facing may be employed on one side of the insulation near the roof deck to limit convection. The other side of the insulation can employ the smart vapor retarder inside the building. The air gap is then ensured by the thickness of the rafters themselves. For example, a typical 2×4 beam would provide a 3.5 inch air gap. In other examples, if the rafters are 2×6 or 2×8 beams, ventilation baffles such as conventional, baffles with a 1.5 inch thickness can be stapled to the roof deck. For some applications, a first layer of insulation may be placed between the rafters, and a second layer of insulation may be placed below the rafters to increase the level of insulation and decrease the thickness of insulation installed below the rafters.

In some versions, the beams 3100 may be installed perpendicular to the trusses as shown on FIG. 31, which limits thermal bridging. However, the beams 3100 also may be installed parallel to the trusses.

The insulation 3144 may comprise insulation batts mounted to and between adjacent ones of the beams 3100 in the insulation spaces 1430. Each of the insulation batts of insulation 3144 may include an insulation material and an outer layer 3146 that faces the distal ends of the beams 3120. Examples of the outer layer 3146 may comprise at least one of a fire class A (required for exposed surfaces in U.S. building codes), a smart vapor retarder (SVR) and kraft paper. Alternatively, the batts of insulation 3144 may be unfaced with one or more outer layers.

Embodiments of the system may further include a first tape 3148. For example, the first tape 3148 may comprise an all weather flashing tape, such as 3M 8067 tape, from 3M Company, St. Paul, Minn., for example, or CertaTape from CertainTeed of Malvern, Pa. Versions of the system may include the first tape 3148 being applied to the distal ends of the beams 3100, and to the outer layers 3146 of the insulation batts.

The first tape 3148 may be used to form airtight barriers between the components of the system. Such airtight barriers may include an airtightness of ACH50<3. In other embodiments of the system, the airtightness and the airtight barriers may comprise ACH50<2.5. Other versions may include ACH50<2.5, such as ACH50<2.0, ACH50<1.6, ACH50<1.0, ACH50<0.8, or even ACH50<0.6. In still other example, the airtightness and the airtight barriers can be in a range between any of these values.

Figure 33:
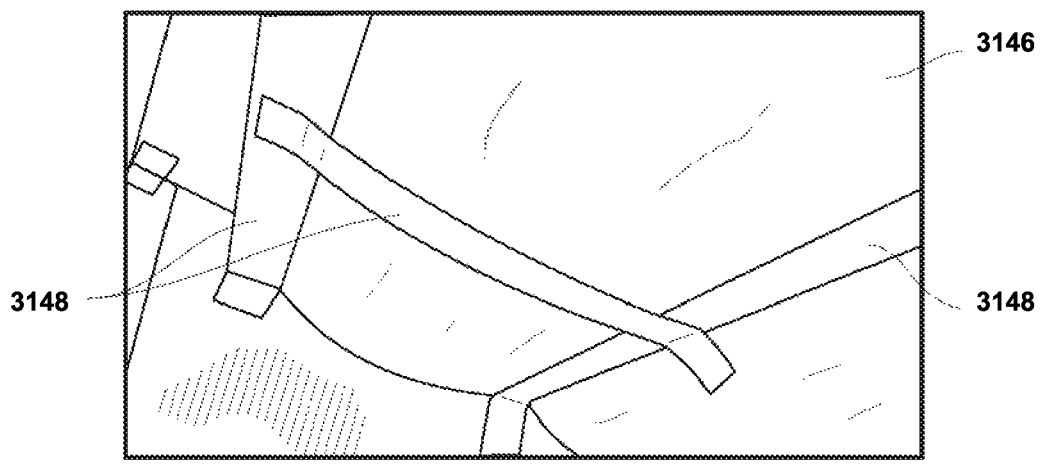
FIG. 33 is an enlarged, bottom isometric view of an attic with still another embodiment of a system for insulating the attic.

In some versions of the system, no material of the system extends between adjacent ones of the beams 3100 other than the insulation batts that form insulation 3144. For example, the system may include no other support members or support structures beneath the insulation 3144, such as strapping, sheet barriers, etc. The facing of the insulation 3144 may be stapled to the beams 3100. The surface of the facing can be pulled straight in such a way that additional pieces are not required to correctly tape the junction between the batts. However, other versions of the system may include batt-only strips of tape 3148 (FIG. 33) between abutting batt joints that are perpendicular to axes of the beams 3100. In an example, the batt-only tape strips do extend between adjacent ones of the beams 3100. In some versions, the batts of insulation 3144 may be initially stapled to the beams 3100 before taping.

Figure 34:
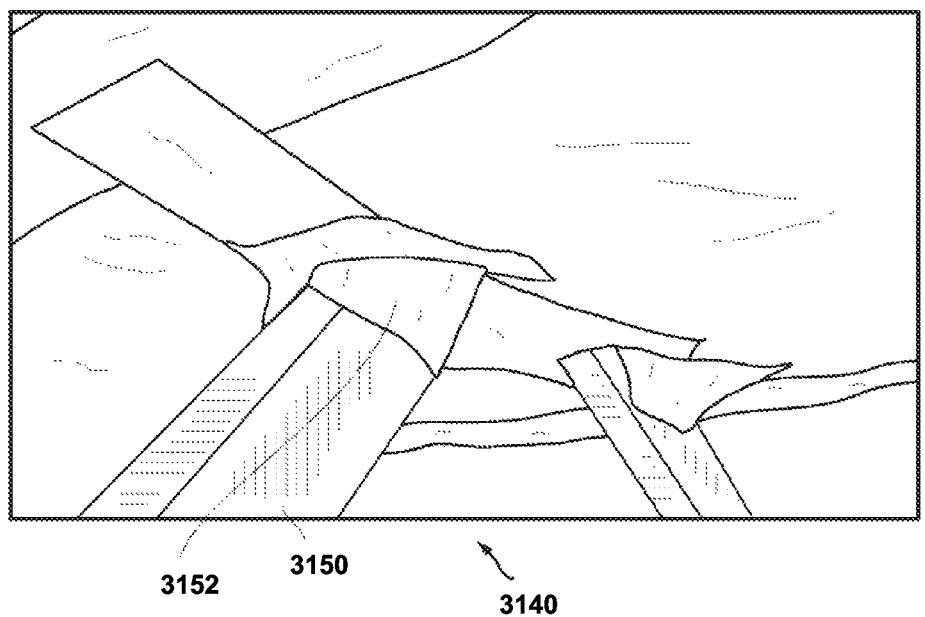
FIG. 34 is an enlarged, bottom isometric view of an attic with yet another embodiment of a system for insulating the attic.

In some applications, protrusions 3150 (FIGS. 31, 32, and 34) of the attic 3140 may extend through the batts of insulation 3144. For example, the protrusions 3150 may include other structural members, such as truss members, that further support the roof. Other examples of protrusions 3150 may include vent pipes, plumbing components, ducts, conduits or other structures typically found in an attic or near a roof. Tape 3148 may be applied between the protrusions 3150 and the batts of insulation 3144. Tape 3148 may form airtight barriers between these components. Versions of the airtight barriers comprise ACH50<3, or less, as described elsewhere herein.

Other embodiments of the system may further include a second tape 3152 that differs from the first tape 3148. For example, the second tape 3152 may comprise a stretch tape. Stretch tape may include an elongation capability of at least about 100%. Examples of stretch tape may include Certa-Flash stretch tape, by CertainTeed of Malvern, Pa., Isostretch tape from DuPont of Wilmington, Del., or ZIP System stretch tape, available from Huber Engineered Woods, Charlotte, N.C. The second tape 3152 may be applied between the protrusions 3150 and the batts of insulation 3144 to form airtight barriers between the components. The airtight barriers comprise ACH50<3, or less, as described elsewhere herein.

Embodiments of a method of insulating the attic 3140 of a building also are disclosed. For example, the method may include providing beams 3100 comprising an elongated profile in an axial direction. Versions of the method may include fastening only proximal ends, or brackets, of the beams 3100 to the rafters 3142. In some embodiments, the method includes positioning batts of insulation 3144 on distal ends of adjacent ones of the beams 3100. Each of the batts of insulation 3144 may include an insulation material and an outer layer 3146 facing the distal ends of the beams 3100. The outer layer 3146 may comprise an airtightness of ACH50<3, or better, as described herein.

Examples of the method may further include applying the first tape 3148 to the distal ends of the beams 3100, and to the outer layers 3146 of the batts of insulation 3144. Airtight barriers may be formed between these components, as described herein. The airtight barriers comprising the airtightness of ACH50<3, or better, as previously discussed. In one embodiment, the method may further comprise extending no material between adjacent ones of the beams other than the insulation batts.

Figure 35:
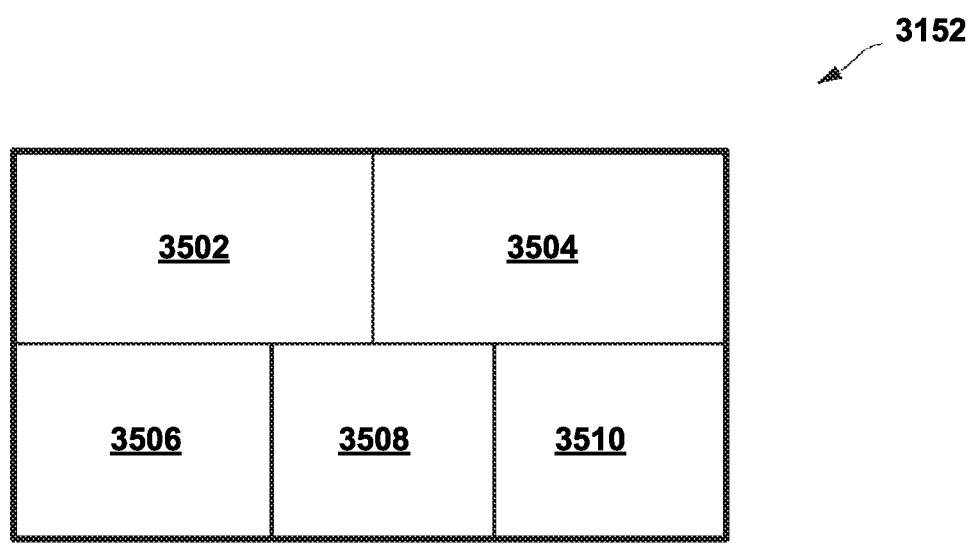
FIG. 35 is schematic view of an embodiment of tape showing release paper segments.
Figure 36:
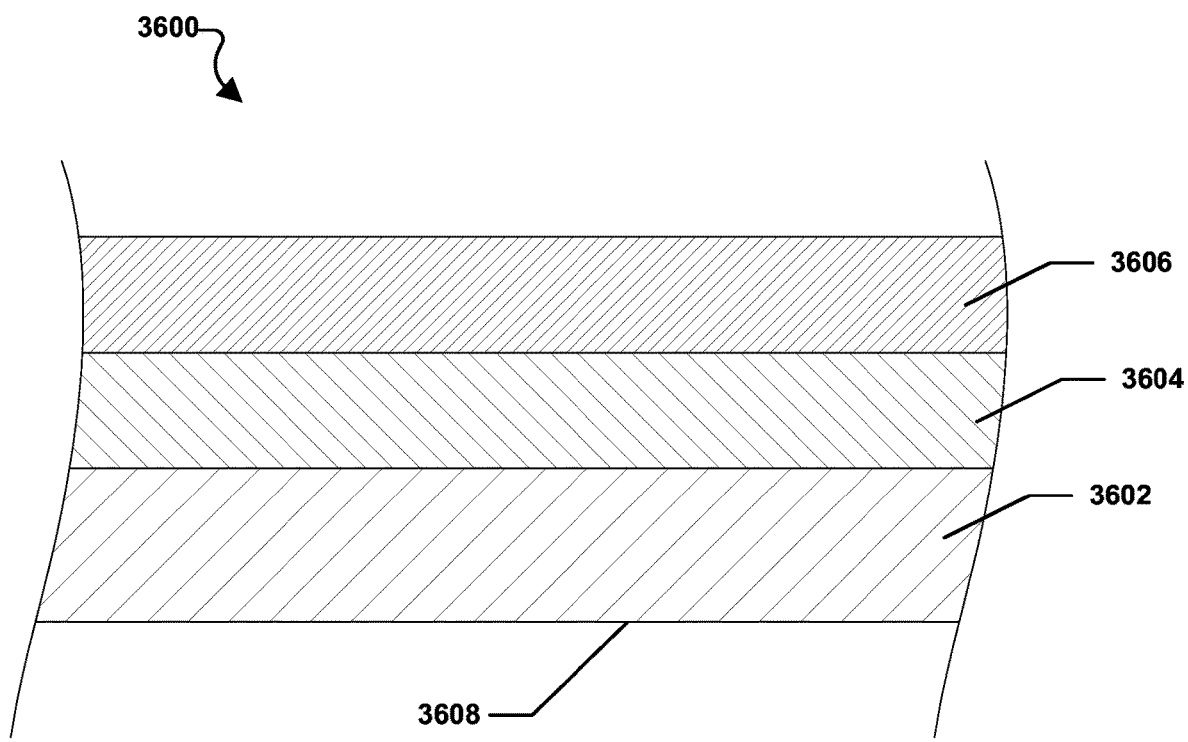
FIG. 36 is a cross-section view of an insulation system.
Figure 37:
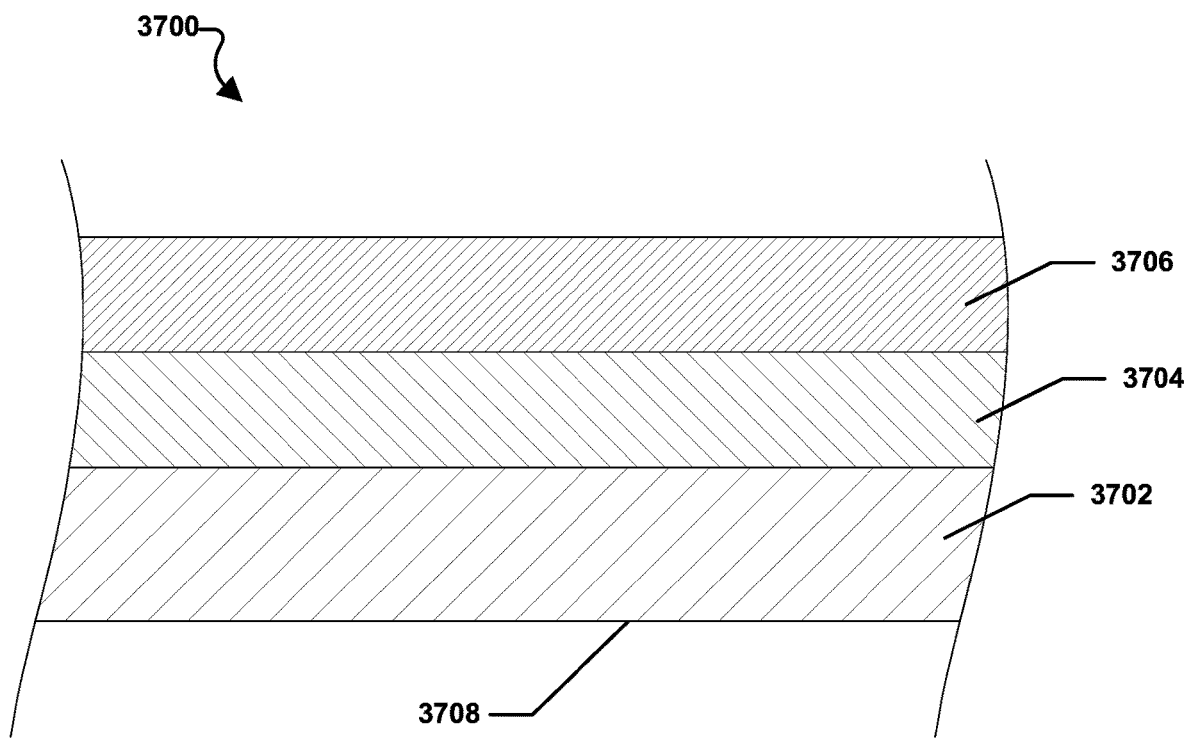
FIG. 37 is a cross-section view of an insulation system.
Figure 38:
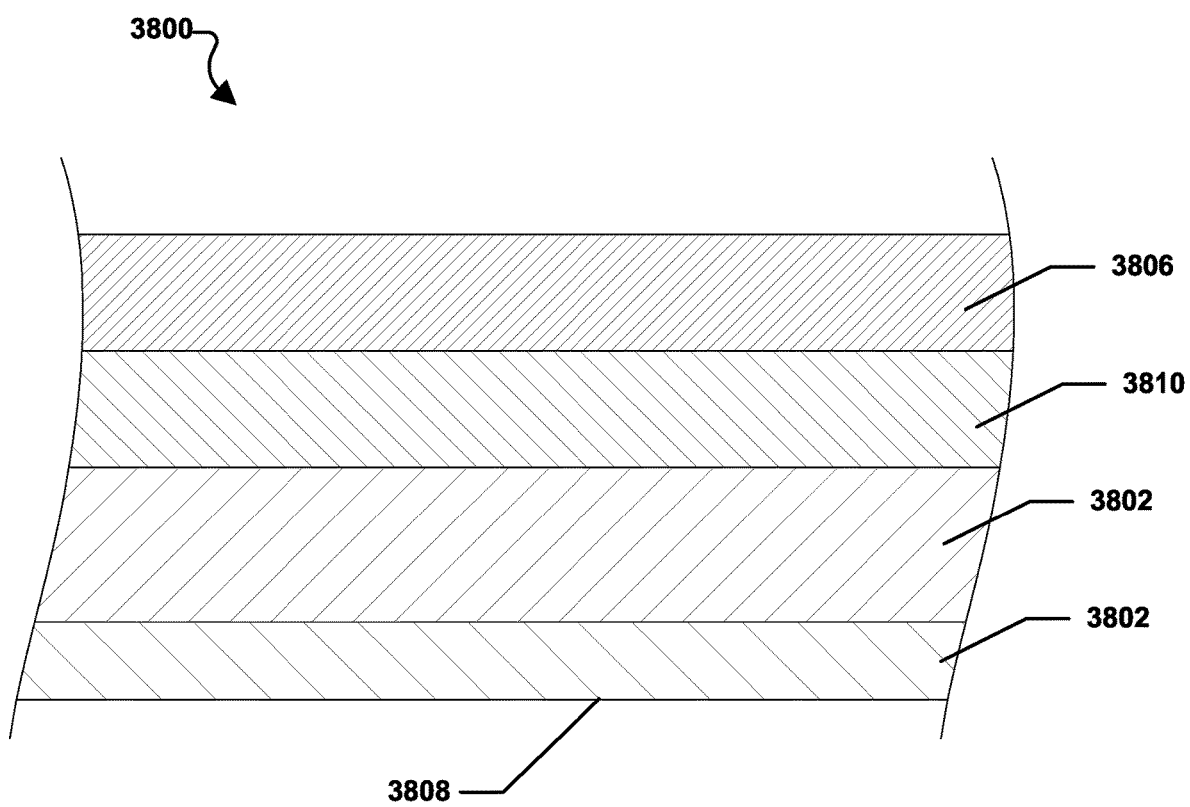
FIG. 38 is a cross-section view of an insulation system.
Figure 39:
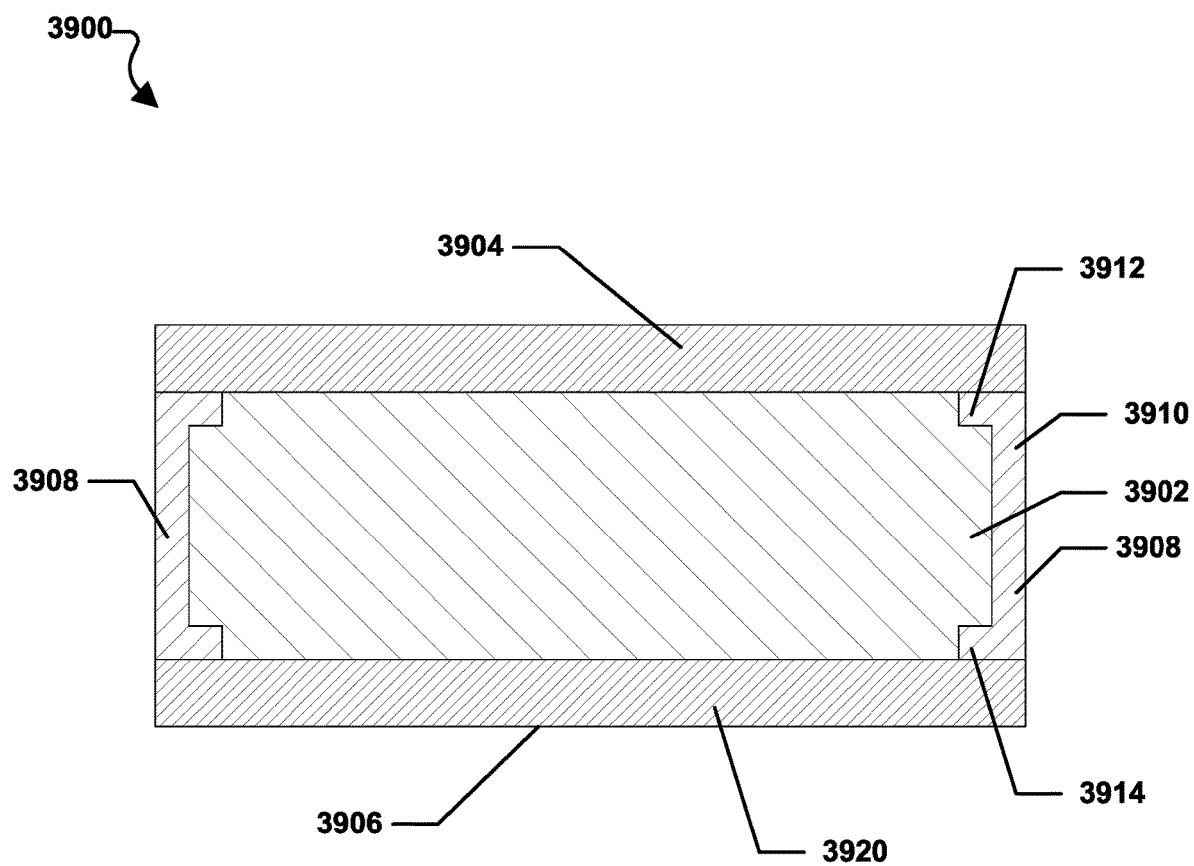
FIG. 39 is a cross-section view of an insulation system.

FIG. 35 depicts an embodiment of a back side of the second tape 3152, showing its release liner in segments 3502-3510 that are pre-slit. Methodically removing the segments 3502-3510 and applying the second tape 3152 to a protrusion 3150 (FIG. 34) that extends through an insulation batt (as described herein) to form a substantially airtight seal significantly enhances installation speed and efficiency.

For example, the following sequence of steps represents an embodiment of a method of the application of the second tape 3152. In one version, segment 3508 is removed first. Segment 3508 is about 2 inches wide so that it can be applied to and go around protrusions (e.g., rafters, trusses, etc.) having a width of 1.5 inches. With segment 3508 removed, the second tape 3152 can be applied on the front face of the protrusion. Next, segments 3506 and 3510 are removed so that second tape 3152 can be stretched on the sides of the protrusion. In a final step, segments 3502 and 3504 are removed and the second tape 3152 is stretched on the facing of the insulation batts.

In an alternate embodiment, the release liner on the back of the second tape 3152 may include a single bisecting slit in the long direction. In this example, the bottom half of the liner (equivalent to the combination of segments 3506-3510) may be removed first. The second tape 3152 would then be stretched and applied to the protrusion. The top half of the liner is then removed (equivalent to the combination of segments 3502 and 3504), and the second tape 3152 would be stretched and applied to the insulation batt.

Exemplary aspects of a system and method for insulating an external surface of an enclosed space are also disclosed. The closed space may be an attic, a room with an exterior wall, a garage, a shed, a warehouse, or any other structure or portion of a structure having an external surface separating the interior from external variations in temperature and humidity.

According to one embodiment, an insulation system 3600 may include an insulation layer 3602, an atmospheric regulation layer 3604, a structural support 3606, and an external surface 3608. In another embodiment, the atmospheric regulation layer 3604 may be supported by the structural support 3606. In one embodiment, the insulation layer 3602 may be located between the atmospheric regulation layer 3604 and the external surface 3608. In some embodiments, the insulation will not extend to fill the spaces between the atmospheric regulation layer 3604 and the external surface 3608. In some embodiments there may be advantages to the insulation not being in contact with the external surface 3608, such as the ability to use airflow against the exterior surface for cooling a hot roof, warming a roof with ice or snow or a break in thermal flow from the interior of the attic to the exterior of the structure. In other embodiments, the insulation layer 3602 may contact the external surface 3608.

For example, in one embodiment, an insulation system 3600 may be used beneath a roof having a roof deck and supported by beams or rafters. Additionally, the insulation system 3600 may be used near a wall supported by studs. Other support systems for roofs and walls are also compatible with the insulation system 3600.

In one embodiment, the insulation system 3600 may include an insulation layer 3602. In another embodiment, the insulation layer 3602 may include a fibrous material, such as fiberglass, mineral wool, stone wool, cellulose, cotton, recycled denim fibers, polymer fibers, polyester fibers, other synthetic or natural fibers that have an insulating value, or wood fibers. In another embodiment, the fibrous material may be layered in a stack of one or more sheets. Alternatively, the fibrous material may be packed and held together with an adhesive.

In one embodiment, the insulation layer 3602 may include a semi-rigid fibrous material, and the insulation layer 3602 may have a density of at least 8 kg per cubic meter, or at least 16 kg per cubic meter, or at least 24 kg per cubic meter, or at least 32 kg per cubic meter, or at least 40 kg per cubic meter. In a further embodiment, the insulation layer 3602 may include a semi-rigid fibrous material, and the insulation layer 3602 may have a density of not greater than 48 kg per cubic meter, or not greater than 40 kg per cubic meter, or not greater than 32 kg per cubic meter, or not greater than 24 kg per cubic meter, or not greater than 16 kg per cubic meter. It will be appreciated that the density of the insulation layer 3602 may be within a range between any of the minimum and maximum values noted above. It will be further appreciated that the insulation layer 3602 may have a density of any value between any of the minimum and maximum values noted above.

In one embodiment, the insulation layer 3602 may include a foam, such as extruded polystyrene foam, expanded polystyrene foam, polyurethane foam; polyurea foam; polyepoxide foams; foams made from acetoacetate esters, amines including an alkyldiamine, an aromatic diamine, or an amine-functionalized polymer, and acrylates, including foams that are free of an isocyanate; isocyanurate foam, open cell spray foams, closed cell spray foams, open cell foams, closed cell foams or phenolic foam. In another embodiment, the foam of the insulation material may be a unitary construction such that the height, width, and thickness of the insulation layer 3602 may be a single block of foam. Alternatively, the insulation layer 3602 may include pieces of foam having dimensions smaller than the height, width, and thickness of the insulation layer 3602; foam beads, spheres, rods, or any other shape of foam pieces may be used. Alternatively, the foam may be sprayed in place to the surface of the atmospheric control layer to the thickness required for thermal performance required for the application. In another embodiment, the foam pieces may be coated with a polymer material as an adhesive to promote agglomeration or adherence to the external surface 3608 or to the supports.

In one embodiment, the insulation layer 3602 may include a foam material, and the insulation layer 3602 may have a density of at least 4 kg per cubic meter, or at least 8 kg per cubic meter, or at least 16 kg per cubic meter, or at least 32 kg per cubic meter, or at least 48.1 kg per cubic meter, or at least 64.1 kg per cubic meter, or at least 80.1 kg per cubic meter, or at least 96.1 kg per cubic meter, or at least 112.1 kg per cubic meter, or at least 128.1 kg per cubic meter, or at least 144.2 kg per cubic meter. In a further embodiment, the insulation layer 3602 may include a foam material, and the insulation layer 3602 may have a density of not greater than 160.2 kg per cubic meter, or not greater than 144.2 kg per cubic meter, or not greater than 128.1 kg per cubic meter, or not greater than 112.1 kg per cubic meter, or not greater than 96.1 kg per cubic meter, or not greater than 80.1 kg per cubic meter, or not greater than 64.1 kg per cubic meter, or not greater than 48.1 kg per cubic meter, or not greater than 32 kg per cubic meter, or not greater than 16 kg per cubic meter, or not greater than 8 kg per cubic meter. It will be appreciated that the density of the insulation layer 3602 may be within a range between any of the minimum and maximum values noted above. It will be further appreciated that the insulation layer 3602 may have a density of any value between any of the minimum and maximum values noted above.

In one embodiment, the insulation layer 3602 may include a rigid material such that the insulation layer 3602 independently maintains its shape. Exemplary rigid materials may include materials identified in the industry by a series of names related to function, such as Insulation board, insulated sheathing, sheathing board, sarking, underlayment board, commercial board, duct board, rigid liner board or OEM (Original Equipment Manufacturer) board.

In one embodiment, the insulation layer 3602 including a rigid material may have a density of at least 32 kg per cubic meter, or at least 48.1 kg per cubic meter, or at least 64.1 kg per cubic meter, or at least 80.1 kg per cubic meter, or at least 96.1 kg per cubic meter, or at least 112.1 kg per cubic meter, or at least 128.1 kg per cubic meter, or at least 144.2 kg per cubic meter, or at least 160.2 kg per cubic meter, or at least 240.3 kg per cubic meter. In a further embodiment, the insulation layer 3602 may include a foam material, and the insulation layer 3602 may have a density of not greater than 320.4 kg per cubic meter, or not greater than 240.3 kg per cubic meter, or not greater than 160.2 kg per cubic meter, or not greater than 144.2 kg per cubic meter, or not greater than 128.1 kg per cubic meter, or not greater than 112.1 kg per cubic meter, or not greater than 96.1 kg per cubic meter, or not greater than 80.1 kg per cubic meter, or not greater than 64.1 kg per cubic meter, or not greater than 48.1 kg per cubic meter. It will be appreciated that the density of the insulation layer 3602 may be within a range between any of the minimum and maximum values noted above. It will be further appreciated that the insulation layer 3602 may have a density of any value between any of the minimum and maximum values noted above.

In one embodiment, the insulation material may include vermiculite, perlite, expanded perlite, cotton wool, cotton fibrous insulation such as recycled cotton clothing or fabrics, butyl rubber, radiant barriers, "bubble wrap" style insulations, vacuum-insulated panels, or phase change materials.

In one embodiment, the insulation layer 3602 may have an interior major surface, an exterior major surface, and four side surfaces. In a further embodiment, the insulation layer 3602 may be attached to the atmospheric regulation layer 3604 at the interior major surface, and the second major surface may face an external surface 3608. In a further embodiment, the insulation second major surface may face, but not contact the external surface 3608.

In one embodiment, the insulation layer 3602 may have a thickness of at least 1.3 cm, or at least 2.5 cm, or at least 5.1 cm, or at least 10.2 cm, or at least 15.2 cm, or at least 20.3 cm, or at least 25.4 cm, or at least 30.5 cm, or at least 35.6 cm, or at least 40.6 cm, or at least 45.7 cm, or at least 50.8 cm, or at least 55.9 cm, or at least 61 cm, or at least 66 cm, or at least 71.1 cm. In a further embodiment, the insulation layer 3602 may have a thickness of not greater than 76.2 cm, or not greater than 71.1 cm, or not greater than 66 cm, or not greater than 61 cm, or not greater than 55.9 cm, or not greater than 50.8 cm, or not greater than 45.7 cm, or not greater than 40.6 cm, or not greater than 35.6 cm, or not greater than 30.5 cm, or not greater than 25.4 cm, or not greater than 20.3 cm, or not greater than 15.2 cm, or not greater than 10.2 cm, or not greater than 5.1 cm, or not greater than 2.5 cm. It will be appreciated that the thickness of the insulation layer 3602 may be within a range between any of the minimum and maximum values noted above. It will be further appreciated that the insulation layer 3602 may have a thickness of any value between any of the minimum and maximum values noted above. Multiple insulation layers 3602 of varying thicknesses may be combined to create a system of the appropriate thickness for the thermal resistance properties required.

In another embodiment such as under the rigid or foam conditions, the insulation layer 3602 may have a unitary structure, meaning that the insulation layer 3602 can be handled and installed as a single cohesive unit rather than a plurality of separate units. Such a unitary insulation layer 3602 may have a thickness of at least 1.3 cm, or at least 2.5 cm, or at least 5.1 cm, or at least 10.2 cm, or at least 15.2 cm, or at least 20.3 cm, or at least 25.4 cm, or at least 30.5 cm, or at least 35.6 cm. In a further embodiment, the unitary insulation layer 3602 may have a thickness of not greater than 40.6 mm, or not greater than 35.6 mm, or not greater than 30.5 mm, or not greater than 25.4 mm, or not greater than 20.3 mm, or not greater than 15.2 mm, or not greater than 10.2 mm, or not greater than 5.1 mm, or not greater than 2.5 cm. It will be appreciated that the thickness of the unitary insulation layer 3602 may be within a range between any of the minimum and maximum values noted above. It will be further appreciated that the unitary insulation layer 3602 may have a thickness of any value between any of the minimum and maximum values noted above. Multiple unitary structures of varying thicknesses may be combined to create a system of the appropriate thickness for the thermal resistance properties required.

In another embodiment, the insulation layer 3602 may have an uncompressed thickness with a particular uniformity. For example, the insulation layer 3602 may have an uncompressed thickness with a standard deviation of not greater than 30%, or not greater than 25%, or not greater than 20%, or not greater than 15%, or not greater than 10%, or not greater than 5%, or not greater than 1%.

In another embodiment, the insulation layer 3602 may have a width of at least 30.5 cm, or at least 38.1 cm, or at least 45.7 cm, or at least 53.3 cm, or at least 61 cm, or at least 68.6 cm, or at least 76.2 cm, or at least 83.8 cm, or at least 91.4 cm, or at least 99.1 cm, or at least 106.7 cm, or at least 114.3 cm, or at least 121.9 cm, or at least 137.2 cm, or at least 152.4 cm, or at least 167.6 cm. In a further embodiment, the insulation layer 3602 may have a width of not greater than 182.9 cm, or not greater than 167.6 cm, or not greater than 152.4 cm, or not greater than 137.2 cm, or not greater than 121.9 cm, or not greater than 114.3 cm, or not greater than 106.7 cm, or not greater than 99.1 cm, or not greater than 91.4 cm, or not greater than 83.8 cm, or not greater than 76.2 cm, or not greater than 68.6 cm, or not greater than 61 cm, or not greater than 53.3 cm, or not greater than 45.7 cm, or not greater than 38.1 cm. It will be appreciated that the width of the insulation layer 3602 may be within a range between any of the minimum and maximum values noted above. It will be further appreciated that the insulation layer 3602 may have a width of any value between any of the minimum and maximum values noted above.

In one embodiment, the insulation layer 3602 may have a length of at least 0.6 m, or at least 0.9 m, or at least 1.2 m, or at least 1.5 m, or at least 1.8 m, or at least 2.4 m, or at least 3.1 m, or at least 3.7 m, or at least 4.3 m, or at least 4.9 m, or at least 5.5 m, or at least 6.1 m, or at least 9.2 m, or at least 12.2 m, or at least 15.3 m, or at least 22.9 m. In a further embodiment, the insulation layer 3602 may have a length of not greater than 30.5 m, or not greater than 22.9 m, or not greater than 15.3 m, or not greater than 12.2 m, or not greater than 9.2 m, or not greater than 6.1 m, or not greater than 5.5 m, or not greater than 4.9 m, or not greater than 4.3 m, or not greater than 3.7 m, or not greater than 3.1 m, or not greater than 2.4 m, or not greater than 1.8 m, or not greater than 1.5 m, or not greater than 1.2 m, or not greater than 0.9 m. It will be appreciated that the length of the insulation layer 3602 may be within a range between any of the minimum and maximum values noted above. It will be further appreciated that the insulation layer 3602 may have a length of any value between any of the minimum and maximum values noted above.

According to another embodiment, an insulation system 3700 may include an insulation layer 3702, an atmospheric regulation layer 3704, a structural support 3706, and an external surface 3708. In another embodiment, the atmospheric regulation layer 3704 may be supported by the structural support 3706. In another embodiment, the insulation layer 3702 may be located between the atmospheric regulation layer 3704 and the external surface 3708. In another embodiment, the atmospheric regulation layer 3704 regulates the flow of air and water vapor. In another embodiment, the atmospheric regulation layer 3704 regulates the flow of air and water between the interior space and the exterior space.

In one embodiment, for example, the atmospheric regulation layer 3704 can have adaptable water vapor permeability such that the permeability to water vapor increases as the relative humidity increases. Water vapor permeability may be measured by ASTM E96-00 "Standard Test Method for Water Vapor Transmission of Materials." In further embodiments, the film's permeance may be not greater than 3 perms, or not greater than 2 perms, or not greater than 1 perm, or not greater than 0.5 perm, or not greater than 0.1 perm when tested in accordance with ASTM E-96 Procedure A, dry cup method. In still further embodiments, the film's permeance may be at least 6 perms, or at least 8 perms, or at least 10 perms, or at least 12 perms, or at least 14 perms, or at least 16 perms, or at least 18 perms, or at least 20 perms, or at least 22 perms, or at least 24 perms when tested using ASTM E-96 Procedure B wet cup method. This process allows the building material to increase its drying potential dependent upon the presence of water, which consequently forms elevated levels of water vapor. In another embodiment, the film reacts to relative humidity— which has significance in regard to building materials' endurance and susceptibility to mold growth when relative humidity increases above 60 percent—by increasing its water vapor permeability with increasing concentrations of moisture. This transformation allows drying to occur through the process of vapor diffusion, thereby improving the speed of drying of the insulation materials and other building components such as sheathing and framing lumber. In one embodiment, the film allows trapped moisture to escape, thereby alleviating a consequent formation of mold and water damage typically associated with excess trapped moisture in the insulation and other building materials.

In a further embodiment, for example, the atmospheric regulation layer 3704 can be ethylene vinyl alcohol (EVOH), EVOH coextruded or laminated with at least a second polymer, a blended polymer comprising EVOH, polyvinyl alcohol (PVOH), nylon, polyamide 3, polyamide 4, polyamide 6, polyamide 66, ethylene vinyl acetate (EVA), polyethylene, polypropylene, polyester, polycarbonate, polyurethane, polyvinyl chloride (PVC), latex (such as a vinyl and acrylic latex paint), EVA coextruded with Nylon, a blended polymer film comprising EVOH or PVOH, or any combination of coextruded layers of such polymers. In another embodiment, the atmospheric regulation layer 3704 can have a combination of multiple layers of materials to achieve the desired properties.

Table 1 below provides a list of exemplary materials and their published water vapor permeabilities when tested in accordance with ASTM E-96 Procedure A, dry cup method, and in accordance with ASTM E-96 Procedure B wet cup method.

TABLE 1

| Material | Thickness (inches) | ASTM E96 Dry Cup (perms) | ASTM E96 Wet Cup (perms) |
|---|---|---|---|
| Polyamide | 0.69 to 1.72 | | >3.45 |
| polyethylene copolymer membrane on polyethylene non-woven felt | | 0.31 | 3.45 |
| Honeywell Capran ® Nylon 6 film not biaxially oriented | 0.002 | 0.76 | 11.9 |
| Honeywell Capran ® Emblem ™ 2500 Biaxially Oriented Nylon | 0.001 | 1.10 | 7.92 |
| Honeywell Capran ® Emblem ™ 1500 Biaxially Oriented Nylon | 0.0006 | 1.64 | 11.94 |
| Honeywell Capran ® Oxyshield ™ OXTR machine direction oriented (coextrusion of Nylon and EVOH) | 0.001 | 0.11 | 5.09 |
| Honeywell Capran ® Oxyshield ™ OBS machine direction oriented (coextrusion of Nylon and EVOH) | 0.00065 | 0.38 | 3.88 |
| EVAL EVOH EF-E 44 mole % ethylene | 0.0012 | 0.109 | 0.95 |
| Eval EVOH EF-CR 27 mole % ethylene | 0.0009 | 0.141 | 14.77 |
| Soarus EVOH-29 29 mole % ethylene | 0.0012 | 0.035 | 11.88 |
| Soarus EVOH 44 44 mole % ethylene | 0.0012 | 0.066 | 2.03 |
| ExxonMobil Escorene Ultra EVA LD719.93 15% vinyl acetate copolymer | 0.0014 | 2.11 | 1.50 |
| ExxonMobil Escorene Ultra EVA LD720.01 19.3% vinyl acetate copolymer | 0.0014 | 2.14 | 1.32 |
| ExxonMobil Escorene Ultra EVA LD767.mj 29.5% vinyl acetate copolymer | 0.0018 | 4.91 | 3.54 |
| Bemis Clysar LE Polyethylene | 0.0006 | 0.81 | 0.57 |
| Bovlon Poly Vinyl Alcohol | 0.0005 | 0.016 | 25.83 |
| GE Lexan FR83 Polycarbonate | 0.0032 | 1.24 | 0.98 |
| Profol Polypropylene | 0.0013 | 0.16 | 0.20 |
| SKC Polyester | 0.0014 | 0.40 | 0.33 |
| Deerfield PT9200-US Polyurethane | 0.00093 | 18.89 | 25.12 |
| Grafix PVC | 0.0029 | 0.38 | 0.31 |

In one embodiment, the atmospheric regulation layer 3704 may include a layer that is permeable to water vapor. For example, the atmospheric regulation layer 3704 may have a water vapor permeability of at least 6 perms as measured by ASTM E96. In a further embodiment, the atmospheric regulation layer 3704 may include plastic foil, aluminum, Kraft aluminum, SSK F25 foil scrim Kraft products, mylar, cellulose, or a metalized polymer. In another embodiment, the layer may contain perforations to increase the permeability.

In one embodiment, the atmospheric regulation layer 3704 may have a layer that is impermeable to water vapor. For example, the atmospheric regulation layer 3704 may have a water vapor permeability of not greater than 1 perm as measured by ASTM E96. In a further embodiment, the atmospheric regulation layer 3704 may include polyethylene, polypropylene, polyester, foil scrim kraft products, coated polypropylene, metalized polymer, aluminum, bitumen, or a butyl-based membrane. In another embodiment, the layer may contain few or no perforations to ensure lower permeability.

In one embodiment, the insulation layer 3702 can be located between the external surface 3708 and the atmospheric regulation layer. Separation of the insulation layer 3702 from the external layer by greater distances may allow for easier installation of the product for installers, and avoidance of additional equipment such as ladders, platforms, and associated safety equipment for working at heights to install same. Such an arrangement advantageously allows simultaneous regulation of the flow of heat, air, and water vapor. In a further embodiment, the atmospheric regulation layer 3704 may be bonded to the insulation layer.

In some embodiments, the atmospheric regulation layer 3704 may be planar. In another embodiment, the atmospheric regulation layer 3704 may also be continuous such that it is joined to a structural support 3706 or to an adjacent atmospheric regulation layer. In another embodiment, the continuous atmospheric regulation layer 3704 may include a tape or a glue connecting adjacent atmospheric regulation layers. In another embodiment, the tape may include a polymer film and an adhesive. In another embodiment, the polymer film may be a butyl polymer, a polyethylene, or another polymer film. In one embodiment, the polymer film may be impermeable to water vapor, or it may have adaptive water vapor permeability. In another embodiment, the polymer film may include reinforcing fibers, or it may have sufficient strength without the reinforcing fibers. In another embodiment, the adhesive may be a hot-melt adhesive or a pressure-sensitive adhesive. In one embodiment, the tape may not have any water vapor adaptivity, and only serve to hold together layers of the adjacent atmospheric regulation layer. In another embodiment, the adjacent atmospheric regulation layers may be overlapped to ensure there is a continuous surface with the desired atmospheric regulation property.

In one embodiment, the continuous atmospheric regulation layer 3704 may have an ACH50 value of not greater than 10, or not greater than 5, or not greater than 3, or not greater than 1.5, or not greater than 0.6, where ACH50 represents an air exchange at 50. Pascals.

In a different embodiment, the insulation layer 3702 may have a thickness extending from the atmospheric regulation layer 3704 to an external surface 3708, and where the thickness of the insulation layer 3702 has a unitary construction. In another embodiment, the insulation layer 3702 may stop short of the external surface 3708.

In one embodiment, the atmospheric regulation layer 3704 may have a particular thickness. For example, the atmospheric regulation layer 3704 may have a thickness of at least 0.003 mm, or at least 0.01 mm, or at least 0.015 mm, or at least 0.02 mm, or at least 0.025 mm, or at least 0.051 mm, or at least 0.076 mm, or at least 0.102 mm, or at least 0.127 mm, or at least 0.152 mm, or at least 0.203 mm, or at least 0.254 mm, or at least 0.381 mm, or at least 0.508 mm, or at least 1.27 mm, or at least 2.54 mm. In a further embodiment, the atmospheric regulation layer 3704 may have a thickness of not greater than 5.08 mm, or not greater than 2.54 mm, or not greater than 1.27 mm, or not greater than 0.508 mm, or not greater than 0.381 mm, or not greater than 0.254 mm, or not greater than 0.203 mm, or not greater than 0.152 mm, or not greater than 0.127 mm, or not greater than 0.102 mm, or not greater than 0.076 mm, or not greater than 0.051 mm, or not greater than 0.025 mm, or not greater than 0.02 mm, or not greater than 0.015 mm, or not greater than 0.01 mm. It will be appreciated that the thickness of the atmospheric regulation layer 3704 may be within a range between any of the minimum and maximum values noted above. It will be further appreciated that the atmospheric regulation layer 3704 may have a thickness of any value between any of the minimum and maximum values noted above.

In one embodiment, the atmospheric regulation layer 3704 may have certain fire retardant properties. In another embodiment, the atmospheric regulation layer 3704 may have certain fire resistant properties. For example, the atmospheric regulation layer 3704 may have a fire class A rating as measured by ASTM E84. In a further embodiment, the atmospheric regulation layer 3704 may include a polymer layer having fire retardant properties. In a yet further embodiment, the atmospheric regulation layer 3704 may include a fire control material such as a coating. In another embodiment, the fire control material may include boric acid, aluminum trihydrate, a halogenated fire retardant, a non-halogenated fire retardant, or an intumescent coating. For another example, the atmospheric regulation layer 3704 may have a fire rating as measured by ASTM E84 of not greater than 25 for flame spread and not more than 50 for smoke developed. For another example, the atmospheric regulation layer 3704 may have a fire rating as measured by ASTM E84 of not greater than 50 for flame spread and not more than 450 for smoke developed. In further embodiments, the atmospheric regulation layer 3704 may have a fire rating as measured by ASTM E84 of not greater than 450, or not greater than 400, or not greater than 350, or not greater than 300, or not greater than 250, or not greater than 200, or not greater than 150, or not greater than 100, or not greater than 75, or not greater than 50, or not greater than 25, or not greater than 10 for smoke developed.

According to another embodiment, an insulation system 3800 may include an insulation layer 3802, an atmospheric regulation layer 3804, a structural support 3806, and an external surface 3808. In one embodiment, the atmospheric regulation layer 3804 may be supported by the structural support 3806. In another embodiment, the insulation layer 3802 may be located between the atmospheric regulation layer 3804 and the external surface 3808. In another embodiment, the atmospheric regulation may be reinforced by a reinforcement layer 3810. In one embodiment, the reinforcement layer 3810 may be located in direct contact to the atmospheric regulation layer 3804. In another embodiment, the reinforcement layer 3810 increases the tear resistance of the atmospheric regulation layer 3804. In another embodiment, the reinforcement serves to allow the atmospheric regulation layer 3804 to be fastened to a structural support 3806 by a fastener, for example, a nail, a staple, a bolt, a screw, an adhesive, an adhesive tape (single or double-sided), a film, a hook, a hook-and-loop fabric system, a pin, a spreadhead fastener, a combination thereof, or another type.

In a further embodiment, the fastener may include a metal, a polymer, or a composite. In a still further embodiment, the fastener may include a pressure distribution surface, where the pressure distribution surface has a planar surface having an area of at least 0.1 square centimeters.

In one embodiment, the reinforcement layer 3810 may have a yarn mesh. In another embodiment, the yarn mesh may have appropriate weave, thread density, and thread diameter to provide sufficient reinforcement for the atmospheric regulation layer 3804 and fastener used.

In one embodiment, the reinforcement layer 3810 may be a single continuous layer spanning the atmospheric regulation layer 3804. In another embodiment, the reinforcement layer 3810 may be discontinuous, such as in stripes or patches. In a further embodiment, the reinforcement layer 3810 may surround the area of the atmospheric regulation layer 3804 where a fastener is used.

In another embodiment, the reinforcement layer 3810 may have a particular thickness. For example, the reinforcement layer 3810 may have a thickness of at least 0.005 mm, or at least 0.01 mm, or at least 0.03 mm, or at least 0.05 mm, or at least 0.08 mm, or at least 0.1 mm, or at least 0.13 mm, or at least 0.15 mm, or at least 0.2 mm, or at least 0.25 mm, or at least 0.38 mm, or at least 0.51 mm, or at least 1.27 mm, or at least 2.54 mm, or at least 3.81 mm. In a further embodiment, the reinforcement layer 3810 may have a thickness of not greater than 5.08 mm, or not greater than 3.81 mm, or not greater than 2.54 mm, or not greater than 1.27 mm, or not greater than 0.51 mm, or not greater than 0.38 mm, or not greater than 0.25 mm, or not greater than 0.2 mm, or not greater than 0.15 mm, or not greater than 0.13 mm, or not greater than 0.1 mm, or not greater than 0.08 mm, or not greater than 0.05 mm, or not greater than 0.03 mm. It will be appreciated that the thickness of the reinforcement layer 3810 may be within a range between any of the minimum and maximum values noted above. It will be further appreciated that the reinforcement layer 3810 may have a thickness of any value between any of the minimum and maximum values noted above.

In one embodiment, the insulation system may also include a structural support 3806. In a further embodiment, the structural support 3806 may be a preexisting portion of a structure, such as a truss or stud. In another embodiment, the structural support 3806 may be added for the purpose of supporting the insulation material and the atmospheric regulation layer 3804. In a further embodiment, the structural support 3806 may be arranged to be parallel to the plane of the insulation material. In a different embodiment, the structural support 3806 may be arranged to be perpendicular to the plane of the insulation material. In another embodiment, the insulation system may include any number of structural support 3806s sufficient to support the quantity of insulation material used. In one embodiment, the structural support 3806s may contact the insulation material directly. In another embodiment, the structural support 3806s may contact the atmospheric regulation layer 3804 directly. In still another embodiment, the structural support 3806s may contact the reinforcement layer 3810 directly.

In one embodiment, the structural support 3806 may include a wood, a polymer, a metal, a paper, or a composite. Any material having sufficient mechanical strength may be used.

In yet another embodiment, the structural support 3806 may have a width of at least 7 mm, or at least 12 mm, or at least 18 mm, or at least 25 mm, or at least 32 mm, or at least 39 mm, or at least 46 mm, or at least 53 mm, or at least 60 mm, or at least 67 mm, or at least 74 mm, or at least 81 mm, or at least 88 mm, or at least 95 mm, or at least 100 mm. In a further embodiment, the structural support 3806 may have a width of not greater than 100 mm, or not greater than 95 mm, or not greater than 88 mm, or not greater than 81 mm, or not greater than 74 mm, or not greater than 67 mm, or not greater than 60 mm, or not greater than 53 mm, or not greater than 46 mm, or not greater than 39 mm, or not greater than 32 mm, or not greater than 25 mm, or not greater than 18 mm, or not greater than 12 mm, or not greater than 7 mm. It will be appreciated that the width of the structural support 3806 may be within a range between any of the minimum and maximum values noted above. It will be further appreciated that the structural support 3806 may have a width of any value between any of the minimum and maximum values noted above.

In yet another embodiment, the structural support 3806 may have a height of at least 7 mm, or at least 12 mm, or at least 25 mm, or at least 37 mm, or at least 50 mm, or at least 62 mm, or at least 75 mm, or at least 100 mm, or at least 125 mm, or at least 150 mm, or at least 200 mm, or at least 250 mm, or at least 300 mm, or at least 350 mm, or at least 400 mm. In a further embodiment, the structural support 3806 may have a height of not greater than 400 mm, or not greater than 350 mm, or not greater than 300 mm, or not greater than 250 mm, or not greater than 200 mm, or not greater than 150 mm, or not greater than 125 mm, or not greater than 100 mm, or not greater than 75 mm, or not greater than 62 mm, or not greater than 50 mm, or not greater than 37 mm, or not greater than 25 mm, or not greater than 12 mm, or not greater than 7 mm. It will be appreciated that the height of the structural support 3806 may be within a range between any of the minimum and maximum values noted above. It will be further appreciated that the structural support 3806 may have a height of any value between any of the minimum and maximum values noted above.

In one embodiment, the structural support 3806 may have a particular length. For example, the structural support 3806 may have a length of at least 0.3 m, or at least 0.6 m, or at least 0.9 m, or at least 1.2 m, or at least 1.5 m, or at least 1.8 m, or at least 2.4 m, or at least 3.1 m, or at least 3.7 m, or at least 4.3 m, or at least 4.9 m, or at least 5.5 m. In a further embodiment, the structural support 3806 may have a length of not greater than 6.1 m, or not greater than 5.5 m, or not greater than 4.9 m, or not greater than 4.3 m, or not greater than 3.7 m, or not greater than 3.1 m, or not greater than 2.4 m, or not greater than 1.8 m, or not greater than 1.5 m, or not greater than 1.2 m, or not greater than 0.9 m, or not greater than 0.6 m. It will be appreciated that the length of the structural support 3806 may be within a range between any of the minimum and maximum values noted above. It will be further appreciated that the structural support 3806 may have a length of any value between any of the minimum and maximum values noted above.

According to still other embodiments, an insulation system 3900 is disclosed and can include an insulation layer 3902, a structural support 3904, and an external surface 3906. In this embodiment, the structural support 3904 may further have hangers 3908 for supporting the insulation layer 3902. In another embodiment, each hanger 3908 may include a hanger body 3910 having a first end 3912 and a second end 3914. In one embodiment, the insulation layer may be fully located in the space between the first and second ends. In another embodiment, the insulation layer may be partially located in the space between the first and second ends.

In one embodiment, the insulation system 3900 may further include a barrier 3920 that is defined as any obstacle preventing movement of the insulation layer. This barrier 3920 may hold the insulation system in a fixed position away from the external surface. In another embodiment, the barrier 3920 may hold the insulation system to prevent movement of the insulation layer away from the external surface. In further embodiments, the barrier 3920 may include a stud, a rail, a batten, a strapping, a gypsum board, a grid (of studs, planks or another component), a netting, a facing (including facing of insulation or otherwise), a mesh, a coated or non-coated fabric, a non-woven or woven fabric, a barrier created from a liquid mixture, a tape, a membrane, a kraft-faced batt of insulation, or a combination thereof, or may be another type. In another embodiment, the barrier 3920 may be formed from wood or plastic, in some examples.

In another embodiment, the barrier 3920 also may include at least one of open glass mesh, vapor closed polyethylene, an adaptive water vapor layer, or a combination thereof. In another embodiment, the barrier 3920 can support blown insulation comprising at least one of fiberglass, stonewool or cellulose. In addition, the barrier 3920 may be reinforced with a glass net that supports a pressure of blown insulation. In still other versions, the barrier 3920 may include gypsum boards mounted to the second ends of the hangers. In one example, an adaptive water vapor layer may be mounted to the gypsum board. In other embodiments, the barrier may 3920 include a facing attached to the insulation through an insulation attachment. In another embodiment, the insulation layer 3902 may be adapted to be secured to the barrier 3920 or facing through a fastener. In one embodiment, the fastener may include a nail, a staple, a bolt, a screw, an adhesive, an adhesive tape (single or double-sided), a film, a hook, a hook-and-loop fabric system, a pin, a spreadhead fastener, a combination thereof, or may be another type.

In a number of embodiments, the barrier 3920 may be a substantially planar, elongated panel. In another embodiment, the barrier 3920 may include a barrier-to-hanger attachment component. In one embodiment, the barrier-to-hanger attachment component may include a groove, planar surface, projection, or combination thereof, or may be another type. In another embodiment, the barrier-to-hanger attachment component may aid to couple, pair, engage, or otherwise attach the barrier to the hanger.

In one embodiment, the hanger 3908 may include a barrier attachment component. In another embodiment, the barrier attachment component may couple the hanger 3908 to the barrier 3920. In another embodiment, the fastener may include a barrier attachment projection coupled to or integral with the hanger, such as a nail, a staple, a bolt, a screw, an adhesive, an adhesive tape (single or double-sided), a film, a hook, a hook-and-loop fabric system, a pin, a spreadhead fastener, a combination thereof, or another type. In a number of embodiments, the hanger 3908 may include a barrier attachment component. In one embodiment, the barrier attachment component may couple, engage, secure, or attach the hanger to a barrier at the second end of the hanger. In another embodiment, the second end may include the barrier attachment component. In another embodiment, the barrier attachment component may couple the hanger to the barrier at an axial top of the barrier. In one embodiment, the barrier attachment component may be adapted to be secured to the barrier through a fastener. In another embodiment, the fastener may include a beam attachment projection coupled to or integral with the hanger, such as a nail, a staple, a bolt, a screw, an adhesive, an adhesive tape (single or double-sided), a film, a hook, a hook-and-loop fabric system, a pin, a spreadhead fastener, a combination thereof, or another type.

In a number of embodiments, the hanger may include plastic, such as thermoplastics, chlorinated polymers, polyolefins, acrylates, amides, esters, polyimides, a combination thereof, or may be another type. In a number of embodiments, the hanger may include a polymer that can be injection moldable or extruded, a polymer blend or a composition of such polymer or a blend with mineral, glass, polymeric and/or natural fillers in a non-fibrous and/or fibrous form. In an embodiment, the hanger can include polymethyl methacrylate (PMMA), acrylonitrile butadiene styrene (ABS), styrene acrylonitrile (SAN), polycarbonate (PC), polypropylene, polyolefin, polyethylene, polyester, polyamide, polyimide, polyvinyl chloride (PVC), cross-linked PVC, chlorinated polyvinyl chloride (CPVC), thermoplastics, chlorinated polymers, a combination thereof, or may be another type. In some versions, the hanger itself may be a non-metallic material, such as a rubber, a ceramic, a combination thereof, or may be another type. In some embodiments, the hanger may be metallic. In a number of variations, the hanger may be metallic with a non-metallic coating. In one embodiment, the non-metallic coating may include a plastic as described herein. In other versions, only a portion of hanger may be metallic so as to not form a thermal bridge. In a number of embodiments, the hanger may have a maximum thermal conductivity of not greater than 1 W/m·K. In a number of embodiments, the hanger may have a thermal conductivity of not greater than 0.5 W/m·K. In a number of embodiments, the hanger may be rigid and not designed to be deformable. In a number of embodiments, the hanger may be formed through a molding process. In a particular embodiment, the hanger can be melt processed by any method envisioned or known in the art such as laminating, casting, molding, extruding, and the like. In an embodiment, the hanger can be injection molded.

In one embodiment, the hanger may have an overall length $L_H$ between the first end and the second end. In another embodiment, the overall length $L_H$ may be least 10 mm, or at least 20 mm, or at least 50 mm, or at least 100 mm, or at least 200 mm, or at least 500 mm, or at least 1000 mm. In another embodiment, the overall length $L_H$ may be not greater than 10 mm, or not greater than 20 mm, or not greater than 50 mm, or not greater than 100 mm, or not greater than 200 mm, or not greater than 500 mm, or not greater than 1000 mm.

In a number of embodiments, the hanger may include a beam attachment component having a first face. In one embodiment, the first face may have a first side, a second side, a first edge, and a second edge. In another embodiment, the first face may include a top and a bottom.

In some embodiments, the first face may have a length $L_{FF}$ between the top and the bottom. In one embodiment, the first face length $L_{FF}$ may be at least 5 mm, or at least 10 mm, or at least 20 mm, or at least 50 mm, or at least 100 mm, or at least 200 mm, or at least 500 mm. In another embodiment, the first face length $L_{FF}$ may be not greater than 5 mm, or not greater than 10 mm, or not greater than 20 mm, or not greater than 50 mm, or not greater than 100 mm, or not greater than 200 mm, or not greater than 500 mm. In a number of embodiments, the length $L_{FF}$ may be modified to correspond to a length of a beam $L_B$ to adjust the hanger without the need of a lip.

In one embodiment, the first face may have a width $W_{FF}$ between the radial first end of the first side and the radial second end of the first side. In another embodiment, the first face width $W_{FF}$ may be at least 5 mm, or at least 10 mm, or at least 20 mm, or at least 50 mm, or at least 100 mm, or at least 200 mm. In another embodiment, the width $W_{FF}$ may be 5 mm, or not greater than 10 mm, or not greater than 20 mm, or not greater than 50 mm, or not greater than 100 mm, or not greater than 200 mm. In a number of embodiments, the width $W_{FF}$ may be modified to correspond to a width of a beam $W_B$ to adjust the hanger without the need of a lip.

In some embodiments, the first face may have a thickness $T_{FF}$ between the first edge and the second edge. In another embodiment, the first face thickness $T_{FF}$ may be at least 0.5 mm, or at least 1 mm, or at least 5 mm, or at least 10 mm, or at least 15 mm, or at least 20 mm, or at least 25 mm. In another embodiment, the thickness $T_{FF}$ may be not greater than 0.5 mm, or not greater than 1 mm, or not greater than 5 mm, or not greater than 10 mm, or not greater than 15 mm, or not greater than 20 mm, or not greater than 25 mm.

In another embodiment, the insulation system 3900 may include insulation comprising kraft-faced batts of insulation. In some embodiments, the kraft-faced batts of insulation can fill the insulation space between the first end 3912 and the second end 3914 of the hanger 3908. In some embodiments, the kraft-faced batts of insulation or the insulation as described herein can fill the insulation space between the beam and the barrier. In some embodiments, the kraft-faced batts of insulation as described herein can fill the insulation space between the bottom of the beam and the top of the barrier. In some embodiments, the kraft-faced batts of insulation or the insulation as described herein can fill the insulation space between the deck and the barrier. In some embodiments, to avoid air flow in the insulation, ventilation baffles may be installed under the deck between a soffit and a ridge vent as is commonly known in the art. In some embodiments, the second ends 3914 of the hangers 3908 may be closed by at least one of bonded, taped or stapled to the kraft-faced batts. In some embodiments, the first ends 3912 of the hangers 3908 may be closed by at least one of bonded, taped or stapled to the kraft-faced batts. In a number of embodiments, tape may be used to fasten the first 3912 or second ends 3914 of the hanger 3908 to the kraft-faced batts. In another embodiment, the tape may have a releasable liner, release coating, or could be unrolled to apply to either the first 3912 or second ends 3914 of the hanger 3908, or to the kraft-faced batts. In some embodiments, the junction between the facing of the kraft-faced batts of insulation or the insulation and the hanger may be attached by the tape. In further embodiments, the tape may be on the hanger or on the kraft-faced batts of insulation or the insulation. In still further embodiments, the tape may be double sided. As an example, a tape with a releasable liner may be positioned on one or both of the first end and the second end. In a number of embodiments, the tape may be on at least one of the beam attachment component or the barrier attachment component. In one version, the tape may be butyl tape. Such closures may enhance airtightness and moisture management, and avoid sagging thereof. Sagging could generate holes in the system and thermal bridges between the two insulation layers, resulting in potentially unwanted air flows. In another embodiment, the number, layering, or arrangement of the kraft-faced batts may be any suitable manner.

In one embodiment, the insulation system 3900 may be self-supporting. In such embodiments, a barrier 3920, hanger 3908, or structural support 3904 is not needed. In certain embodiments, such as an example of a rigid board, the boards themselves serve the structural purpose. A series of boards can be attached to each other to create the space as required to separate the interior area from the external surface. In such cases, the atmospheric regulation layer may be pre-applied to the rigid boards. In another embodiment, the atmospheric regulation layer may be applied to the system of rigid boards after assembly and installation.

In other embodiments, it will be appreciated that multiple boards of the same thickness or multiple boards of multiple thicknesses may be used in combination for a variety of beneficial effects. For example, multiple thicknesses may be used in combination to achieve greater thermal resistance values (R—values). Multiple boards may be used together to achieve greater structural strength—such as self-supporting over a longer span without intermediate supports. And multiple boards may be used in a fashion that the joints on one layer are off-set to joints on a second layer (or third, or additional). Such off-set of joints can assist to reduce thermal bridges, improve air tightness, and better control moisture flow. Off-setting of such joints also may increase the structural stability or strength of the system.

In one embodiment, the insulation system 3900 may be altered or adapted for other parts of the attic. For example, the insulation system 3900 also may be configured for use on vertical walls or horizontal floors in the attic. In another embodiment, the insulation system 3900 for a home may include an attic with a deck, and beams fastened to the deck. In another embodiment, the deck may be an attic floor deck, a vertical wall deck or a roof deck. In another embodiment, the beams may be floor joists, vertical wall beams or roof rafters.

In a number of embodiments, any component, or combination of components of the insulation system 3900 (including the barrier 3920, hanger 3908 (including any of its components), insulation 3902, beam, tape, insulation support member, house wrap, baffle, fabric, kraft-faced batts, any combination thereof, or other component) may be fire class A (ASTM E84 classification). Fire retardant agents may be added to any component of the insulation system. In an embodiment, the insulation system has a fire class A rating. In another embodiment, the barrier 3920, hanger 3908 (including any of its components), insulation 3902, beam, tape, insulation support member, house wrap, baffle, fabric, kraft-faced batts, any combination thereof, or other component has a fire class A rating.

In a number of embodiments, any component, or combination of components of the insulation system 3900 (including the barrier 3920, hanger 3908 (including any of its components), insulation 3902, beam, tape, insulation support member, house wrap, baffle, fabric, kraft-faced batts, any combination thereof, or other component) may be configured to provide and adjust moisture management to a desirable level based on the application of the insulation system, thanks to the use of an adaptive vapor layer, a vapor open membrane or a vapor barrier adapted to the climate zone positioned on the inner side of the insulation system. Examples of these components are shown in U.S. Patent Publication No. 2015-0176211 to Knapp et al., U.S. Pat. No. 7,008,890 to Kunzel et al., and W.O. Patent Publication No. WO 2015/095786 to Peet et al.

In a number of embodiments, any component, or combination of components of the insulation system 3900 (including the barrier 3920, hanger 3908 (including any of its components), insulation 3902, beam, tape, insulation support member, house wrap, baffle, fabric, kraft-faced batts, any combination thereof, or other component) may be configured to provide and adjust air tightness to a desirable level based on the application of the insulation system. In an embodiment the insulation system can gave a particular Air Changes per Hour ("ACH") rating, such as an "ACH50" ((air exchange per hour at 50 Pa) rating. In an embodiment, the insulation system can have an ACH50 rating of not greater than 10, or not greater than 5, or not greater than 3, or not greater than 1.5, or not greater than 0.6. In another embodiment, the improved airtightness on the inner side of the roof gives a better moisture control than other solutions found in the literature using an airtightness on the roof deck (external side of the assembly).

Still other versions may include one or more of the following embodiments:

Embodiment 1

A hanger for supporting insulation in an attic having rafters that support a roof deck, the hanger comprising: a beam having an axis and an elongated profile in an axial direction, wherein the elongated profile comprises: a proximal end configured to be coupled to the rafters, wherein the proximal end comprises at least one planar portion and is configured to be substantially parallel to the roof deck and substantially perpendicular to the rafters when installed; a ventilated air gap is configured to be provided between the proximal end and the roof deck; a distal end that is substantially planar and parallel to the planar portion of the proximal end; at least one web that is substantially planar, the web extending substantially perpendicular to and between the proximal end and the distal end, and the web comprises apertures or voids located between the proximal and distal ends; an insulation space defined along the web between the proximal and distal ends; and the distal end is configured to be coupled to an insulation batt located in the insulation space.

Embodiment 2

The hanger of embodiment 1, wherein the beam consists of a polymer composition.

Embodiment 3

The hanger of embodiment 1, wherein the beam may be cut with a manual tool such as a snip, and the beam is configured to support fiberglass batts without any additional strapping.

Embodiment 4

The hanger of embodiment 1, wherein the beam is perforated.

Embodiment 5

The hanger of embodiment 1, wherein the proximal end comprises perforations.

Embodiment 6

The hanger of embodiment 5, wherein the perforations comprise parallel rows of slits.

Embodiment 7

The hanger of embodiment 6, wherein the slits are at least one of rounded, oblong and rectangular.

Embodiment 8

The hanger of embodiment 1, wherein the web is perforated.

Embodiment 9

The hanger of embodiment 1, wherein the distal end is not perforated.

Embodiment 10

The hanger of embodiment 1, wherein the beam comprises at least one of an I-beam, a J-beam, a C-beam and an S-beam.

Embodiment 11

The hanger of embodiment 1, wherein each end of the elongated profile comprises tabs configured to engage a second beam.

Embodiment 12

The hanger of embodiment 11, wherein the tabs are located only on the proximal end.

Embodiment 13

The hanger of embodiment 1, wherein portions of the beam are formed from different materials.

Embodiment 14

The hanger of embodiment 13, wherein a first portion of the beam comprises glass-reinforced polyvinylchloride (PVC), and a second portion of the beam comprises PVC.

Embodiment 15

The hanger of embodiment 1, wherein portions of the beam have different coefficients of thermal expansion.

Embodiment 16

The hanger of embodiment 1, wherein the beam comprises a coefficient of thermal expansion of not greater than about 50E-06 in/(in·F).

Embodiment 17

The hanger of embodiment 1, wherein the beam, with a weight of 0.5 lb at a distance of 10 inches, has a maximum vertical deflection in a range of about 0.1 inches to about 2 inches.

Embodiment 18

The hanger of embodiment 1, wherein the beam, under its own weight, has a maximum deflection in a range of about 1 degree to about 5 degrees, relative to a planes defined by the proximal end and the distal end.

Embodiment 19

The hanger of embodiment 1, wherein the beam comprises a single layer of polymer material.

Embodiment 20

The hanger of embodiment 1, wherein at least portions of the beam are at least one of extruded and injection molded.

Embodiment 21

The hanger of embodiment 1, wherein the proximal ends of the beams are attached only to bottom surfaces of the rafters.

Embodiment 22

A system for insulating an attic of a building, the building having a roof with a roof deck, and rafters supporting the roof deck inside the attic, the system comprising: beams for supporting insulation in the attic, each of the beams comprising an axis and an elongated profile in an axial direction, wherein the elongated profile comprises: a proximal end mounted only to the rafters but not to the roof deck, wherein the proximal end is planar and substantially parallel to the roof deck; a distal end that is substantially planar and parallel to the proximal end; a web that is substantially planar, the web extending substantially perpendicular to and between the proximal end and the distal end; and an insulation space defined along the web between the proximal and distal ends; and the system further comprises: insulation batts mounted to and between adjacent ones of the beams in the insulation spaces, each of the insulation batts comprising an insulation material and an outer layer that faces the distal ends of the beams, and the outer layer comprises an airtightness of ACH50<3; and a first tape applied to the distal ends of the beams and to the outer layers of the insulation batts to form airtight barriers therebetween, and the airtight barriers comprise ACH50<3.

Embodiment 23

The system of embodiment 22, wherein no material of the system extends between adjacent ones of the beams other than the insulation batts and the first tape.

Embodiment 24

The system of embodiment 22, wherein the airtightness and the airtight barriers comprise ACH50<1.6.

Embodiment 25

The system of embodiment 22, wherein the airtightness and the airtight barriers comprise ACH50<0.6.

Embodiment 26

The system of embodiment 22, wherein the outer layer comprises at least one of a smart vapor retarder (SVR) and kraft paper.

Embodiment 27

The system of embodiment 22, further comprising additional tape strips that seal joints formed between abutting batts, the additional tape strips are substantially perpendicular to axes of the beams, and the additional tape strips extend between adjacent ones of the beams.

Embodiment 28

The system of embodiment 22, wherein batts are initially stapled to beams before taping.

Embodiment 29

The system of embodiment 22, wherein the system comprises no other support members or support structures beneath the insulation.

Embodiment 30

The system of embodiment 22, wherein the beams are transverse to the rafters.

Embodiment 31

The system of embodiment 22, wherein the first tape comprises an all weather flashing tape.

Embodiment 32

The system of embodiment 22, further comprising protrusions of the attic extending through the insulation batts, and the tape applied between the protrusions and the insulation batts to form airtight barriers therebetween, and the airtight barriers comprise ACH50<3.

Embodiment 33

The system of embodiment 22, further comprising protrusions of the attic extending through the insulation batts, and a second tape applied between the protrusions and the insulation batts to form airtight barriers therebetween, the airtight barriers comprise ACH50<3, and the second tape differs from the first tape.

Embodiment 34

The system of embodiment 33, wherein the protrusions of the attic comprise truss members that further support the roof.

Embodiment 35

The system of embodiment 33, wherein the second tape is stretch tape comprising an elongation capability of at least about 100%.

Embodiment 36

The system of embodiment 22, further comprising a ventilated air gap between the roof deck and an upper portion of the system.

Embodiment 37

The system of embodiment 22, wherein the proximal ends of the beams are mounted to the rafters with fasteners.

Embodiment 38

The system of embodiment 37, wherein the fasteners comprise staples, nails or screws.

Embodiment 39

The system of embodiment 22, wherein the beams are not metallic.

Embodiment 40

A method of insulating an attic of a building, the building having a roof with a roof deck, and rafters supporting the roof deck inside the attic, the method comprising: (a) providing beams comprising an elongated profile in an axial direction; (b) fastening only proximal ends of the beams to the rafters; (c) positioning insulation batts on distal ends of adjacent ones of the beams, each of the insulation batts comprising an insulation material and an outer layer facing the distal ends of the beams, the outer layer comprising an airtightness of ACH50<3; and (d) applying a tape to the distal ends of the beams and to the outer layers of the insulation batts to form airtight barriers therebetween, and the airtight barriers comprise the airtightness of ACH50<3.

Embodiment 41

The method of embodiment 40, further comprising extending no material between adjacent ones of the beams other than the insulation batts and the tape.

Embodiment 42

The method of embodiment 40, wherein protrusions of the attic extend through the insulation batts, and the method further comprises applying a second tape between the protrusions and the insulation batts to form airtight barriers therebetween, the airtight barriers comprise ACH50<3, and the second tape differs from the first tape.

Embodiment 43

The method of embodiment 42, wherein the protrusions comprise truss members that further support the roof, and the second tape comprises a stretch tape having an elongation capability of at least about 100%.

Embodiment 44

A hanger for supporting insulation in an attic having rafters that support a roof deck, the hanger comprising: a beam having an axis and a profile in an axial direction, wherein the profile comprises: a distal end that is elongated in the axial direction and substantially planar; straps that extend from the distal end, the straps are substantially planar and perpendicular to the distal end, each strap comprises a proximal end that is planar and configured to be coupled to a respective rafter; an insulation space defined along the straps between the proximal ends and distal end; and the distal end is configured to be coupled to an insulation batt located in the insulation space.

Embodiment 45

The hanger of embodiment 44, wherein the proximal ends are substantially parallel to the distal end, and the proximal ends are configured to be substantially parallel to the roof deck when installed.

Embodiment 46

The hanger of embodiment 44, wherein the proximal ends are substantially perpendicular to the distal end.

Embodiment 47

The hanger of embodiment 44, wherein planes defined by the straps are configured to be perpendicular to vertical planes defined along the axial lengths of the rafters.

Embodiment 48

The hanger of embodiment 44, wherein planes defined by the straps are configured to be parallel to vertical planes defined along the axial lengths of the rafters.

Embodiment 49

The hanger of embodiment 44, wherein the proximal ends are configured to attach to only bottom surfaces of the rafters.

Embodiment 50

The hanger of embodiment 44, wherein the proximal ends are configured to attach to bottom surfaces and side surfaces of the rafters.

Embodiment 51

The hanger of embodiment 44, wherein the proximal ends are configured to attach to only side surfaces of the rafters.

Embodiment 52

A method of forming a seal in an insulation system for an attic having rafters and a truss member, the method comprising: (a) installing beams on the rafters; (b) mounting an insulation batt on the beams such that the truss member extends through the insulation batt; (c) providing a tape having a release liner attached thereto and partitioned in segments; and then (d) methodically removing the segments of the release liner while applying the tape to the one truss member and to the insulation batt.

Embodiment 53

The hanger of embodiment 6, wherein the parallel rows of slits are substantially aligned with the axial direction.

Embodiment 54

The hanger of embodiment 19, wherein the single layer of polymer material is folded into a final sectional shape along the axial direction and is at least one of sonic welded, heat staked and thermoformed with ribbed edges.

Embodiment 55

The method of embodiment 40, wherein the distal ends comprise a planar portion that supports the insulation batts.

Embodiment 56

A system for insulating an attic of a building, the building having a roof with a roof deck, and rafters supporting the roof deck inside the attic, the system comprising: brackets aligned and mounted to the rafters; beams attached to the brackets such that the beams are suspended from the rafters via the brackets; insulation batts extending between the beams; and tape to secure the insulation batts to the beams.

Embodiment 57

The system of embodiment 56, wherein the beams and the rafters do not have fixed junctions therebetween, such that the beams and the rafters move independently.

Embodiment 58

The system of embodiment 56, wherein the brackets and beams comprise sliding surfaces therebetween.

Embodiment 59

The system of embodiment 56, wherein each beam a proximal end, a distal end, a web between the proximal and distal end, and the proximal end has a rib.

Embodiment 60

The system of embodiment 59, wherein the rib extends from one side of the proximal end and the rib terminates with a lip that turns back toward the proximal end.

Embodiment 61

The system of embodiment 60, wherein each bracket receives the rib and lip such that a respective beam is clipped into the bracket.

Embodiment 62

The system of embodiment 56, wherein the bracket comprises rafter clips for closely receiving a respective rafter, and the rafter clips support the weight of the bracket on the rafter prior to permanent attachment thereto.

Embodiment 63

The system of embodiment 56, wherein each bracket comprises a clip having teeth to secure a respective beam and support the insulation batts without the use of additional fasteners.

Embodiment 64

The system of embodiment 63, wherein an upper portion of the clip overlaps a top of a proximal end of a respective beam.

Embodiment 65

The system of embodiment 56, wherein a length of a web of the beam is substantially equal to a length of the bracket.

Embodiment 66

The system of embodiment 56, wherein a distal end of the beam comprises a vertical flange that captures a lower edge of a respective bracket.

Embodiment 67

The system of embodiment 56, wherein the beams consist of a polymer composition.

Embodiment 68

The system of embodiment 56, wherein the beams may be cut with a manual tool such as a snip, and the beams are configured to support fiberglass batts without any additional strapping.

Embodiment 69

The system of embodiment 56, wherein the beams are perforated.

Embodiment 70

The system of embodiment 56, wherein proximal ends of the beams comprise perforations.

Embodiment 71

The system of embodiment 56, wherein webs of the beams are perforated.

Embodiment 72

The system of embodiment 56, wherein distal ends of the beams are not perforated.

Embodiment 73

The system of embodiment 56, wherein the beams comprise at least one of an I-beam and a J-beam.

Embodiment 74

The system of embodiment 56, wherein portions of the beams are formed from different materials.

Embodiment 75

The system of embodiment 56, wherein portions of the beams have different coefficients of thermal expansion.

Embodiment 76

The system of embodiment 56, wherein the beams comprise a coefficient of thermal expansion of not greater than about 50E-06 in/(in·F).

Embodiment 77

The system of embodiment 56, wherein each beam, with a weight of 0.5 lb at a distance of 10 inches, has a maximum vertical deflection in a range of about 0.1 inches to about 2 inches.

Embodiment 78

The system of embodiment 56, wherein each beam, under its own weight, has a maximum deflection in a range of about 1 degree to about 5 degrees, relative to planes defined by a proximal end and a distal end thereof.

Embodiment 79

The system of embodiment 56, wherein each beam comprises a single layer of polymer material.

Embodiment 80

The system of embodiment 56, wherein at least portions of each beam are at least one of extruded and injection molded.

Embodiment 81

The system of embodiment 56, wherein no material of the system extends between adjacent ones of the beams other than the insulation batts and the first tape.

Embodiment 82

The system of embodiment 56, wherein the system comprises an airtightness and airtight barriers comprise ACH50<1.6.

Embodiment 83

The system of embodiment 82, wherein the airtightness and the airtight barriers comprise ACH50<0.6.

Embodiment 84

The system of embodiment 56, wherein the insulation batts comprise outer layers comprising at least one of a smart vapor retarder (SVR) and kraft paper.

Embodiment 85

The system of embodiment 56, further comprising additional tape strips that seal joints formed between abutting batts, the additional tape strips are substantially perpendicular to axes of the beams, and the additional tape strips extend between adjacent ones of the beams.

Embodiment 86

The system of embodiment 56, wherein the insulation batts are initially stapled to the beams before taping.

Embodiment 87

The system of embodiment 56, wherein the system comprises no other support members or support structures beneath the insulation batts.

Embodiment 88

The system of embodiment 56, wherein the beams are perpendicular to the rafters.

Embodiment 89

The system of embodiment 56, wherein the tape comprises an all weather flashing tape.

Embodiment 90

The system of embodiment 56, wherein the attic comprises protrusions that extend through the insulation batts, and the tape is applied between the protrusions and the insulation batts to form airtight barriers therebetween, and the airtight barriers comprise ACH50<3.

Embodiment 91

The system of embodiment 56, wherein the attic comprises protrusions that extend through the insulation batts, and a second tape is applied between the protrusions and the insulation batts to form airtight barriers therebetween, the airtight barriers comprise ACH50<3, and the second tape differs from the tape.

Embodiment 92

The system of embodiment 91, wherein the protrusions comprise truss members that further support the roof.

Embodiment 93

The system of embodiment 91, wherein the second tape is stretch tape comprising an elongation capability of at least about 100%.

Embodiment 94

The system of embodiment 56, further comprising a ventilated air gap between the roof deck and an upper portion of the system.

Embodiment 95

The system of embodiment 56, wherein the beams are not metallic.

Embodiment 96

A hanger for supporting insulation in an attic having rafters that support a roof deck, the hanger comprising: a beam having an axis and an elongated profile in an axial direction, wherein the elongated profile comprises: a proximal end configured to be coupled to the rafters; a distal end spaced apart from the proximal end; a web extending between the proximal end and the distal end; an insulation space defined along the web between the proximal and distal ends; the distal end is configured to be coupled to an insulation batt located in the insulation space; and the beam has a folded position wherein the beam is folded such that the web is not perpendicular to the proximal and distal ends, and an installation position wherein the web is substantially perpendicular to the proximal and distal ends.

Embodiment 97

A hanger for supporting insulation in an attic having rafters that support a roof deck, the hanger comprising: a beam having an axis and an elongated profile in an axial direction, wherein the elongated profile comprises: proximal ends configured to be coupled to the rafters; a distal end spaced apart from the proximal ends; a web extending between the proximal ends and the distal end; an insulation space defined along the web between the proximal and distal ends; the distal end is configured to be coupled to an insulation batt located in the insulation space; and the web comprise a solid section that spans an entirety of the elongated profile, and a segmented section that engages respective ones of the proximal ends, with voids in the segmented section that extend from the proximal ends to the solid section.

Embodiment 98

A hanger for supporting insulation in an attic having rafters that support a roof deck, the hanger comprising: a beam having an axis and an elongated profile in an axial direction, wherein the elongated profile comprises: a proximal end configured to be coupled to the rafters, wherein the proximal end comprises at least one planar portion and is configured to be substantially parallel to the roof deck and substantially perpendicular to the rafters when installed; a ventilated air gap is configured to be provided between the proximal end and the roof deck; a distal end that is substantially planar and parallel to the planar portion of the proximal end; at least one web that is substantially planar, the web extending substantially perpendicular to and between the proximal end and the distal end, and the web comprises apertures or voids located between the proximal and distal ends; an insulation space defined along the web between the proximal and distal ends; and the distal end is configured to be coupled to an insulation batt located in the insulation space.

Embodiment 99

The hanger of embodiment 98, wherein the beam consists of a polymer composition.

Embodiment 100

The hanger of embodiment 98, wherein the beam may be cut with a manual tool such as a snip, and the beam is configured to support fiberglass batts without any additional strapping.

Embodiment 101

The hanger of embodiment 98, wherein the beam is perforated.

Embodiment 102

The hanger of embodiment 98, wherein the proximal end comprises perforations.

Embodiment 103

The hanger of embodiment 102, wherein the perforations comprise parallel rows of slits.

Embodiment 104

The hanger of embodiment 103, wherein the slits are at least one of rounded, oblong and rectangular.

Embodiment 105

The hanger of embodiment 98, wherein the web is perforated.

Embodiment 106

The hanger of embodiment 98, wherein the distal end is not perforated.

Embodiment 107

The hanger of embodiment 98, wherein the beam comprises at least one of an I-beam, a J-beam, a C-beam and an S-beam.

Embodiment 108

The hanger of embodiment 98, wherein each end of the elongated profile comprises tabs configured to engage a second beam.

Embodiment 109

The hanger of embodiment 108, wherein the tabs are located only on the proximal end.

Embodiment 110

The hanger of embodiment 98, wherein portions of the beam are formed from different materials.

Embodiment 111

The hanger of embodiment 110, wherein a first portion of the beam comprises glass-reinforced polyvinylchloride (PVC), and a second portion of the beam comprises PVC.

Embodiment 112

The hanger of embodiment 98, wherein portions of the beam have different coefficients of thermal expansion.

Embodiment 113

The hanger of embodiment 98, wherein the beam comprises a coefficient of thermal expansion of not greater than about 50E-06 in/(in·F).

Embodiment 114

The hanger of embodiment 98, wherein the beam, with a weight of 0.5 lb at a distance of 10 inches, has a maximum vertical deflection in a range of about 0.1 inches to about 2 inches.

Embodiment 115

The hanger of embodiment 98, wherein the beam, under its own weight, has a maximum deflection in a range of about 1 degree to about 5 degrees, relative to a planes defined by the proximal end and the distal end.

Embodiment 116

The hanger of embodiment 98, wherein the beam comprises a single layer of polymer material.

Embodiment 117

The hanger of embodiment 98, wherein at least portions of the beam are at least one of extruded and injection molded.

Embodiment 118

The hanger of embodiment 98, wherein the proximal ends of the beams are attached only to bottom surfaces of the rafters.

Embodiment 119

A system for insulating an attic of a building, the building having a roof with a roof deck, and rafters supporting the roof deck inside the attic, the system comprising:
beams for supporting insulation in the attic, each of the beams comprising an axis and an elongated profile in an axial direction, wherein the elongated profile comprises:
a proximal end mounted only to the rafters but not to the roof deck, wherein the proximal end is planar and substantially parallel to the roof deck;
a distal end that is substantially planar and parallel to the proximal end;
a web that is substantially planar, the web extending substantially perpendicular to and between the proximal end and the distal end; and
an insulation space defined along the web between the proximal and distal ends; and the system further comprises:
insulation batts mounted to and between adjacent ones of the beams in the insulation spaces, each of the insulation batts comprising an insulation material and an outer layer that faces the distal ends of the beams, and the outer layer comprises an airtightness of ACH50<3; and
a first tape applied to the distal ends of the beams and to the outer layers of the insulation batts to form airtight barriers therebetween, and the airtight barriers comprise ACH50<3.

Embodiment 120

The system of embodiment 119, wherein no material of the system extends between adjacent ones of the beams other than the insulation batts and the first tape.

Embodiment 121

The system of embodiment 119, wherein the airtightness and the airtight barriers comprise ACH50<1.6.

Embodiment 122

The system of embodiment 119, wherein the airtightness and the airtight barriers comprise ACH50<0.6.

Embodiment 123

The system of embodiment 119, wherein the outer layer comprises at least one of a smart vapor retarder (SVR) and kraft paper.

Embodiment 124

The system of embodiment 119, further comprising additional tape strips that seal joints formed between abutting batts, the additional tape strips are substantially perpendicular to axes of the beams, and the additional tape strips extend between adjacent ones of the beams.

Embodiment 125

The system of embodiment 119, wherein batts are initially stapled to beams before taping.

Embodiment 126

The system of embodiment 119, wherein the system comprises no other support members or support structures beneath the insulation.

Embodiment 127

The system of embodiment 119, wherein the beams are transverse to the rafters.

Embodiment 128

The system of embodiment 119, wherein the first tape comprises an all weather flashing tape.

Embodiment 129

The system of embodiment 119, further comprising protrusions of the attic extending through the insulation batts, and the tape applied between the protrusions and the insulation batts to form airtight barriers therebetween, and the airtight barriers comprise ACH50<3.

Embodiment 130

The system of embodiment 119, further comprising protrusions of the attic extending through the insulation batts, and a second tape applied between the protrusions and the insulation batts to form airtight barriers therebetween, the airtight barriers comprise ACH50<3, and the second tape differs from the first tape.

Embodiment 131

The system of embodiment 130, wherein the protrusions of the attic comprise truss members that further support the roof.

Embodiment 132

The system of embodiment 130, wherein the second tape is stretch tape comprising an elongation capability of at least about 100%.

Embodiment 133

The system of embodiment 119, further comprising a ventilated air gap between the roof deck and an upper portion of the system.

Embodiment 134

The system of embodiment 119, wherein the proximal ends of the beams are mounted to the rafters with fasteners.

Embodiment 135

The system of embodiment 134, wherein the fasteners comprise staples, nails or screws.

Embodiment 136

The system of embodiment 119, wherein the beams are not metallic.

Embodiment 137

A method of insulating an attic of a building, the building having a roof with a roof deck, and rafters supporting the roof deck inside the attic, the method comprising: (a) providing beams comprising an elongated profile in an axial direction; (b) fastening only proximal ends of the beams to the rafters; (c) positioning insulation batts on distal ends of adjacent ones of the beams, each of the insulation batts comprising an insulation material and an outer layer facing the distal ends of the beams, the outer layer comprising an airtightness of ACH50<3; and (d) applying a tape to the distal ends of the beams and to the outer layers of the insulation batts to form airtight barriers therebetween, and the airtight barriers comprise the airtightness of ACH50<3.

Embodiment 138

The method of embodiment 137, further comprising extending no material between adjacent ones of the beams other than the insulation batts and the tape.

Embodiment 139

The method of embodiment 137, wherein protrusions of the attic extend through the insulation batts, and the method further comprises applying a second tape between the protrusions and the insulation batts to form airtight barriers therebetween, the airtight barriers comprise ACH50<3, and the second tape differs from the first tape.

Embodiment 140

The method of embodiment 139, wherein the protrusions comprise truss members that further support the roof, and the second tape comprises a stretch tape having an elongation capability of at least about 100%.

Embodiment 141

A hanger for supporting insulation in an attic having rafters that support a roof deck, the hanger comprising: a beam having an axis and a profile in an axial direction, wherein the profile comprises: a distal end that is elongated in the axial direction and substantially planar; straps that extend from the distal end, the straps are substantially planar and perpendicular to the distal end, each strap comprises a proximal end that is planar and configured to be coupled to a respective rafter; an insulation space defined along the straps between the proximal ends and distal end; and the distal end is configured to be coupled to an insulation batt located in the insulation space.

Embodiment 142

The hanger of embodiment 141, wherein the proximal ends are substantially parallel to the distal end, and the proximal ends are configured to be substantially parallel to the roof deck when installed.

Embodiment 143

The hanger of embodiment 141, wherein the proximal ends are substantially perpendicular to the distal end.

Embodiment 144

The hanger of embodiment 141, wherein planes defined by the straps are configured to be perpendicular to vertical planes defined along the axial lengths of the rafters.

Embodiment 145

The hanger of embodiment 141, wherein planes defined by the straps are configured to be parallel to vertical planes defined along the axial lengths of the rafters.

Embodiment 146

The hanger of embodiment 141, wherein the proximal ends are configured to attach to only bottom surfaces of the rafters.

Embodiment 147

The hanger of embodiment 141, wherein the proximal ends are configured to attach to bottom surfaces and side surfaces of the rafters.

Embodiment 148

The hanger of embodiment 141, wherein the proximal ends are configured to attach to only side surfaces of the rafters.

Embodiment 149

A method of forming a seal in an insulation system for an attic having rafters and a truss member, the method comprising: (a) installing beams on the rafters; (b) mounting an insulation batt on the beams such that the truss member extends through the insulation batt; (c) providing a tape having a release liner attached thereto and partitioned in segments; and then (d) methodically removing the segments of the release liner while applying the tape to the one truss member and to the insulation batt.

Embodiment 150

The hanger of embodiment 103, wherein the parallel rows of slits are substantially aligned with the axial direction.

Embodiment 151

The hanger of embodiment 116, wherein the single layer of polymer material is folded into a final sectional shape along the axial direction and is at least one of sonic welded, heat staked and thermoformed with ribbed edges.

Embodiment 152

The method of embodiment 137, wherein the distal ends comprise a planar portion that supports the insulation batts.

Embodiment 153 system for insulating an attic of a building, the building having a roof with a roof deck, and rafters supporting the roof deck inside the attic, the system comprising: brackets aligned and mounted to the rafters; beams attached to the brackets such that the beams are suspended from the rafters via the brackets; insulation batts extending between the beams; and tape to secure the insulation batts to the beams.

Embodiment 154

The system of embodiment 153, wherein the beams and the rafters do not have fixed junctions therebetween, such that the beams and the rafters move independently.

Embodiment 155

The system of embodiment 153, wherein the brackets and beams comprise sliding surfaces therebetween.

Embodiment 156

The system of embodiment 153, wherein each beam a proximal end, a distal end, a web between the proximal and distal end, and the proximal end has a rib.

Embodiment 157

The system of embodiment 156, wherein the rib extends from one side of the proximal end and the rib terminates with a lip that turns back toward the proximal end.

Embodiment 158

The system of embodiment 157, wherein each bracket receives the rib and lip such that a respective beam is clipped into the bracket.

Embodiment 159

The system of embodiment 153, wherein the bracket comprises rafter clips for closely receiving a respective rafter, and the rafter clips support the weight of the bracket on the rafter prior to permanent attachment thereto.

Embodiment 160

The system of embodiment 153, wherein each bracket comprises a clip having teeth to secure a respective beam and support the insulation batts without the use of additional fasteners.

Embodiment 161

The system of embodiment 160, wherein an upper portion of the clip overlaps a top of a proximal end of a respective beam.

Embodiment 162

The system of embodiment 153, wherein a length of a web of the beam is substantially equal to a length of the bracket.

Embodiment 163

The system of embodiment 153, wherein a distal end of the beam comprises a vertical flange that captures a lower edge of a respective bracket.

Embodiment 164

The system of embodiment 153, wherein the beams consist of a polymer composition.

Embodiment 165

The system of embodiment 153, wherein the beams may be cut with a manual tool such as a snip, and the beams are configured to support fiberglass batts without any additional strapping.

Embodiment 166

The system of embodiment 153, wherein the beams are perforated.

Embodiment 167

The system of embodiment 153, wherein proximal ends of the beams comprise perforations.

Embodiment 168

The system of embodiment 153, wherein webs of the beams are perforated.

Embodiment 169

The system of embodiment 153, wherein distal ends of the beams are not perforated.

Embodiment 170

The system of embodiment 153, wherein the beams comprise at least one of an I-beam and a J-beam.

Embodiment 171

The system of embodiment 153, wherein portions of the beams are formed from different materials.

Embodiment 172

The system of embodiment 153, wherein portions of the beams have different coefficients of thermal expansion.

Embodiment 173

The system of embodiment 153, wherein the beams comprise a coefficient of thermal expansion of not greater than about 50E-06 in/(in·F).

Embodiment 174

The system of embodiment 153, wherein each beam, with a weight of 0.5 lb at a distance of 10 inches, has a maximum vertical deflection in a range of about 0.1 inches to about 2 inches.

Embodiment 175

The system of embodiment 153, wherein each beam, under its own weight, has a maximum deflection in a range of about 1 degree to about 5 degrees, relative to planes defined by a proximal end and a distal end thereof.

Embodiment 176

The system of embodiment 153, wherein each beam comprises a single layer of polymer material.

Embodiment 177

The system of embodiment 153, wherein at least portions of each beam are at least one of extruded and injection molded.

Embodiment 178

The system of embodiment 153, wherein no material of the system extends between adjacent ones of the beams other than the insulation batts and the first tape.

Embodiment 179

The system of embodiment 153, wherein the system comprises an airtightness and airtight barriers comprise ACH50<1.6.

Embodiment 180

The system of embodiment 179, wherein the airtightness and the airtight barriers comprise ACH50<0.6.

Embodiment 181

The system of embodiment 153, wherein the insulation batts comprise outer layers comprising at least one of a smart vapor retarder (SVR) and kraft paper.

Embodiment 182

The system of embodiment 153, further comprising additional tape strips that seal joints formed between abutting batts, the additional tape strips are substantially perpendicular to axes of the beams, and the additional tape strips extend between adjacent ones of the beams.

Embodiment 183

The system of embodiment 153, wherein the insulation batts are initially stapled to the beams before taping.

Embodiment 184

The system of embodiment 153, wherein the system comprises no other support members or support structures beneath the insulation batts.

Embodiment 185

The system of embodiment 153, wherein the beams are perpendicular to the rafters.

Embodiment 186

The system of embodiment 153, wherein the tape comprises an all weather flashing tape.

Embodiment 187

The system of embodiment 153, wherein the attic comprises protrusions that extend through the insulation batts, and the tape is applied between the protrusions and the insulation batts to form airtight barriers therebetween, and the airtight barriers comprise ACH50<3.

Embodiment 188

The system of embodiment 153, wherein the attic comprises protrusions that extend through the insulation batts, and a second tape is applied between the protrusions and the insulation batts to form airtight barriers therebetween, the airtight barriers comprise ACH50<3, and the second tape differs from the tape.

Embodiment 189

The system of embodiment 188, wherein the protrusions comprise truss members that further support the roof.

Embodiment 190

The system of embodiment 188, wherein the second tape is stretch tape comprising an elongation capability of at least about 100%.

Embodiment 191

The system of embodiment 153, further comprising a ventilated air gap between the roof deck and an upper portion of the system.

Embodiment 192

The system of embodiment 153, wherein the beams are not metallic.

Embodiment 193

A hanger for supporting insulation in an attic having rafters that support a roof deck, the hanger comprising: a beam having an axis and an elongated profile in an axial direction, wherein the elongated profile comprises: a proximal end configured to be coupled to the rafters; a distal end spaced apart from the proximal end; a web extending between the proximal end and the distal end; an insulation space defined along the web between the proximal and distal ends; the distal end is configured to be coupled to an insulation batt located in the insulation space; and the beam has a folded position wherein the beam is folded such that the web is not perpendicular to the proximal and distal ends, and an installation position wherein the web is substantially perpendicular to the proximal and distal ends.

Embodiment 194

A hanger for supporting insulation in an attic having rafters that support a roof deck, the hanger comprising: a beam having an axis and an elongated profile in an axial direction, wherein the elongated profile comprises: proximal ends configured to be coupled to the rafters; a distal end spaced apart from the proximal ends; a web extending between the proximal ends and the distal end; an insulation space defined along the web between the proximal and distal ends; the distal end is configured to be coupled to an insulation batt located in the insulation space; and the web comprise a solid section that spans an entirety of the elongated profile, and a segmented section that engages respective ones of the proximal ends, with voids in the segmented section that extend from the proximal ends to the solid section.

Embodiment 195

An insulation system comprising: an insulation layer, an atmospheric regulation layer, a structural support, and an external surface; wherein the atmospheric regulation layer is supported by the structural support, wherein the insulation layer is located between the atmospheric regulation layer and the external surface, wherein the insulation layer has a thickness, wherein the thickness extends from the atmospheric regulation layer to an external surface, and wherein the thickness of the insulation layer comprises a unitary construction, wherein the atmospheric regulation layer has a water vapor permeability of not greater than 3 perms at a relative humidity of 25% as measured by ASTM E96 Procedure A Dry Cup, and a water vapor permeability of at least 6 perms at a relative humidity of 75% as measured by ASTM E96 Procedure B Wet Cup, wherein the atmospheric regulation layer has a fire class A rating as measured by ASTM E84, and wherein the continuous atmospheric regulation layer has a ACH50 value of not greater than 10, or not greater than 5, or not greater than 3, or not greater than 1.5, or not greater than 0.6, wherein ACH50 represents an air exchange at 50. Pascals.

Embodiment 196

An insulation system comprising: an insulation layer, an atmospheric regulation layer, a structural support, and an external surface; wherein the atmospheric regulation layer is supported by the structural support, wherein the insulation layer is located between the atmospheric regulation layer and the external surface, wherein the insulation layer has a thickness, wherein the thickness extends from the atmospheric regulation layer to the external surface, and wherein the thickness of the insulation layer comprises a unitary construction, wherein the atmospheric regulation layer has a water vapor permeability of not greater than 1 perms at a relative humidity of 25% as measured by ASTM E96 Procedure A Dry Cup, wherein the atmospheric regulation layer has a fire class A rating as measured by ASTM E84, and wherein the continuous atmospheric regulation layer has a ACH50 value of not greater than 10, or not greater than 5, or not greater than 3, or not greater than 1.5, or not greater than 0.6, wherein ACH50 represents an air exchange at 50. Pascals.

Embodiment 197

An insulation system comprising: a rigid material, an insulation layer, an atmospheric regulation layer, and an external surface; wherein the atmospheric regulation layer is supported by the rigid material, wherein the insulation layer is located between the atmospheric regulation layer and the external surface, wherein the insulation layer has a thickness, wherein the thickness extends from the atmospheric regulation layer to the external surface, and wherein the thickness of the insulation layer comprises a unitary construction, wherein the atmospheric regulation layer has a water vapor permeability of not greater than 3 perms at a relative humidity of 25% as measured by ASTM E96 Procedure A Dry Cup, and a water vapor permeability of at least 6 perms at a relative humidity of 75% as measured by ASTM E96 Procedure B Wet Cup, wherein the atmospheric regulation layer has a fire class A rating as measured by ASTM E84, and wherein the continuous atmospheric regulation layer has a ACH50 value of not greater than 10, or not greater than 5, or not greater than 3, or not greater than 1.5, or not greater than 0.6, wherein ACH50 represents an air exchange at 50. Pascals.

Embodiment 198

An insulation system comprising: an insulation layer, an atmospheric regulation layer, and an external surface; wherein the insulation layer comprises a rigid material, wherein the atmospheric regulation layer is supported by the rigid material, wherein the insulation layer is located between the atmospheric regulation layer and the external surface, wherein the insulation layer has a thickness, wherein the thickness extends from the atmospheric regulation layer to the external surface, and wherein the thickness of the insulation layer comprises a unitary construction, wherein the atmospheric regulation layer has a water vapor permeability of not greater than 3 perms at a relative humidity of 25% as measured by ASTM E96 Procedure A Dry Cup, and a water vapor permeability of at least 6 perms at a relative humidity of 75% as measured by ASTM E96 Procedure B Wet Cup, wherein the atmospheric regulation layer has a fire class A rating as measured by ASTM E84, and wherein the continuous atmospheric regulation layer has a ACH50 value of not greater than 10, or not greater than 5, or not greater than 3, or not greater than 1.5, or not greater than 0.6, wherein ACH50 represents an air exchange at 50. Pascals.

Embodiment 199

An insulation system comprising: an insulation layer, an atmospheric regulation layer, and an external surface; wherein the insulation layer comprises a rigid material, wherein the atmospheric regulation layer is supported by the rigid material, wherein the insulation layer is located between the atmospheric regulation layer and the external surface, wherein the insulation layer has a thickness, wherein the thickness extends from the atmospheric regulation layer to a point short of the external surface, and wherein the thickness of the insulation layer comprises a unitary construction, wherein the atmospheric regulation layer has a water vapor permeability of not greater than 3 perms at a relative humidity of 25% as measured by ASTM E96 Procedure A Dry Cup, and a water vapor permeability of at least 6 perms at a relative humidity of 75% as measured by ASTM E96 Procedure B Wet Cup, wherein the atmospheric regulation layer has a fire class A rating as measured by ASTM E84, and wherein the continuous atmospheric regulation layer has a ACH50 value of not greater than 10, or not greater than 5, or not greater than 3, or not greater than 1.5, or not greater than 0.6, wherein ACH50 represents an air exchange at 50. Pascals.

Embodiment 200

An insulation system comprising: an insulation layer, an atmospheric regulation layer, and an external surface; wherein the insulation layer comprises a rigid material, wherein the atmospheric regulation layer is supported by the rigid material, wherein the rigid material acting as the insulation layer is the located between the atmospheric regulation layer and the external surface, wherein the rigid material has a thickness, wherein the thickness extends from the atmospheric regulation layer to a point short of the external surface, and wherein the thickness of the insulation layer comprises a unitary construction, wherein the atmospheric regulation layer has a water vapor permeability of not greater than 1 perms at a relative humidity of 25% as measured by ASTM E96 Procedure A Dry Cup, wherein the atmospheric regulation layer has a fire class A rating as measured by ASTM E84, and wherein the continuous atmospheric regulation layer has a ACH50 value of not greater than 10, or not greater than 5, or not greater than 3, or not greater than 1.5, or not greater than 0.6, wherein ACH50 represents an air exchange at 50. Pascals.

Embodiment 201

An insulation system comprising: an insulation layer, an atmospheric regulation layer, a structural support, and an external surface; wherein the atmospheric regulation layer is supported by the structural support, wherein the insulation layer is located between the atmospheric regulation layer and the external surface, wherein the insulation layer has a thickness, wherein the thickness extends from the atmospheric regulation layer to a point short of the external surface, and wherein the thickness of the insulation layer comprises a unitary construction, wherein the atmospheric regulation layer has a water vapor permeability of not greater than 3 perms at a relative humidity of 25% as measured by ASTM E96 Procedure A Dry Cup, and a water vapor permeability of at least 6 perms at a relative humidity of 75% as measured by ASTM E96 Procedure B Wet Cup, wherein the atmospheric regulation layer has a fire class A rating as measured by ASTM E84, and wherein the continuous atmospheric regulation layer has a ACH50 value of not greater than 10, or not greater than 5, or not greater than 3, or not greater than 1.5, or not greater than 0.6, wherein ACH50 represents an air exchange at 50 Pascals.

Embodiment 202

An insulation system comprising: an insulation layer, an atmospheric regulation layer, a structural support, and an external surface; wherein the atmospheric regulation layer is supported by the structural support, wherein the insulation layer is located between the atmospheric regulation layer and the external surface, wherein the thickness of the insulation layer is substantially uniform, wherein the atmospheric regulation layer has a water vapor permeability of not greater than 3 perms at a relative humidity of 25% as measured by ASTM E96 Procedure A Dry Cup, and a water vapor permeability of at least 6 perms at a relative humidity of 75% as measured by ASTM E96 Procedure B Wet Cup, wherein the atmospheric regulation layer has a fire class A rating as measured by ASTM E84, and wherein the continuous atmospheric regulation layer has a ACH50 value of not greater than 10, or not greater than 5, or not greater than 3, or not greater than 1.5, or not greater than 0.6, wherein ACH50 represents an air exchange at 50 Pascals.

Embodiment 203

An insulation system comprising: an insulation layer, an atmospheric regulation layer, and a structural support, and an external surface; wherein the atmospheric regulation layer is supported by the structural support, wherein the insulation layer is located between the atmospheric regulation layer and the external surface, wherein the atmospheric regulation layer is bonded to the insulation layer, wherein the atmospheric regulation layer has a water vapor permeability of not greater than 3 perms at a relative humidity of 25% as measured by ASTM E96 Procedure A Dry Cup, and a water vapor permeability of at least 6 perms at a relative humidity of 75% as measured by ASTM E96 Procedure B Wet Cup, wherein the atmospheric regulation layer has a fire class A rating as measured by ASTM E84, and wherein the continuous atmospheric regulation layer has a ACH50 value of not greater than 10, or not greater than 5, or not greater than 3, or not greater than 1.5, or not greater than 0.6, wherein ACH50 represents an air exchange at 50 Pascals.

Embodiment 204

A method of insulating a surface, wherein the method comprises: mounting a structural support parallel to an external surface, providing an atmospheric regulation layer and an insulation layer, and placing the atmospheric regulation layer and the insulation layer such that the insulation layer is located between the atmospheric regulation layer and the external surface, and the atmospheric regulation layer is supported by the structural support, wherein the insulation layer has a thickness, wherein the thickness extends from the atmospheric regulation layer to an external surface, and wherein the thickness of the insulation layer comprises a unitary construction, wherein the atmospheric regulation layer has a water vapor permeability of not greater than 3 perms at a relative humidity of 25% as measured by ASTM E96 Procedure A Dry Cup, and a water vapor permeability of at least 6 perms at a relative humidity of 75% as measured by ASTM E96 Procedure B Wet Cup, wherein the atmospheric regulation layer has a fire class A rating as measured by ASTM E84, and wherein the continuous atmospheric regulation layer has a ACH50 value of not greater than 10, or not greater than 5, or not greater than 3, or not greater than 1.5, or not greater than 0.6, wherein ACH50 represents an air exchange at 50 Pascals.

Embodiment 205

A method of insulating a surface, wherein the method comprises: mounting a structural support parallel to an external surface, providing an atmospheric regulation layer and an insulation layer, and placing the atmospheric regulation layer and the insulation layer such that the insulation layer is located between the atmospheric regulation layer and the external surface, and the atmospheric regulation layer is supported by the structural support, wherein the insulation layer has a thickness, wherein the thickness extends from the atmospheric regulation layer to an external surface, and wherein the thickness of the insulation layer comprises a unitary construction, wherein the atmospheric regulation layer has a water vapor permeability of not greater than 1 perms at a relative humidity of 25% as measured by ASTM E96 Procedure A Dry Cup, and a water vapor permeability of at least 6 perms at a relative humidity of 75% as measured by ASTM E96 Procedure B Wet Cup, wherein the atmospheric regulation layer has a fire class A rating as measured by ASTM E84, and wherein the continuous atmospheric regulation layer has a ACH50 value of not greater than 10, or not greater than 5, or not greater than 3, or not greater than 1.5, or not greater than 0.6, wherein ACH50 represents an air exchange at 50 Pascals.

Embodiment 206

A method of insulating a surface, wherein the method comprises: mounting a structural support parallel to an external surface, providing an atmospheric regulation layer and an insulation layer, and placing the atmospheric regulation layer and the insulation layer such that the insulation layer is located between the atmospheric regulation layer and the external surface, and the atmospheric regulation layer is supported by the structural support, wherein the insulation layer has a thickness, wherein the thickness extends from the atmospheric regulation layer to a point short of the external surface, and wherein the thickness of the insulation layer comprises a unitary construction, wherein the atmospheric regulation layer has a water vapor permeability of not greater than 3 perms at a relative humidity of 25% as measured by ASTM E96 Procedure A Dry Cup, and a water vapor permeability of at least 6 perms at a relative humidity of 75% as measured by ASTM E96 Procedure B Wet Cup, wherein the atmospheric regulation layer has a fire class A rating as measured by ASTM E84, and wherein the continuous atmospheric regulation layer has a ACH50 value of not greater than 10, or not greater than 5, or not greater than 3, or not greater than 1.5, or not greater than 0.6, wherein ACH50 represents an air exchange at 50 Pascals.

Embodiment 207

A method of insulating a surface, wherein the method comprises: mounting a structural support parallel to an external surface, providing an atmospheric regulation layer and an insulation layer, and placing the atmospheric regulation layer and the insulation layer such that the insulation layer is located between the atmospheric regulation layer and the external surface, and the atmospheric regulation layer is supported by the structural support, wherein the insulation layer has a thickness, wherein the thickness extends from the atmospheric regulation layer to a point short of the external surface, and wherein the thickness of the insulation layer comprises a unitary construction, wherein the atmospheric regulation layer has a water vapor permeability of not greater than 1 perms at a relative humidity of 25% as measured by ASTM E96 Procedure A Dry Cup, and a water vapor permeability of at least 6 perms at a relative humidity of 75% as measured by ASTM E96 Procedure B Wet Cup, wherein the atmospheric regulation layer has a fire class A rating as measured by ASTM E84, and wherein the continuous atmospheric regulation layer has a ACH50 value of not greater than 10, or not greater than 5, or not greater than 3, or not greater than 1.5, or not greater than 0.6, wherein ACH50 represents an air exchange at 50 Pascals.

Embodiment 208

A method of insulating a surface, wherein the method comprises: providing an atmospheric regulation layer, an insulation layer, and a self-supporting rigid material, and placing the atmospheric regulation layer such that the insulation layer is located between the atmospheric regulation layer and an external surface, the rigid material is parallel to the external surface, and the atmospheric regulation layer is supported by the rigid material; wherein the atmospheric regulation layer is bonded to the insulation layer, wherein the atmospheric regulation layer has a water vapor permeability of not greater than 3 perms at a relative humidity of 25% as measured by ASTM E96 Procedure A Dry Cup, and a water vapor permeability of at least 6 perms at a relative humidity of 75% as measured by ASTM E96 Procedure B Wet Cup, wherein the atmospheric regulation layer has a fire class A rating as measured by ASTM E84, and wherein the continuous atmospheric regulation layer has a ACH50 value of not greater than 10, or not greater than 5, or not greater than 3, or not greater than 1.5, or not greater than 0.6, wherein ACH50 represents an air exchange at 50 Pascals.

Embodiment 209

A method of insulating a surface, wherein the method comprises: providing an atmospheric regulation layer and an insulation layer, wherein the insulation layer comprises a self-supporting rigid material, and placing the atmospheric regulation layer such that the rigid material is located between the atmospheric regulation layer and an external surface, the rigid material is parallel to the external surface, and the atmospheric regulation layer is supported by the rigid material; wherein the atmospheric regulation layer is bonded to the insulation layer, wherein the atmospheric regulation layer has a water vapor permeability of not greater than 3 perms at a relative humidity of 25% as measured by ASTM E96 Procedure A Dry Cup, and a water vapor permeability of at least 6 perms at a relative humidity of 75% as measured by ASTM E96 Procedure B Wet Cup, wherein the atmospheric regulation layer has a fire class A rating as measured by ASTM E84, and wherein the continuous atmospheric regulation layer has a ACH50 value of not greater than 10, or not greater than 5, or not greater than 3, or not greater than 1.5, or not greater than 0.6, wherein ACH50 represents an air exchange at 50 Pascals.

Embodiment 210

A method of insulating a surface, wherein the method comprises: providing an atmospheric regulation layer and an insulation layer, wherein the insulation layer comprises a self supporting rigid material, and placing the atmospheric regulation layer such that the rigid material is located between the atmospheric regulation layer and an external surface, the rigid material is parallel to the external surface, and the atmospheric regulation layer is supported by the rigid material; wherein the atmospheric regulation layer is bonded to the rigid material, wherein the atmospheric regulation layer has a water vapor permeability of not greater than 1 perm at a relative humidity of 25% as measured by ASTM E96 Procedure A Dry Cup, wherein the atmospheric regulation layer has a fire class A rating as measured by ASTM E84, and wherein the continuous atmospheric regulation layer has a ACH50 value of not greater than 10, or not greater than 5, or not greater than 3, or not greater than 1.5, or not greater than 0.6, wherein ACH50 represents an air exchange at 50 Pascals.

Embodiment 211

A method of insulating a surface, wherein the method comprises: mounting a structural support parallel to an external surface, providing an atmospheric regulation layer and an insulation layer, and placing the atmospheric regulation layer and the insulation layer such that the insulation layer is located between the atmospheric regulation layer and the external surface, and the atmospheric regulation layer is supported by the structural support, wherein the insulation layer is substantially uniform, wherein the atmospheric regulation layer has a water vapor permeability of not greater than 3 perms at a relative humidity of 25% as measured by ASTM E96 Procedure A Dry Cup, and a water vapor permeability of at least 6 perms at a relative humidity of 75% as measured by ASTM E96 Procedure B Wet Cup, wherein the atmospheric regulation layer has a fire class A rating as measured by ASTM E84, and wherein the continuous atmospheric regulation layer has a ACH50 value of not greater than 10, or not greater than 5, or not greater than 3, or not greater than 1.5, or not greater than 0.6, wherein ACH50 represents an air exchange at 50 Pascals.

Embodiment 212

A method of insulating a surface, wherein the method comprises: mounting a structural support parallel to an external surface, providing an atmospheric regulation layer and an insulation layer, and placing the atmospheric regulation layer and the insulation layer such that the insulation layer is located between the atmospheric regulation layer and the external surface, and the atmospheric regulation layer is supported by the structural support, wherein the atmospheric regulation layer is bonded to the insulation layer, wherein the atmospheric regulation layer has a water vapor permeability of not greater than 3 perms at a relative humidity of 25% as measured by ASTM E96 Procedure A Dry Cup, and a water vapor permeability of at least 6 perms at a relative humidity of 75% as measured by ASTM E96 Procedure B Wet Cup, wherein the atmospheric regulation layer has a fire class A rating as measured by ASTM E84, and wherein the continuous atmospheric regulation layer has a ACH50 value of not greater than 10, or not greater than 5, or not greater than 3, or not greater than 1.5, or not greater than 0.6, wherein ACH50 represents an air exchange at 50 Pascals.

Embodiment 213

The insulation system or the method of any one of the preceding embodiments, wherein the insulating material comprises a fibrous material.

Embodiment 214

The insulation system or the method of any one of the preceding embodiments, wherein the fibrous material comprises fiberglass, mineral wool, stone wool, cellulose, cotton, recycled denim fibers, polymer fibers, polyester fibers, synthetic fibers, natural fibers, or wood fibers.

Embodiment 215

The insulation system or the method of any one of the preceding embodiments, wherein the insulating material comprises a rigid material.

Embodiment 216

The insulation system or the method of any one of the preceding embodiments, wherein the insulating material comprises a foam.

Embodiment 217

The insulation system or the method of any one of the preceding embodiments, wherein the foam is extruded polystyrene foam, expanded polystyrene foam, polyurethane foam; polyurea foam; polyepoxide foams; foams made from acetoacetate esters, amines including an alkyldiamine, an aromatic diamine, or an amine-functionalized polymer, and acrylates, including foams that are free of an isocyanate;

isocyanurate foam, open cell spray foams, closed cell spray foams, open cell foams, closed cell foams or phenolic foam.

Embodiment 218

The insulation system or the method of any one of the preceding embodiments, wherein the insulation layer has a thickness, wherein the thickness extends from the atmospheric regulation layer to an external surface, and wherein the thickness of the insulation layer comprises a unitary construction.

Embodiment 219

The insulation system or the method of any one of the preceding embodiments, wherein the insulation layer has a thickness, wherein the thickness extends from the atmospheric regulation layer to an external surface, and wherein the thickness of the insulation layer comprises a multilayer construction.

Embodiment 220

The insulation system or the method of any one of the preceding embodiments, wherein the insulation layer has a thickness, wherein the thickness extends from the atmospheric regulation layer to a point short of an external surface, and wherein the thickness of the insulation layer comprises a unitary construction.

Embodiment 221

The insulation system or the method of any one of the preceding embodiments, wherein the insulation layer has a thickness, wherein the thickness extends from the atmospheric regulation layer to a point short of an external surface, and wherein the thickness of the insulation layer comprises a multilayer construction.

Embodiment 222

The insulation system or the method of any one of the preceding embodiments, wherein the insulation layer has a thickness of at least 1.3 mm, or at least 2.5 mm, or at least 5.1 mm, or at least 10.2 mm, or at least 15.2 mm, or at least 20.3 mm, or at least 25.4 mm, or at least 30.5 mm, or at least 35.6 mm, or at least 40.6 mm, or at least 45.7 mm, or at least 50.8 mm, or at least 55.9 mm, or at least 61 mm, or at least 66 mm, or at least 71.1 mm.

Embodiment 223

The insulation system or the method of any one of the preceding embodiments, wherein the insulation layer has a thickness of not greater than 76.2 mm, or not greater than 71.1 mm, or not greater than 66 mm, or not greater than 61 mm, or not greater than 55.9 mm, or not greater than 50.8 mm, or not greater than 45.7 mm, or not greater than 40.6 mm, or not greater than 35.6 mm, or not greater than 30.5 mm, or not greater than 25.4 mm, or not greater than 20.3 mm, or not greater than 15.2 mm, or not greater than 10.2 mm, or not greater than 5.1 mm, or not greater than 2.5 mm.

Embodiment 224

The insulation system or the method of any one of the preceding embodiments, wherein the insulation layer comprises a unitary structure, and wherein the insulation layer has a thickness of at least 1.3 mm, or at least 2.5 mm, or at least 5.1 mm, or at least 10.2 mm, or at least 15.2 mm, or at least 20.3 mm, or at least 25.4 mm, or at least 30.5 mm, or at least 35.6 mm.

Embodiment 225

The insulation system or the method of any one of the preceding embodiments, wherein the insulation layer comprises a unitary structure, and wherein the insulation layer has a thickness of not greater than 40.6 mm, or not greater than 35.6 mm, or not greater than 30.5 mm, or not greater than 25.4 mm, or not greater than 20.3 mm, or not greater than 15.2 mm, or not greater than 10.2 mm, or not greater than 5.1 mm, or not greater than 2.5 mm.

Embodiment 226

The insulation system or the method of any one of the preceding embodiments, wherein the uncompressed thickness of the insulation layer has a standard deviation of not greater than 30%, or not greater than 25%, or not greater than 20%, or not greater than 15%, or not greater than 10%, or not greater than 5%, or not greater than 1%.

Embodiment 227

The insulation system or the method of any one of the preceding embodiments, wherein the insulation layer has a width of at least 30.5 cm, or at least 38.1 cm, or at least 45.7 cm, or at least 53.3 cm, or at least 61. cm, or at least 68.6 cm, or at least 76.2 cm, or at least 83.8 cm, or at least 91.4 cm, or at least 99.1 cm, or at least 106.7 cm, or at least 114.3 cm, or at least 121.9 cm, or at least 137.2 cm, or at least 152.4 cm, or at least 167.6 cm.

Embodiment 228

The insulation system or the method of any one of the preceding embodiments, wherein the insulation layer has a width of not greater than 182.9 cm, or not greater than 167.6 cm, or not greater than 152.4 cm, or not greater than 137.2 cm, or not greater than 121.9 cm, or not greater than 114.3 cm, or not greater than 106.7 cm, or not greater than 99.1 cm, or not greater than 91.4 cm, or not greater than 83.8 cm, or not greater than 76.2 cm, or not greater than 68.6 cm, or not greater than 61 cm, or not greater than 53.3 cm, or not greater than 45.7 cm, or not greater than 38.1 cm.

Embodiment 229

The insulation system or the method of any one of the preceding embodiments, wherein the insulation layer has a length of at least 0.6 m, or at least 0.9 m, or at least 1.2 m, or at least 1.5 m, or at least 1.8 m, or at least 2.4 m, or at least 3.1 m, or at least 3.7 m, or at least 4.3 m, or at least 4.9 m, or at least 5.5 m, or at least 6.1 m, or at least 9.2 m, or at least 12.2 m, or at least 15.3 m, or at least 22.9 m.

Embodiment 230

The insulation system or the method of any one of the preceding embodiments, wherein the insulation layer has a length of not greater than 30.5 m, or not greater than 22.9 m, or not greater than 15.3 m, or not greater than 12.2 m, or not greater than 9.2 m, or not greater than 6.1 m, or not greater

Embodiment 231

The insulation system or the method of any one of the preceding embodiments, wherein the insulation layer comprises a semi-rigid fibrous material, wherein the insulation layer has a density of at least 8 kg per cubic meter, or at least 16 kg per cubic meter, or at least 24 kg per cubic meter, or at least 32 kg per cubic meter, or at least 40 kg per cubic meter.

Embodiment 232

The insulation system or the method of any one of the preceding embodiments, wherein the insulation layer comprises a semi-rigid fibrous material, wherein the insulation layer has a density of not greater than 48 kg per cubic meter, or not greater than 40 kg per cubic meter, or not greater than 32 kg per cubic meter, or not greater than 24 kg per cubic meter, or not greater than 16 kg per cubic meter.

Embodiment 233

The insulation system or the method of any one of the preceding embodiments, wherein the insulation layer comprises a rigid material, wherein the insulation layer has a density of at least 32 kg per cubic meter, or at least 48.1 kg per cubic meter, or at least 64.1 kg per cubic meter, or at least 80.1 kg per cubic meter, or at least 96.1 kg per cubic meter, or at least 112.1 kg per cubic meter, or at least 128.1 kg per cubic meter, or at least 144.2 kg per cubic meter, or at least 160.2 kg per cubic meter, or at least 240.3 kg per cubic meter.

Embodiment 234

The insulation system or the method of any one of the preceding embodiments, wherein the insulation layer comprises a rigid material, wherein the insulation layer has a density of not greater than 320.4 kg per cubic meter, or not greater than 240.3 kg per cubic meter, or not greater than 160.2 kg per cubic meter, or not greater than 144.2 kg per cubic meter, or not greater than 128.1 kg per cubic meter, or not greater than 112.1 kg per cubic meter, or not greater than 96.1 kg per cubic meter, or not greater than 80.1 kg per cubic meter, or not greater than 64.1 kg per cubic meter, or not greater than 48.1 kg per cubic meter.

Embodiment 235

The insulation system or the method of any one of the preceding embodiments, wherein the insulation layer comprises a foam material, wherein the insulation layer has a density of at least 4 kg per cubic meter, or at least 8 kg per cubic meter, or at least 16 kg per cubic meter, or at least 32 kg per cubic meter, or at least 48.1 kg per cubic meter, or at least 64.1 kg per cubic meter, or at least 80.1 kg per cubic meter, or at least 96.1 kg per cubic meter, or at least 112.1 kg per cubic meter, or at least 128.1 kg per cubic meter, or at least 144.2 kg per cubic meter.

Embodiment 236

The insulation system or the method of any one of the preceding embodiments, wherein the insulation layer comprises a foam material, wherein the insulation layer has a density of not greater than 160.2 kg per cubic meter, or not greater than 144.2 kg per cubic meter, or not greater than 128.1 kg per cubic meter, or not greater than 112.1 kg per cubic meter, or not greater than 96.1 kg per cubic meter, or not greater than 80.1 kg per cubic meter, or not greater than 64.1 kg per cubic meter, or not greater than 48.1 kg per cubic meter, or not greater than 32 kg per cubic meter, or not greater than 16 kg per cubic meter, or not greater than 8 kg per cubic meter.

Embodiment 237

The insulation system or the method of any one of the preceding embodiments, wherein the atmospheric regulation layer comprises a latex; a polyamide, such as polyamide 3, or polyamide 4, or polyamide 6, or polyamide 66; or ethylene vinyl alcohol.

Embodiment 238

The insulation system or the method of any one of the preceding embodiments, wherein the atmospheric regulation layer has a water vapor permeability of not greater than 3 perms at a relative humidity of 25% as measured by ASTM E96 Procedure A Dry Cup, and a water vapor permeability of at least 6 perms at a relative humidity of 75% as measured by ASTM E96 Procedure B Wet Cup.

Embodiment 239

The insulation system or the method of any one of the preceding embodiments, wherein the atmospheric regulation layer comprises a cellulose layer.

Embodiment 240

The insulation system or the method of any one of the preceding embodiments, wherein the atmospheric regulation layer comprises polyethylene, polypropylene, polyester, foil scrim kraft products, coated polypropylene, metalized polymer, aluminum, bitumen, or a butyl-based membrane.

Embodiment 241

The insulation system or the method of any one of the preceding embodiments, wherein the atmospheric regulation layer has a water vapor permeability of not greater than 3 perms, or not greater than 2 perms, or not greater than 1 perm, or not greater than 0.5 perm, or not greater than 0.1 perm as measured by ASTM E96 Procedure A Dry Cup.

Embodiment 242

The insulation system or the method of any one of the preceding embodiments, wherein the atmospheric regulation layer comprises perforations.

Embodiment 243

The insulation system or the method of any one of the preceding embodiments, wherein the atmospheric regulation layer has a water vapor permeability of at least 6 perms, or at least 8 perms, or at least 10 perms, or at least 12 perms, or at least 14 perms, or at least 16 perms, or at least 18 perms, or at least 20 perms, or at least 22 perms, or at least 24 perms as measured by ASTM E96 Procedure B Wet Cup.

Embodiment 244

The insulation system or the method of any one of the preceding embodiments, wherein the atmospheric regulation layer is planar.

Embodiment 245

The insulation system or the method of any one of the preceding embodiments, wherein the atmospheric regulation layer is bonded to the insulation layer.

Embodiment 246

The insulation system or the method of any one of the preceding embodiments, wherein the atmospheric regulation layer has a thickness of at least 0.003 mm, or at least 0.01 mm, or at least 0.015 mm, or at least 0.02 mm, or at least 0.025 mm, or at least 0.051 mm, or at least 0.076 mm, or at least 0.102 mm, or at least 0.127 mm, or at least 0.152 mm, or at least 0.203 mm, or at least 0.254 mm, or at least 0.381 mm, or at least 0.508 mm, or at least 1.27 mm, or at least 2.54 mm.

Embodiment 247

The insulation system or the method of any one of the preceding embodiments, wherein the atmospheric regulation layer has a thickness of not greater than 5.08 mm, or not greater than 2.54 mm, or not greater than 1.27 mm, or not greater than 0.508 mm, or not greater than 0.381 mm, or not greater than 0.254 mm, or not greater than 0.203 mm, or not greater than 0.152 mm, or not greater than 0.127 mm, or not greater than 0.102 mm, or not greater than 0.076 mm, or not greater than 0.051 mm, or not greater than 0.025 mm, or not greater than 0.02 mm, or not greater than 0.015 mm, or not greater than 0.01 mm.

Embodiment 248

The insulation system or the method of any one of the preceding embodiments, wherein the atmospheric regulation layer has a fire class A rating as measured by ASTM E84.

Embodiment 249

The insulation system or the method of any one of the preceding embodiments, wherein the atmospheric regulation layer has a fire rating as measured by ASTM E84 of not greater than 25 for flame spread and not more than 50 for smoke developed.

Embodiment 250

The insulation system or the method of any one of the preceding embodiments, wherein the atmospheric regulation layer has a fire rating as measured by ASTM E84 of not greater than 50 for flame spread and not more than 450 for smoke developed.

Embodiment 251

The insulation system or the method of any one of the preceding embodiments, wherein the atmospheric regulation layer comprises a fire control material, wherein the fire control material comprises boric acid, aluminum trihydrate, a halogenated fire retardant, a non-halogenated fire retardant, or an intumescent coating.

Embodiment 252

The insulation system or the method of any one of the preceding embodiments, wherein the atmospheric regulation layer is a continuous layer.

Embodiment 253

The insulation system or the method of any one of the preceding embodiments, wherein the continuous atmospheric regulation layer comprises a tape or a glue connecting adjacent atmospheric regulation layers.

Embodiment 254

The insulation system or the method of any one of the preceding embodiments, wherein the continuous atmospheric regulation layer has a ACH50 value of not greater than 10, or not greater than 5, or not greater than 3, or not greater than 1.5, or not greater than 0.6, wherein ACH50 represents an air exchange at 50 Pascals.

Embodiment 255

The insulation system or the method of any one of the preceding embodiments, wherein a reinforcement layer is located in direct contact to the atmospheric regulation layer.

Embodiment 256

The insulation system or the method of any one of the preceding embodiments, wherein the reinforcement layer is continuous.

Embodiment 257

The insulation system or the method of any one of the preceding embodiments, wherein the reinforcement layer is discontinuous.

Embodiment 258

The insulation system or the method of any one of the preceding embodiments, wherein the discontinuous reinforcement layer surrounds each fastener.

Embodiment 259

The insulation system or the method of any one of the preceding embodiments, wherein the reinforcement layer comprises a yarn mesh.

Embodiment 260

The insulation system or the method of any one of the preceding embodiments, wherein the reinforcement layer has a thickness of at least 0.005 mm, or at least 0.01 mm, or at least 0.03 mm, or at least 0.05 mm, or at least 0.08 mm, or at least 0.1 mm, or at least 0.13 mm, or at least 0.15 mm, or at least 0.2 mm, or at least 0.25 mm, or at least 0.38 mm, or at least 0.51 mm, or at least 1.27 mm, or at least 2.54 mm, or at least 3.81 mm.

Embodiment 261

The insulation system or the method of any one of the preceding embodiments, wherein the reinforcement layer has a thickness of not greater than 5.08 mm, or not greater than 3.81 mm, or not greater than 2.54 mm, or not greater than 1.27 mm, or not greater than 0.51 mm, or not greater than 0.38 mm, or not greater than 0.25 mm, or not greater than 0.2 mm, or not greater than 0.15 mm, or not greater than 0.13 mm, or not greater than 0.1 mm, or not greater than 0.08 mm, or not greater than 0.05 mm, or not greater than 0.03 mm.

Embodiment 262

The insulation system or the method of any one of the preceding embodiments, wherein the structural support comprises a wood, a polymer, a metal, a paper, or a composite.

Embodiment 263

The insulation system or the method of any one of the preceding embodiments, wherein the structural support has a width of at least 15 mm and not greater than 50 mm, and a height of at least 15 mm and not greater than 100 mm.

Embodiment 264

The insulation system or the method of any one of the preceding embodiments, wherein the structural support has a length of at least 0.3 m, or at least 0.6 m, or at least 0.9 m, or at least 1.2 m, or at least 1.5 m, or at least 1.8 m, or at least 2.4 m, or at least 3.1 m, or at least 3.7 m, or at least 4.3 m, or at least 4.9 m, or at least 5.5 m.

Embodiment 265

The insulation system or the method of any one of the preceding embodiments, wherein the structural support has a length of not greater than 6.1 m, or not greater than 5.5 m, or not greater than 4.9 m, or not greater than 4.3 m, or not greater than 3.7 m, or not greater than 3.1 m, or not greater than 2.4 m, or not greater than 1.8 m, or not greater than 1.5 m, or not greater than 1.2 m, or not greater than 0.9 m, or not greater than 0.6 m.

Embodiment 266

The insulation system or the method of any one of the preceding embodiments, wherein the atmospheric regulation layer is attached to the structural support via a fastener.

Embodiment 267

The insulation system or the method of any one of the preceding embodiments, wherein the fastener comprises a metal, a polymer, or a composite.

Embodiment 268

The insulation system or the method of any one of the preceding embodiments, wherein the fastener comprises a nail, a staple, a bolt, a screw, an adhesive, an adhesive tape (single or double-sided), a film, a hook, a hook-and-loop fabric system, a pin, or a spreadhead fastener.

Embodiment 269

The insulation system or the method of any one of the preceding embodiments, wherein the fastener comprises a pressure distribution surface, wherein the pressure distribution surface comprises a planar surface having an area of at least 0.1 square centimeters.

Embodiment 270

The insulation system or the method of any one of the preceding embodiments, wherein the insulation layer comprises an interior major surface, an exterior major surface, and four side surfaces, wherein the insulation layer is attached to the atmospheric regulation layer at the interior major surface, and wherein the second major surface faces the external surface.

Embodiment 271

An insulation system comprising: an insulation layer, an atmospheric regulation layer, a structural support, and an external surface (a surface separating the external climate from the insulation); wherein the insulation layer is located between the atmospheric regulation layer and the external surface, wherein the insulation layer has a thickness, wherein the thickness extends from the atmospheric regulation layer to an external surface, and wherein the thickness of the insulation layer comprises a unitary construction, wherein the atmospheric regulation layer has a water vapor permeability of not greater than 3 perms at a relative humidity of 25% as measured by ASTM E96 Procedure A Dry Cup, and a water vapor permeability of at least 6 perms at a relative humidity of 75% as measured by ASTM E96 Procedure B Wet Cup, wherein the atmospheric regulation layer has a fire class A rating as measured by ASTM E84, and wherein the continuous atmospheric regulation layer has a ACH50 value of not greater than 10, or not greater than 5, or not greater than 3, or not greater than 1.5, or not greater than 0.6, wherein ACH50 represents an air exchange at 50 Pascals.

This written description uses examples to disclose the embodiments, including the best mode, and also to enable those of ordinary skill in the art to make and use the invention. The patentable scope is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

Note that not all of the activities described above in the general description or the examples are required, that a portion of a specific activity may not be required, and that one or more further activities may be performed in addition to those described. Still further, the order in which activities are listed are not necessarily the order in which they are performed.

In the foregoing specification, the concepts have been described with reference to specific embodiments. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of invention.

As used herein, the terms "comprises," "comprising," "includes," "including," "has," "having" or any other variation thereof, are intended to cover a non-exclusive inclusion. For example, a process, method, article, or apparatus that comprises a list of features is not necessarily limited only to those features but may include other features not expressly listed or inherent to such process, method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

Also, the use of "a" or "an" are employed to describe elements and components described herein. This is done merely for convenience and to give a general sense of the scope of the invention. This description should be read to include one or at least one and the singular also includes the plural unless it is obvious that it is meant otherwise.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

After reading the specification, skilled artisans will appreciate that certain features are, for clarity, described herein in the context of separate embodiments, may also be provided in combination in a single embodiment. Conversely, various features that are, for brevity, described in the context of a single embodiment, may also be provided separately or in any subcombination. Further, references to values stated in ranges include each and every value within that range.

What is claimed is:

1. A method of insulating a surface, comprising:
   providing beams comprising an elongated profile in an axial direction;
   fastening the beams to support structures of the surface;
   positioning insulation batts on adjacent beams, wherein some of the support structures extend through the insulation batts, and wherein each of the insulation batts comprises an insulation layer and an outer layer facing distal ends of the beams;
   applying a first tape comprising an all weather flashing tape to the distal ends of the beams and to the outer layers of the insulation batts to form barriers therebetween; and
   applying a second tape comprising a stretch tape having an elongation capability of at least about 100% between the support structures and the insulation batts to form additional barriers therebetween, wherein the barriers and the additional barriers comprise an ACH50 value of not greater than 3.0, and wherein ACH50 represents an air exchange at 50 Pascals.

2. The method of claim 1, further comprising: extending no additional material between adjacent beams other than the insulation batts and the tape.

3. The method of claim 1, wherein the outer layer comprises a water vapor permeability of not greater than 3 perms at a relative humidity of 25% as measured by ASTM E96 Procedure A Dry Cup.

4. The method of claim 1, wherein the outer layer comprises a fire class A rating as measured by ASTM E84.

5. A method of insulating a surface, comprising:
   mounting a plurality of structural supports parallel to the surface;
   providing an insulation layer and an atmospheric regulation layer, wherein the atmospheric regulation layer is formed from latex, ethylene vinyl alcohol, or a polyamide and comprises a water vapor permeability of not greater than 3 perms at a relative humidity of 25% as measured by ASTM E96 Procedure A Dry Cup, a water vapor permeability of at least 6 perms at a relative humidity of 75% as measured by ASTM E96 Procedure B Wet Cup, a fire class A rating as measured by ASTM E84, and an ACH50 value of not greater than 3, wherein ACH50 represents an air exchange at 50 Pascals;
   supporting the atmospheric regulation layer with the structural supports; and
   placing the insulation layer between the atmospheric regulation layer and the surface such that the insulation layer extends from the atmospheric regulation layer to the surface.

6. The method of claim 5, wherein the insulation layer comprises a unitary construction.

7. The method of claim 5, wherein the insulation layer comprises a multilayer construction.

8. The method of claim 5, wherein the atmospheric regulation layer comprises a continuous layer.

9. The method of claim 8, further comprising: applying a tape between adjacent atmospheric regulation layers to form the continuous layer.

10. The method of claim 9, wherein applying the tape between adjacent atmospheric regulation layers provides the continuous layer of the atmospheric regulation layer with an ACH50 value of not greater than 3, wherein ACH50 represents an air exchange at 50 Pascals.

11. The method of claim 5, further comprising: placing a reinforcement layer in direct contact with the atmospheric regulation layer.

12. The method of claim 11, wherein the reinforcement layer is a single continuous layer.

13. The method of claim 11, wherein the reinforcement layer is discontinuous.

14. The method of claim 5, further comprising: installing a barrier to prevent movement of the insulation layer.

15. The method of claim 14, further comprising: securing the insulation layer to the barrier.

* * * * *